United States Patent
Troy et al.

(10) Patent No.: US 12,297,952 B2
(45) Date of Patent: May 13, 2025

(54) APPARATUSES CONFIGURED TO ALLOW REAL-TIME ADJUSTMENTS OF LOCKING DIMENSIONS

(71) Applicant: The Boeing Company, Arlington, VA (US)

(72) Inventors: James J. Troy, Issaquah, WA (US); Daniel M. Simunovic, Titusville, FL (US)

(73) Assignee: THE BOEING COMPANY, Arlington, VA (US)

( * ) Notice: Subject to any disclaimer, the term of this patent is extended or adjusted under 35 U.S.C. 154(b) by 95 days.

(21) Appl. No.: 18/317,407

(22) Filed: May 15, 2023

(65) Prior Publication Data
US 2024/0384827 A1 Nov. 21, 2024

(51) Int. Cl.
*B64U 70/99* (2023.01)
*F16M 11/04* (2006.01)

(52) U.S. Cl.
CPC ............ *F16M 11/04* (2013.01); *B64U 70/99* (2023.01)

(58) Field of Classification Search
CPC ..................................................... F16M 11/04
See application file for complete search history.

(56) References Cited

U.S. PATENT DOCUMENTS

| | | | |
|---|---|---|---|
| 7,643,893 B2 | 1/2010 | Troy et al. | |
| 10,286,556 B2 | 5/2019 | Troy et al. | |
| 2017/0036783 A1* | 2/2017 | Snyder | B33Y 30/00 |
| 2017/0328149 A1* | 11/2017 | Søyland | B25J 19/0045 |
| 2019/0126478 A1* | 5/2019 | Scott | B25J 9/1679 |
| 2020/0407061 A1* | 12/2020 | Hafenrichter | B66C 1/28 |
| 2020/0407197 A1* | 12/2020 | Hafenrichter | B66C 1/10 |
| 2023/0029226 A1 | 1/2023 | Yuan et al. | |
| 2023/0182922 A1 | 6/2023 | Troy et al. | |

FOREIGN PATENT DOCUMENTS

JP 2021130160 A 9/2021

OTHER PUBLICATIONS

Ackerman, "We Can Do Better Than Human-Like Hands for Robots" Jun. 9, 2020 (Year: 2020), https://spectrum.ieee.org/we-can-do-better-than-humanlike-hands-for-robots.*
U.S. Appl. No. 17/551,049 (not yet published), Specification (with claims and Abstract) (58 pages).
U.S. Appl. No. 17/551,049 (not yet published), Drawings (18 sheets).

(Continued)

*Primary Examiner* — Justin M Benedik
(74) *Attorney, Agent, or Firm* — MH2 Technology Law Group LLP

(57) ABSTRACT

An apparatus may include: a support base; and two or more roller wheels, each adjustable in orientation, position, or orientation and position, mounted on the support base and configured to engage with an object in a passive locking configuration. The apparatus may be further configured to disengage from the object in the passive locking configuration. The apparatus may be further configured to lock the object to the apparatus in an active locking configuration. Orientations, positions, or the orientations and positions of the at least two of the two or more roller wheels may be adjustable.

20 Claims, 42 Drawing Sheets

(56) References Cited

OTHER PUBLICATIONS

"'Quick-thinking' robot arm helps MIT researchers catch on to brain function," MIT News, Mar. 11, 1998, downloaded from news.mit.edu/1998/wam.

Dzitac et al., "A method to control grip force and slippage for robotic object grasping and manipulations," Preprints of the 2012 20th Mediterranean Conference on Control & Automation (MED), Barcelona, Spain, Jul. 3-6, 2012, pp. 116-121.

End of Arm Tooling, Inc., IGP 14 ID Expansion Gripper, product information downloaded Oct. 1, 2021, from oat.net/components/id-expansion-gripperigp/igp-14-id-expansion-gripper/.

Ackerman, "We Can Do Better Than Human-Like Hands for Robots," IEEE Spectrum, Jun. 9, 2020, downloaded from spectrum.ieee.org/we-can-do-betterthan-humanlike-hands-for-robots#toggle-gdpr.

Exploding Bacon FIRST robotics team 1902 roller gripper prototype 2011, still from video dated Jan. 25, 2011, available at youtube.com/watch?v=-hFWXeyuyk.

Backlash—The Robot, 2019 FRC Season—Destination: Deep Space, information downloaded from www.team254.com/first/2019/.

Lumineau, S., extended European Search Report issued in corresponding European Patent Application No. 24175861.4, dated Oct. 22, 2024, 10 pages.

\* cited by examiner

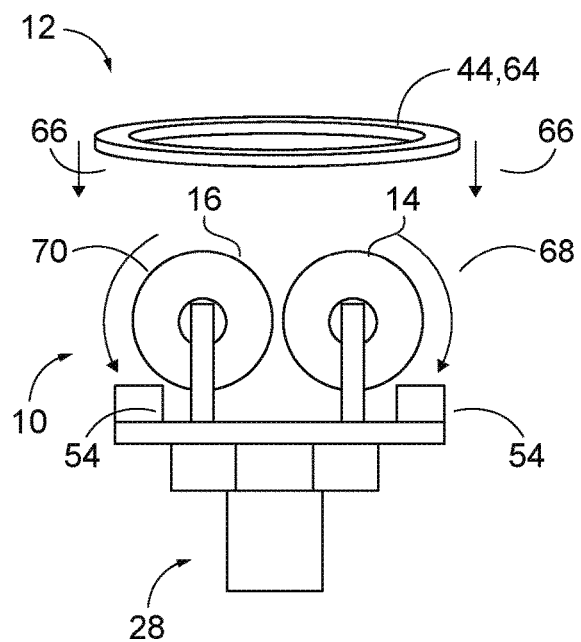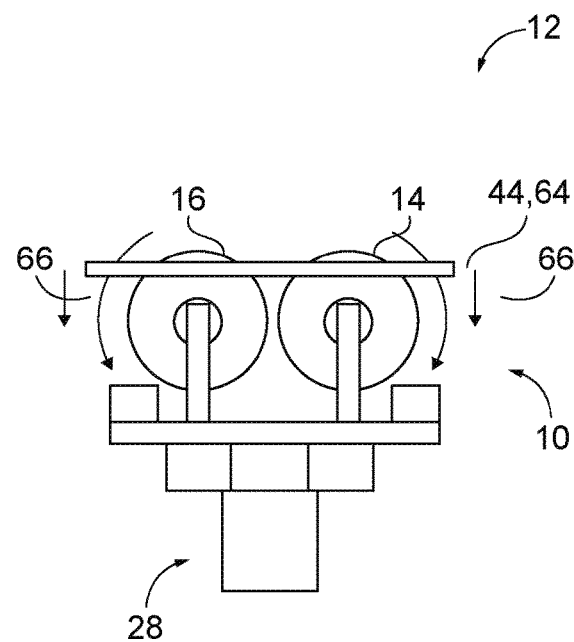
FIG. 3  FIG. 4
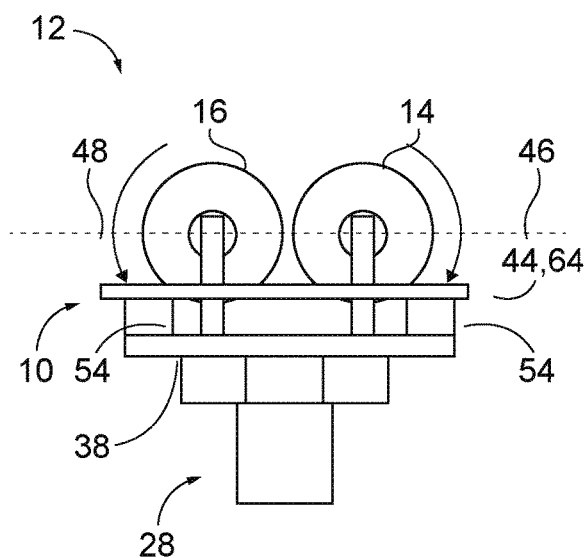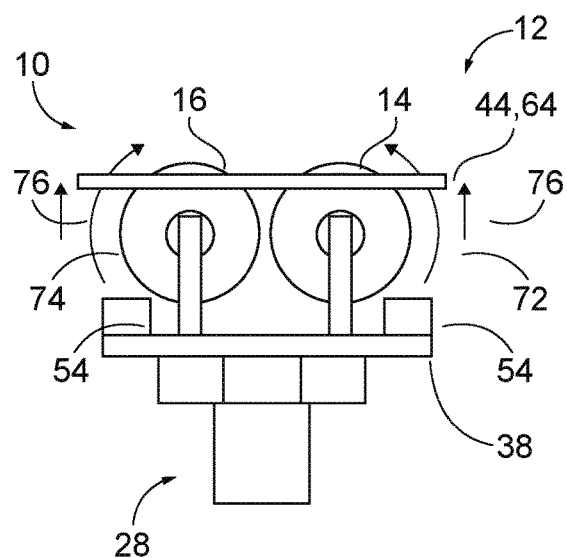
FIG. 5  FIG. 6

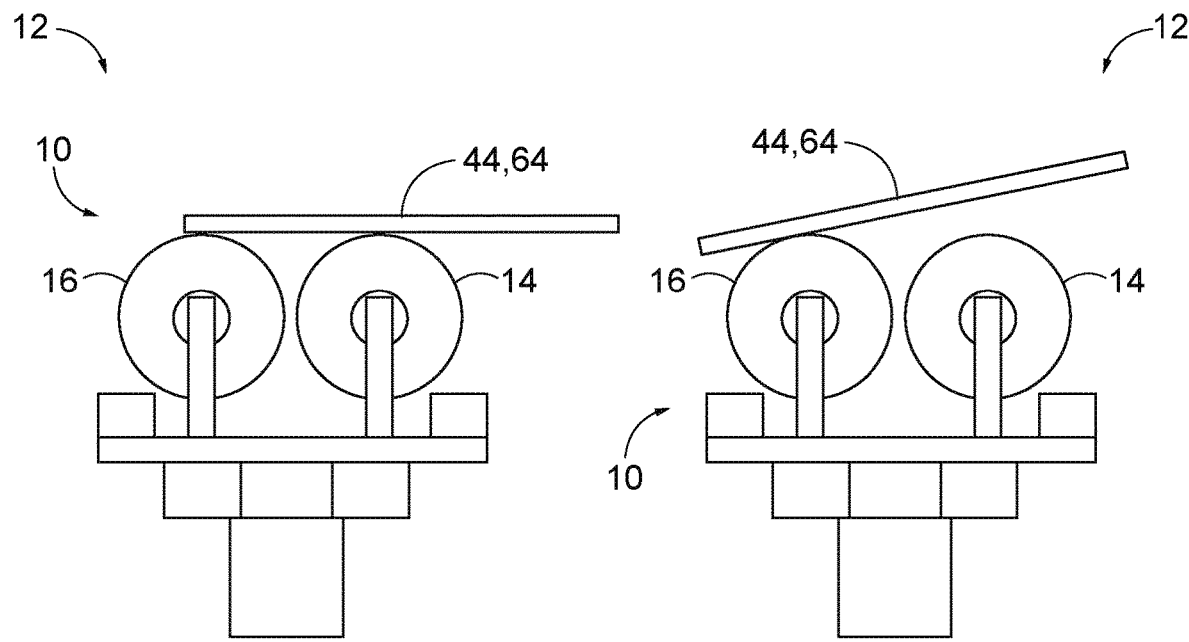
FIG. 7
FIG. 8
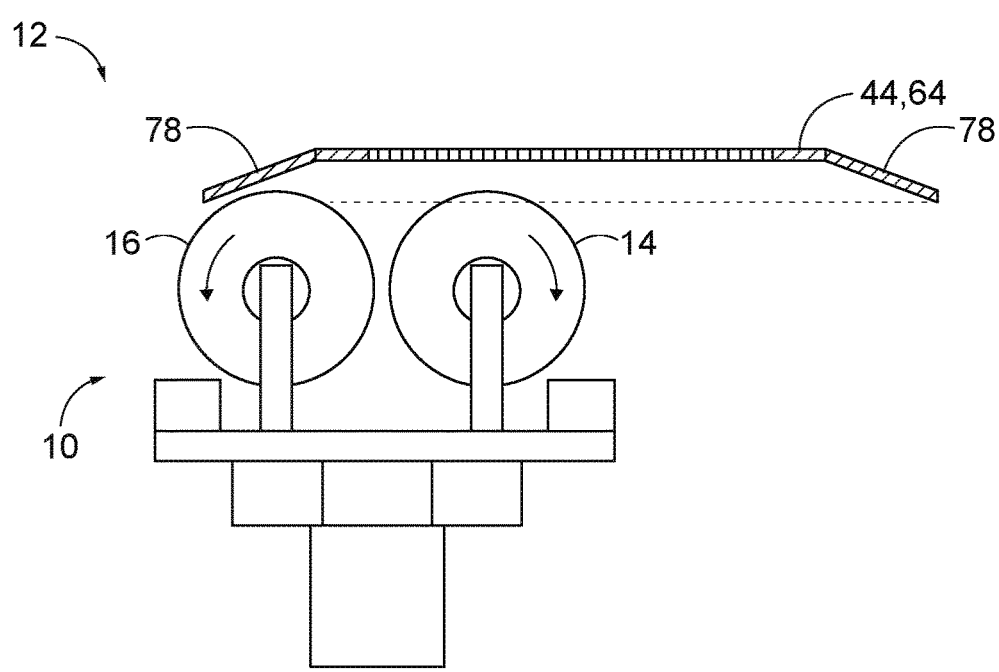
FIG. 9

APPARATUSES CONFIGURED TO ALLOW REAL-TIME ADJUSTMENTS OF LOCKING DIMENSIONS

FIELD

The subject matter disclosed herein generally relates to apparatuses (e.g., end effectors) and more particularly to apparatuses (e.g., end effectors) with two or more roller wheels that are configured to allow real-time adjustments of locking dimensions.

BACKGROUND

The ability to grab, engage (e.g., capture) or mate with an aircraft, such as an unmanned aerial vehicle ("UAV") or other small hovering aircraft, is often desirable, especially when requiring it to land in a safe location is a concern for operators of these types of vehicles. For example, landing, grabbing, engaging, and/or mating with such aircraft may be difficult when they are operating in adverse and/or unpredictable conditions (e.g., windy weather), in environments with rough terrain where there is no level location to land, and/or via a moving platform such as a boat or ship. Safely disengaging (e.g., releasing) or launching aircraft in these conditions is also challenging.

While there are some systems that address some of these problems, those solutions may not be adaptable to hovering UAVs, such as quadrotor or coaxial rotator vehicles. Attempts have been made to grasp hovering vehicles from the air using traditional articulated robotic grippers or locking interface devices combined with low latency vision systems and high-speed robotic manipulator arms that can quickly actuate to grab a mating receptacle on the moving vehicle. To safely and consistently engage a hovering aircraft or other target object, high-speed vision systems are often needed to achieve precise alignment with the moving target object, along with precise three-dimensional localization and timing, which are complex and can be expensive and difficult to maintain in the field. Additionally, misalignment between these types of grippers and the target object (such as due to a limited range of viable approach angles) risks inflicting damage to the target object when attempting to engage it, thus allowing for little to no error tolerance. These challenges are amplified by the often rapidly changing position and orientation of the aircraft or other object with respect to the gripper (either or both of which may be in motion).

Engaging a flying or hovering object that can move with six degrees-of-freedom requires either very precise alignment of the gripper, or a gripper that can tolerate significant misalignment with the hovering object. The challenges of approaches that rely on very precise alignment are discussed above. Other existing types of grippers are not suitable for grasping hovering aircraft and the like, because they do not support multi-axis misalignment to allow for the multidimensional engagement required when engaging flying or hovering objects. There thus remains a need for an improved engagement device for engaging or mating with aircraft and other target objects, that allows the target object to approach from any angle covering a full 360° range of heading angles, and that can tolerate adverse and unpredictable conditions that may cause misalignment of the target object.

Other issues that do not appear to have been addressed in the existing art include the ability to lock the gripper in order to prevent a target object from accidentally disengaging from the gripper, and a real-time capability to adjust a locking dimension (e.g., capture diameter) of the gripper so as to enable the capture of target objects with different size mating receptacles. There remains a need for an improved engagement device that addresses one or both of these issue, as well.

The disclosures of U.S. patent application Ser. No. 17/551,049, filed on Dec. 14, 2021, to Troy et al. ("Troy") are incorporated in the present application by reference.

SUMMARY

The present disclosure is directed to apparatuses (e.g., end effectors) and more particularly to apparatus (e.g., end effectors) with two or more roller wheels that are configured to allow real-time adjustments of locking dimensions.

In some examples, an apparatus can comprise: a support base; and two or more roller wheels, each adjustable in orientation, position, or orientation and position, mounted on the support base and configured to engage with an object in a passive locking configuration.

In some examples of the apparatus, the two or more roller wheels can be further configured to disengage from the object in the passive locking configuration.

In some examples of the apparatus, the two or more roller wheels can be further configured to lock the object to the apparatus in an active locking configuration.

In some examples of the apparatus, the orientations, the positions, or the orientations and positions of the two or more roller wheels can be adjustable to change the two or more roller wheels from the passive locking configuration to the active locking configuration or from the active locking configuration to the passive locking configuration.

In some examples of the apparatus, when changing the two or more roller wheels from the passive locking configuration to the active locking configuration, a locking dimension of the end apparatus can increase.

In some examples of the apparatus, when changing the two or more roller wheels from the passive locking configuration to the active locking configuration, a locking dimension of the end apparatus can decrease.

In some examples of the apparatus, when changing the two or more roller wheels from the active locking configuration to the passive locking configuration, a locking dimension of the end apparatus can increase.

In some examples of the apparatus, when changing the two or more roller wheels from the active locking configuration to the passive locking configuration, a locking dimension of the apparatus can decrease.

In some examples of the apparatus, the apparatus can further comprise: a locking mechanism. The locking mechanism can be configured to prevent disengagement of the object from the apparatus.

In some examples, an apparatus can comprise: a support base; and two or more roller wheels, each adjustable in orientation, position, or orientation and position, mounted on the support base, configured to engage with an object in a passive locking configuration, and further configured to lock the object to the apparatus in an active locking configuration.

In some examples of the apparatus, the orientations, the positions, or the orientations and positions of the two or more roller wheels can be adjustable to change the two or more roller wheels from the passive locking configuration to the active locking configuration.

In some examples of the apparatus, the orientations, the positions, or the orientations and positions of the at least two of the two or more roller wheels can be adjustable to change the two or more roller wheels from the active locking configuration to the passive locking configuration.

In some examples of the apparatus, adjusting the orientations, the positions, or the locations of the two or more roller wheels can change a locking dimension of the apparatus.

In some examples of the apparatus, a first roller wheel of the two or more roller wheels can be configured to rotate in a first geometric plane of rotation; a second roller wheel of the two or more roller wheels can be configured to rotate in a second geometric plane of rotation; and the first geometric plane of rotation can be parallel to the second geometric plane of rotation in the passive locking configuration, the first geometric plane of rotation can be parallel to the second geometric plane of rotation in the active locking configuration, or the first geometric plane of rotation can be parallel to the second geometric plane of rotation in the passive and active locking configurations.

In some examples of the apparatus, a first roller wheel of the two or more roller wheels can be configured to rotate in a first geometric plane of rotation; a second roller wheel of the two or more roller wheels can be configured to rotate in a second geometric plane of rotation; and the first geometric plane of rotation can be coincident with the second geometric plane of rotation in the passive locking configuration, the first geometric plane of rotation can be coincident with the second geometric plane of rotation in the active locking configuration, or the first geometric plane of rotation can be coincident with the second geometric plane of rotation in the passive and active locking configurations.

In some examples, an apparatus can comprise: a support base; and three or more roller wheels, each adjustable in orientation, position, or orientation and position, mounted on the support base and configured to engage with an object in a passive locking configuration.

In some examples of the apparatus, the three or more roller wheels can be further configured to disengage from the object in the passive locking configuration.

In some examples of the apparatus, the orientations, the positions, or the orientations and positions of the at least three of the three or more roller wheels can be adjustable to change the three or more roller wheels from the passive locking configuration to an active locking configuration or from the active locking configuration to the passive locking configuration.

In some examples of the apparatus, adjusting the orientations, the positions, or the orientations and positions of the at least three of the three or more roller wheels can change a locking dimension of the apparatus.

In some examples of the apparatus, a first roller wheel of the three or more roller wheels can be configured to rotate in a first geometric plane of rotation; a second roller wheel of the three or more roller wheels can be configured to rotate in a second geometric plane of rotation; a third roller wheel of the three or more roller wheels can be configured to rotate in a third geometric plane of rotation; the first geometric plane of rotation can be non-parallel to the second geometric plane of rotation; the second geometric plane of rotation can be non-parallel to the third geometric plane of rotation; and the third geometric plane of rotation can be non-parallel to the first geometric plane of rotation.

In some examples, an end effector can comprise: a support base; and two or more roller wheels mounted on the support base. The end effector can be configured to engage with an object using at least two of the two or more roller wheels in a passive locking configuration. The end effector can be further configured to disengage from the object using the at least two of the two or more roller wheels. For a first roller wheel of the at least two of the two or more roller wheels, an orientation of the first roller wheel can be adjustable, a position of the first roller wheel can be adjustable, or the orientation and position of the first roller wheel can be adjustable. For a second roller wheel of the at least two of the two or more roller wheels, an orientation of the second roller wheel can be adjustable, a position of the second roller wheel can be adjustable, or the orientation and position of the second roller wheel can be adjustable.

In some examples of the end effector, the end effector can be further configured to disengage from the object using the at least two of the two or more roller wheels in the passive locking configuration.

In some examples of the end effector, the end effector can be further configured to lock the object to the end effector using the at least two of the two or more roller wheels in an active locking configuration.

In some examples of the end effector, orientations, positions, or the orientations and positions of the at least two of the two or more roller wheels can be adjustable to change the at least two of the two or more roller wheels from the passive locking configuration to the active locking configuration or from the active locking configuration to the passive locking configuration.

In some examples of the end effector, when changing the at least two of the two or more roller wheels from the passive locking configuration to the active locking configuration, a locking dimension of the end effector can increase.

In some examples of the end effector, when changing the at least two of the two or more roller wheels from the passive locking configuration to the active locking configuration, a locking dimension of the end effector can decrease.

In some examples of the end effector, when changing the at least two of the two or more roller wheels from the active locking configuration to the passive locking configuration, a locking dimension of the end effector can increase.

In some examples of the end effector, when changing the at least two of the two or more roller wheels from the active locking configuration to the passive locking configuration, a locking dimension of the end effector can decrease.

In some examples of the end effector, the end effector can further comprise: a locking mechanism. The locking mechanism can be configured to lock the object to the end effector independent of the at least two of the two or more roller wheels.

In some examples, an end effector can comprise: a support base; and two or more roller wheels mounted on the support base. The end effector can be configured to engage with an object using at least two of the two or more roller wheels in a passive locking configuration. The end effector can be further configured to lock the object to the end effector using the at least two of the two or more roller wheels in an active locking configuration. The end effector can be further configured to disengage from the object using the at least two of the two or more roller wheels.

In some examples of the end effector, the end effector can be further configured to disengage from the object using the at least two of the two or more roller wheels in the passive locking configuration.

In some examples of the end effector, orientations, positions, or the orientations and positions of the at least two of the two or more roller wheels can be adjustable to change the at least two of the two or more roller wheels from the passive locking configuration to the active locking configuration or from the active locking configuration to the passive locking configuration.

In some examples of the end effector, adjusting orientations, positions, or the orientations and positions of the at least two of the two or more roller wheels can change a locking dimension of the end effector.

In some examples of the end effector, a first roller wheel of the at least two of the two or more roller wheels can be configured to rotate in a first geometric plane of rotation. A second roller wheel of the at least two of the two or more roller wheels can be configured to rotate in a second geometric plane of rotation. The first geometric plane of rotation can be parallel to the second geometric plane of rotation in the passive locking configuration, the first geometric plane of rotation can be parallel to the second geometric plane of rotation in the active locking configuration, or the first geometric plane of rotation can be parallel to the second geometric plane of rotation in the passive and active locking configurations.

In some examples of the end effector, a first roller wheel of the at least two of the two or more roller wheels can be configured to rotate in a first geometric plane of rotation. A second roller wheel of the at least two of the two or more roller wheels can be configured to rotate in a second geometric plane of rotation. The first geometric plane of rotation can be coincident with the second geometric plane of rotation in the passive locking configuration, the first geometric plane of rotation can be coincident with the second geometric plane of rotation in the active locking configuration, or the first geometric plane of rotation can be coincident with the second geometric plane of rotation in the passive and active locking configurations.

In some examples, an end effector can comprise: a support base; and three or more roller wheels mounted on the support base. The end effector can be configured to engage with an object using at least three of the three or more roller wheels in a passive locking configuration. The end effector can be further configured to lock the object to the end effector using the at least three of the three or more roller wheels in an active locking configuration. The end effector can be further configured to disengage from the object using the at least three of the three or more roller wheels.

In some examples of the end effector, the end effector can be further configured to disengage from the object using the at least three of the three or more roller wheels in the passive locking configuration.

In some examples of the end effector, orientations, positions, or the orientations and positions of the at least three of the three or more roller wheels can be adjustable to change the at least three of the three or more roller wheels from the passive locking configuration to the active locking configuration or from the active locking configuration to the passive locking configuration.

In some examples of the end effector, adjusting orientations, positions, or the orientations and positions of the at least three of the three or more roller wheels can change a locking dimension of the end effector.

In some examples of the end effector, a first roller wheel of the at least three of the three or more roller wheels can be configured to rotate in a first geometric plane of rotation. A second roller wheel of the at least three of the three or more roller wheels can be configured to rotate in a second geometric plane of rotation. A third roller wheel of the at least three of the three or more roller wheels can be configured to rotate in a third geometric plane of rotation. The first geometric plane of rotation can be non-parallel to the second geometric plane of rotation. The second geometric plane of rotation can be non-parallel to the third geometric plane of rotation. The third geometric plane of rotation can be non-parallel to the first geometric plane of rotation.

It is to be understood that both the foregoing general description and the following detailed description are exemplary and explanatory only, and are not restrictive of the present teachings, as claimed.

DRAWINGS

The above and/or other aspects and advantages will become more apparent and more readily appreciated from the following detailed description of examples, taken in conjunction with the accompanying drawings, in which:

FIG. 3 shows a side elevational schematic representation of a passive receptacle approaching an end effector, according to some examples of the disclosed apparatuses;

FIG. 4 shows a side elevational schematic representation of a passive receptacle in the process of engaging with an end effector, according to some examples of the disclosed apparatuses;

FIG. 5 shows a side elevational schematic representation of a passive receptacle effectively locked into place on an end effector, according to some examples of the disclosed apparatuses;

FIG. 6 shows side elevational schematic representation of a passive receptacle in the process of being launched or disengaged from an end effector, according to some examples of the disclosed apparatuses;

FIG. 7 shows a side elevational schematic representation of a passive receptacle in positional misalignment with respect to an end effector, according to some examples of the disclosed apparatuses;

FIG. 8 shows a side elevational schematic representation of a passive receptacle in rotational misalignment with respect to an end effector, according to some examples of the disclosed apparatuses;

FIG. 9 shows a side elevational schematic representation of a passive receptacle in positional misalignment with respect to an end effector, according to some examples of the disclosed apparatuses;

Figure 14:
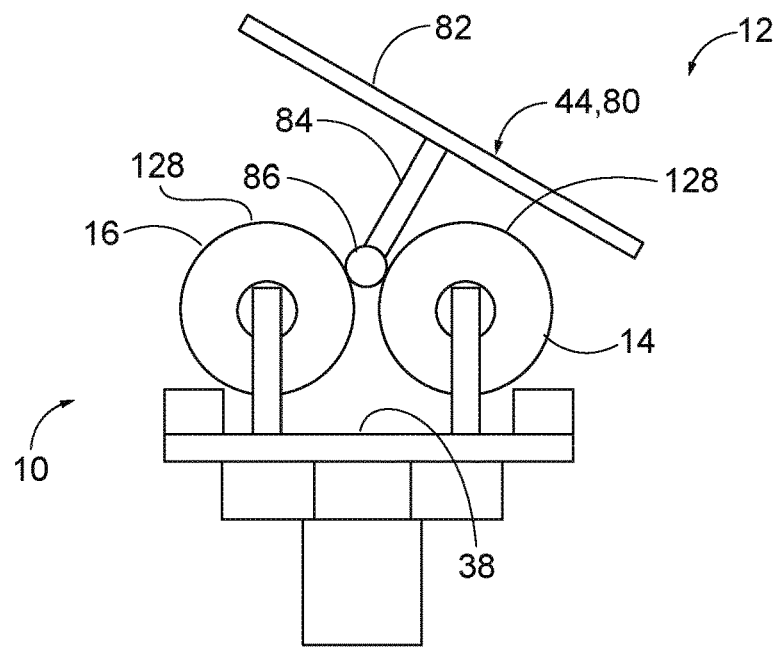
Figure 15:
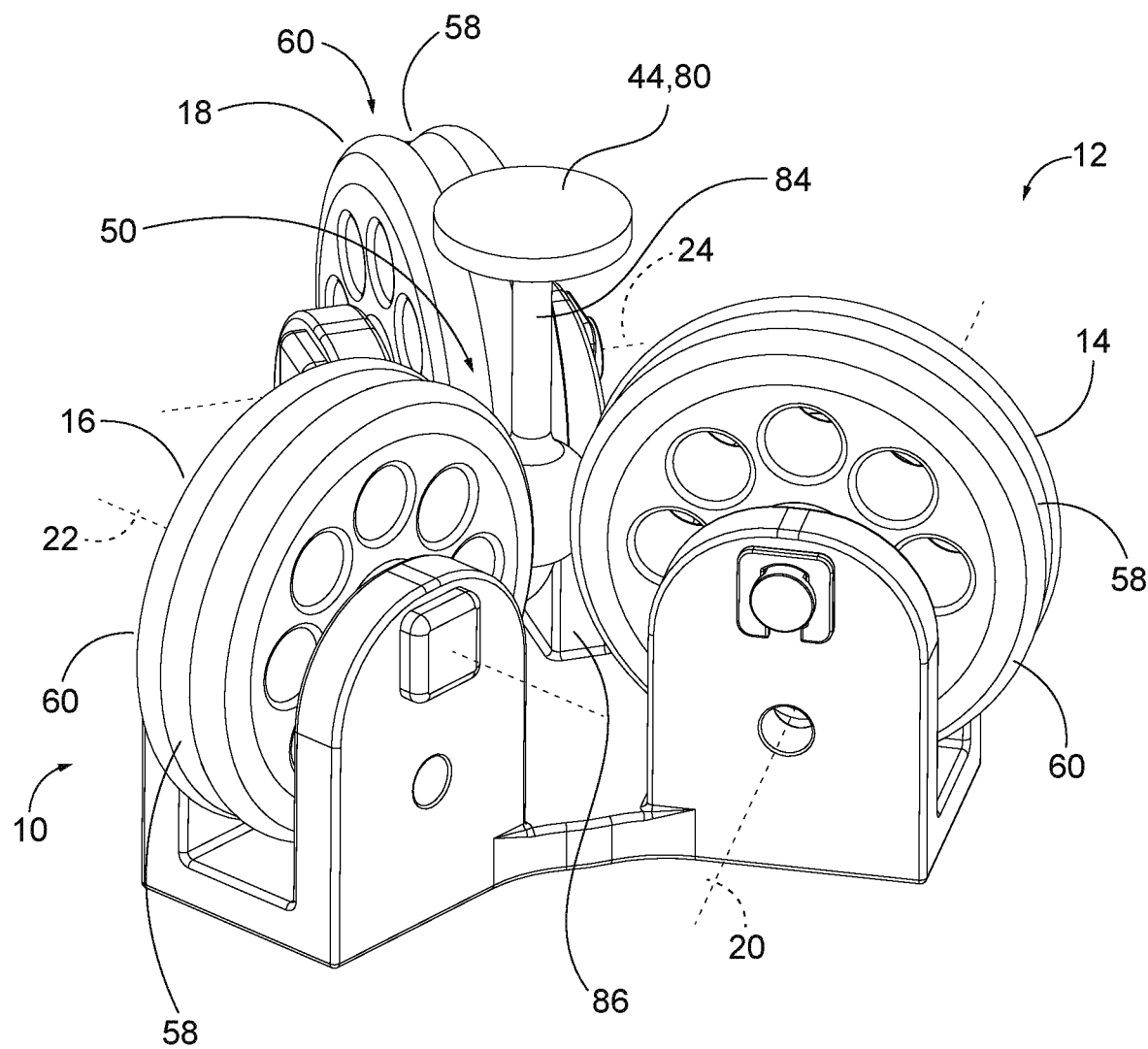
Figure 16:
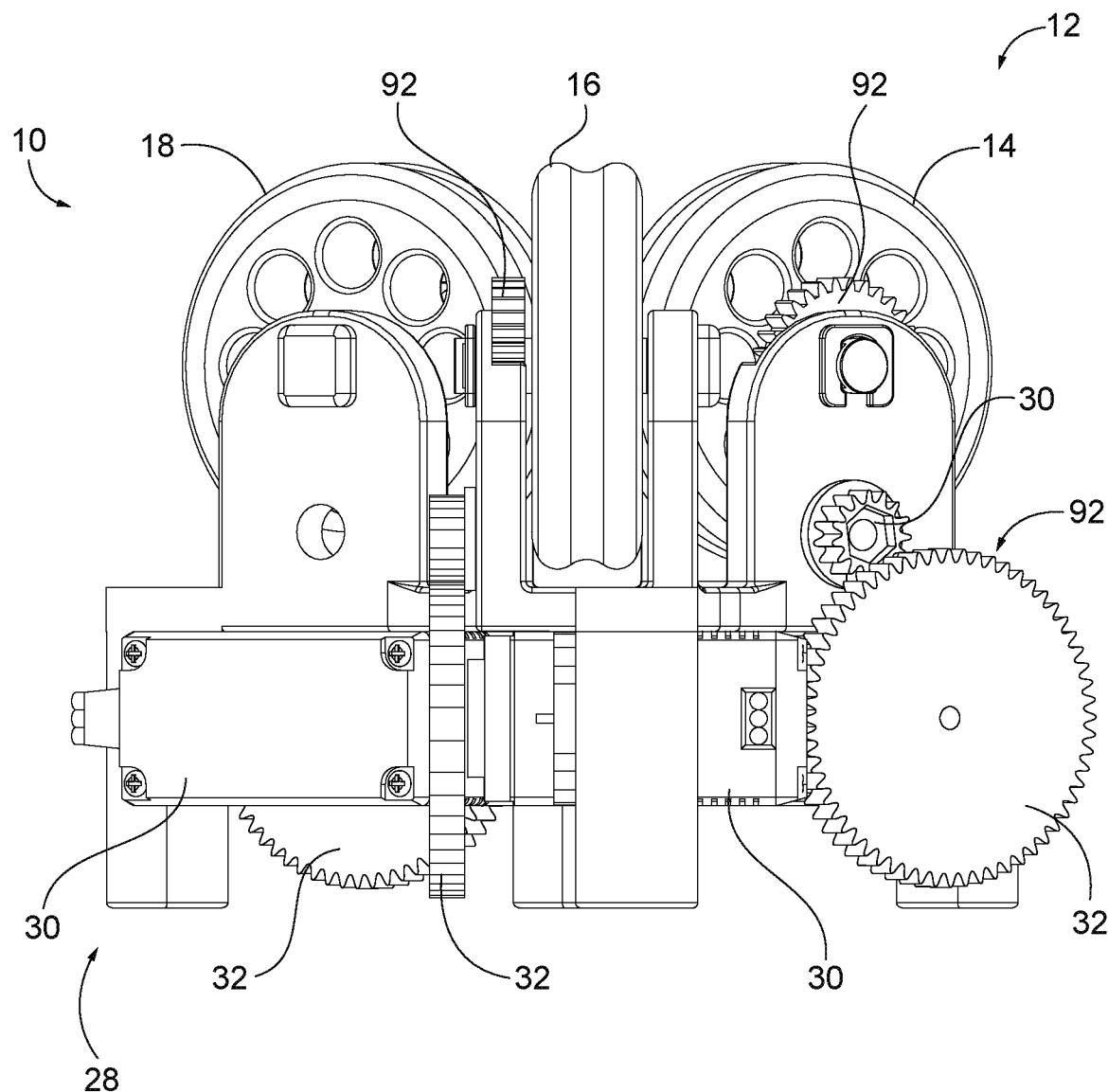
Figure 17:
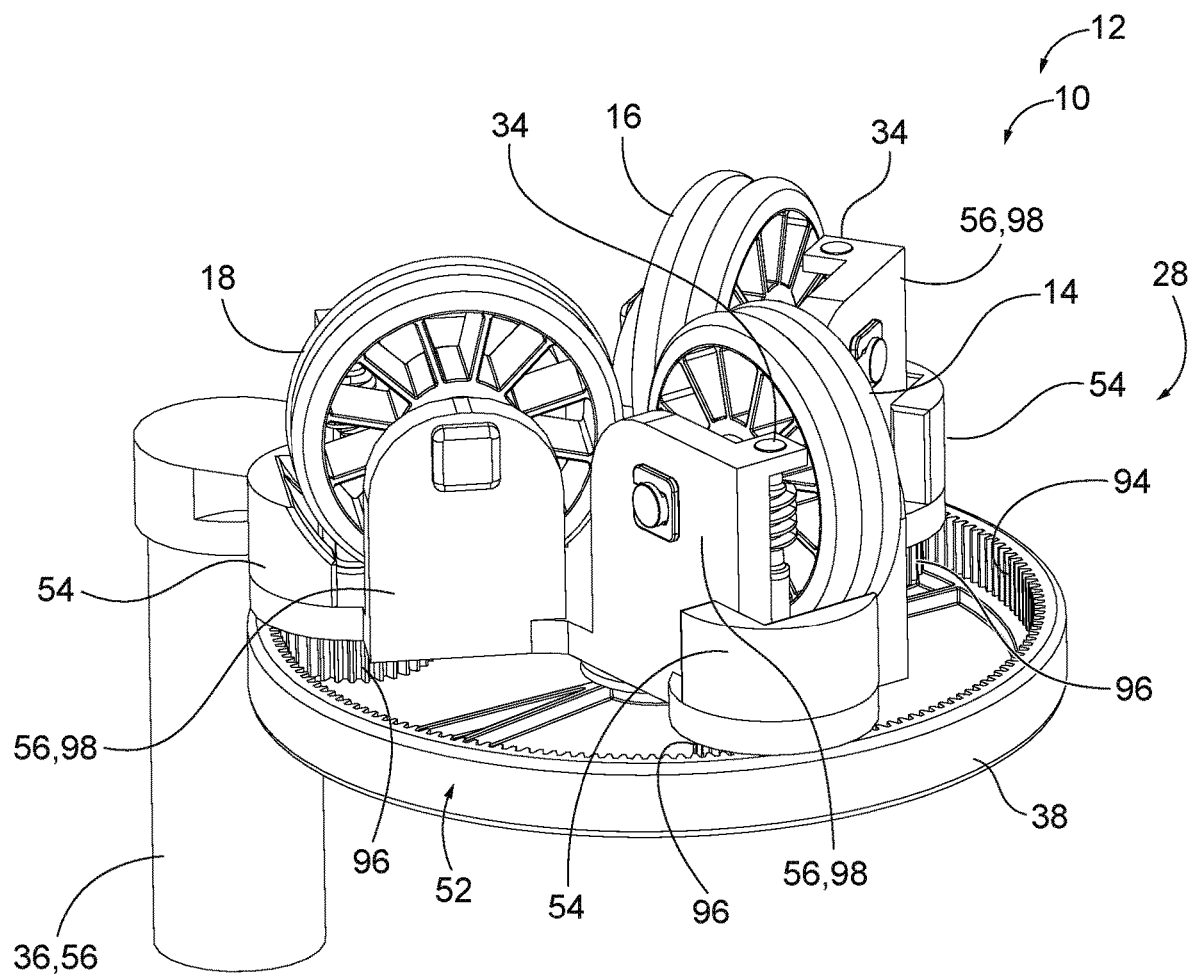
Figure 19:
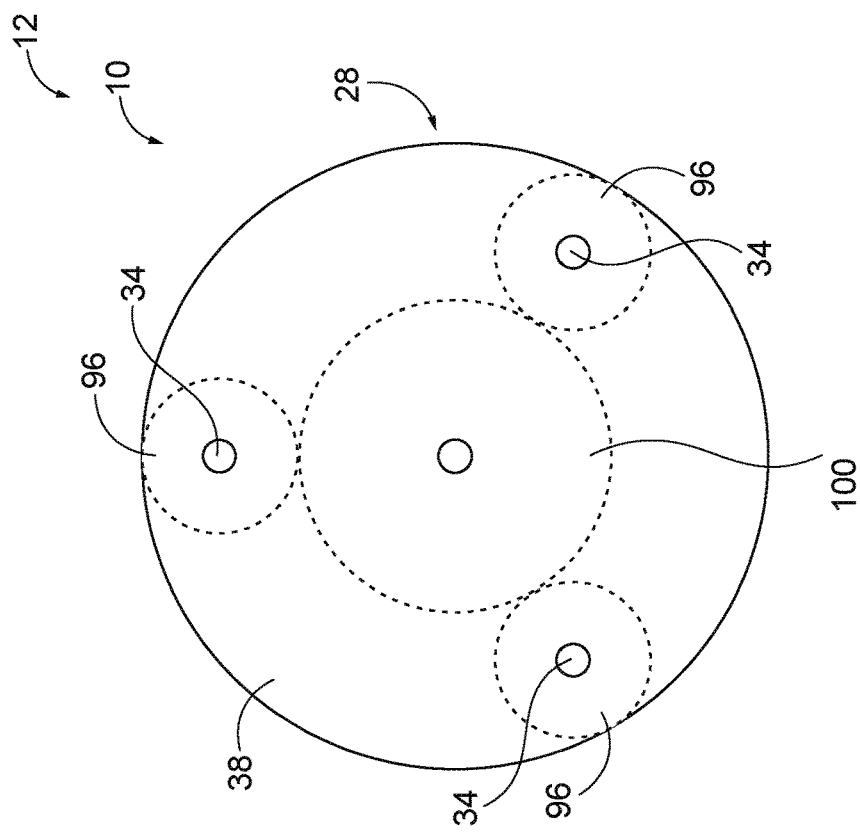
Figure 18:
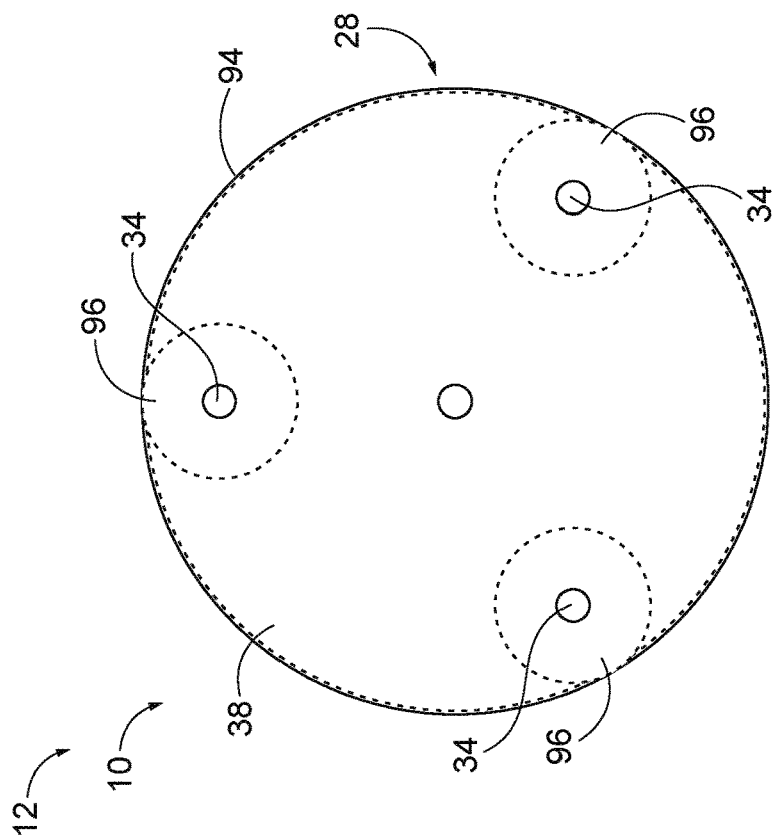
Figure 21:
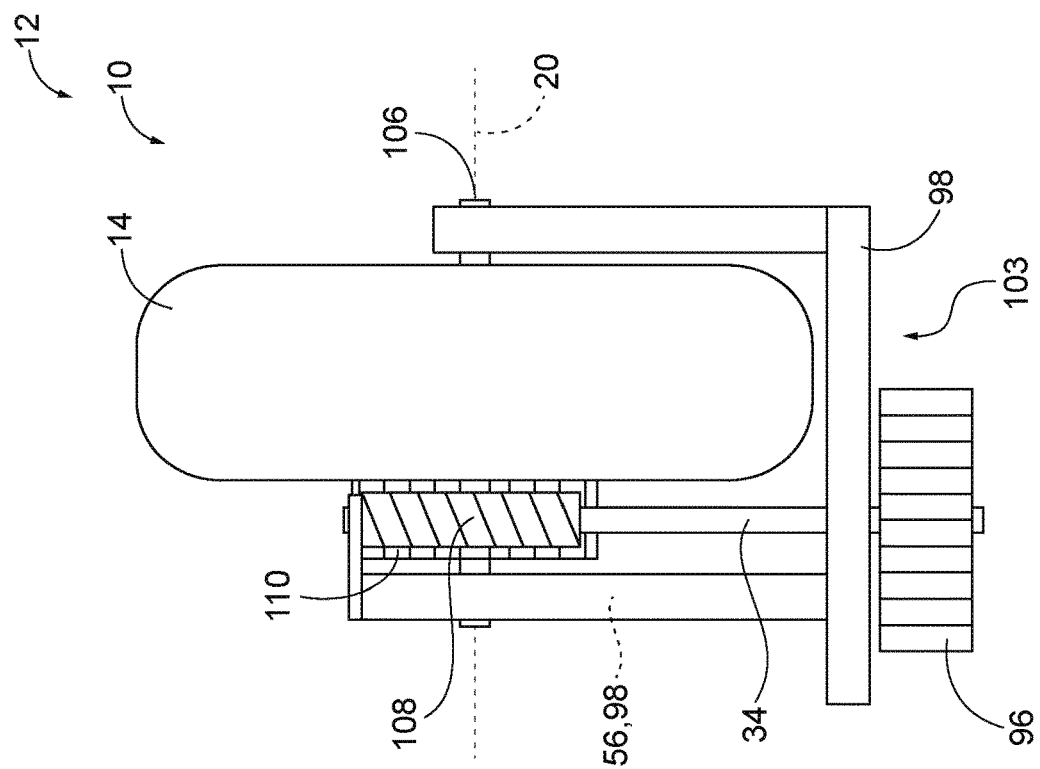
Figure 20:
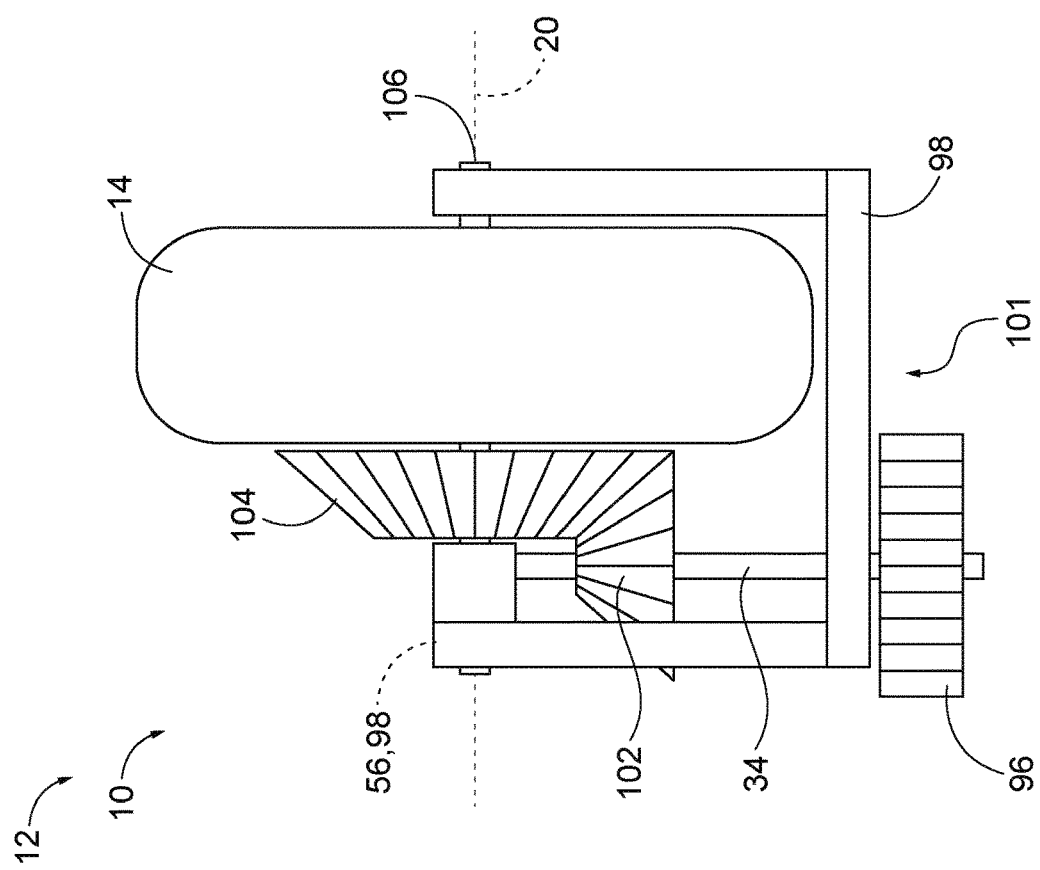
Figure 22:
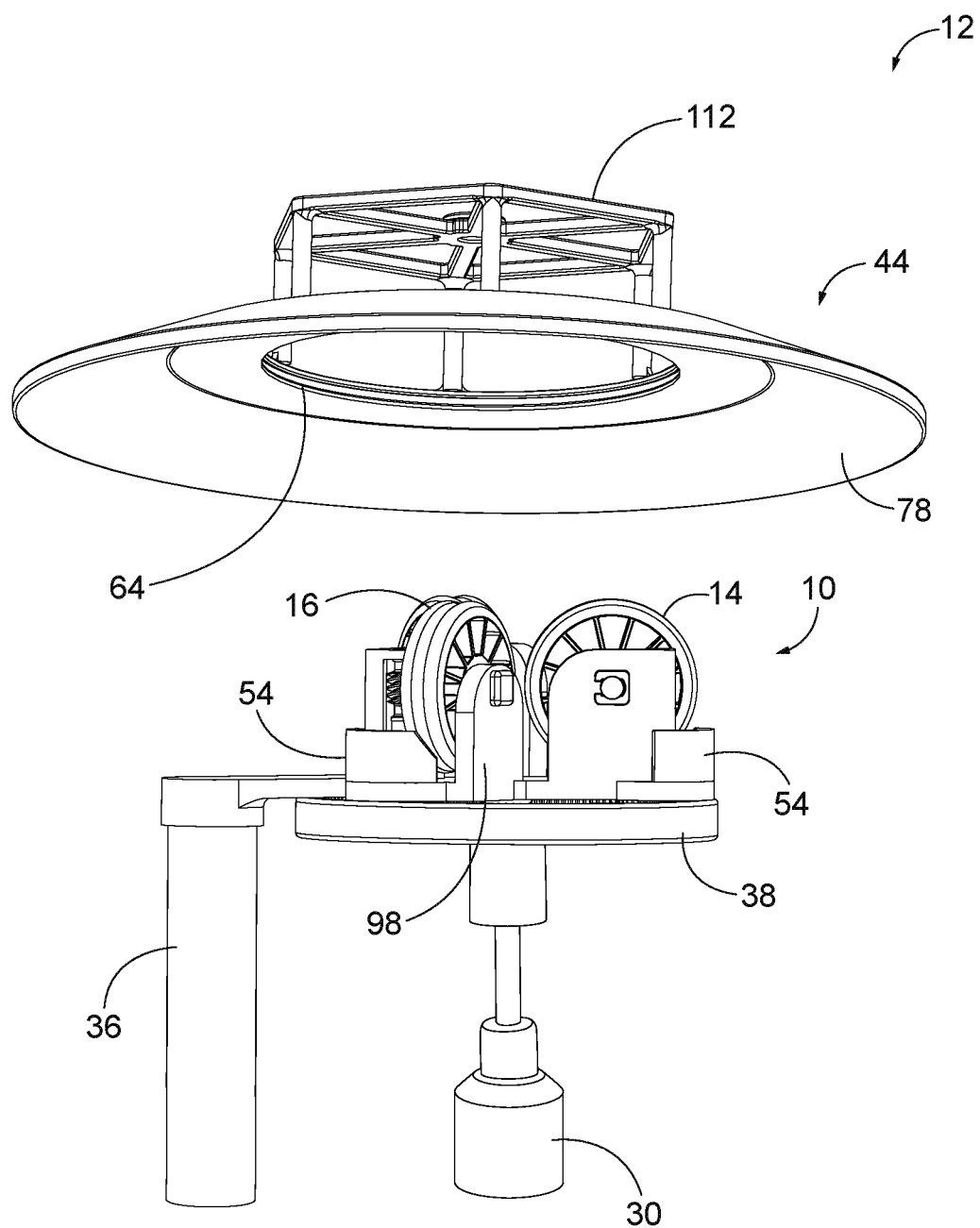
Figure 23:
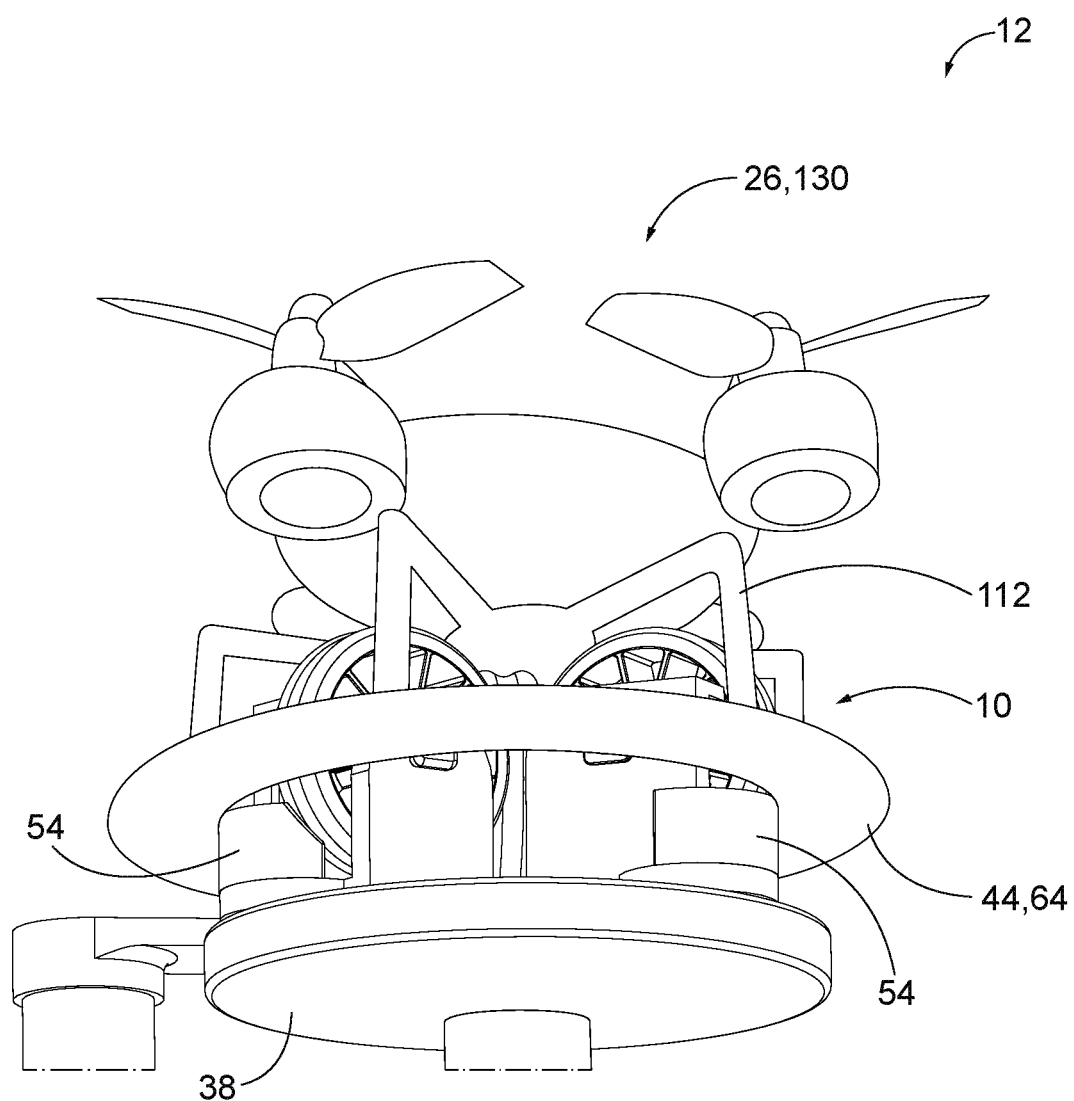
Figure 24:
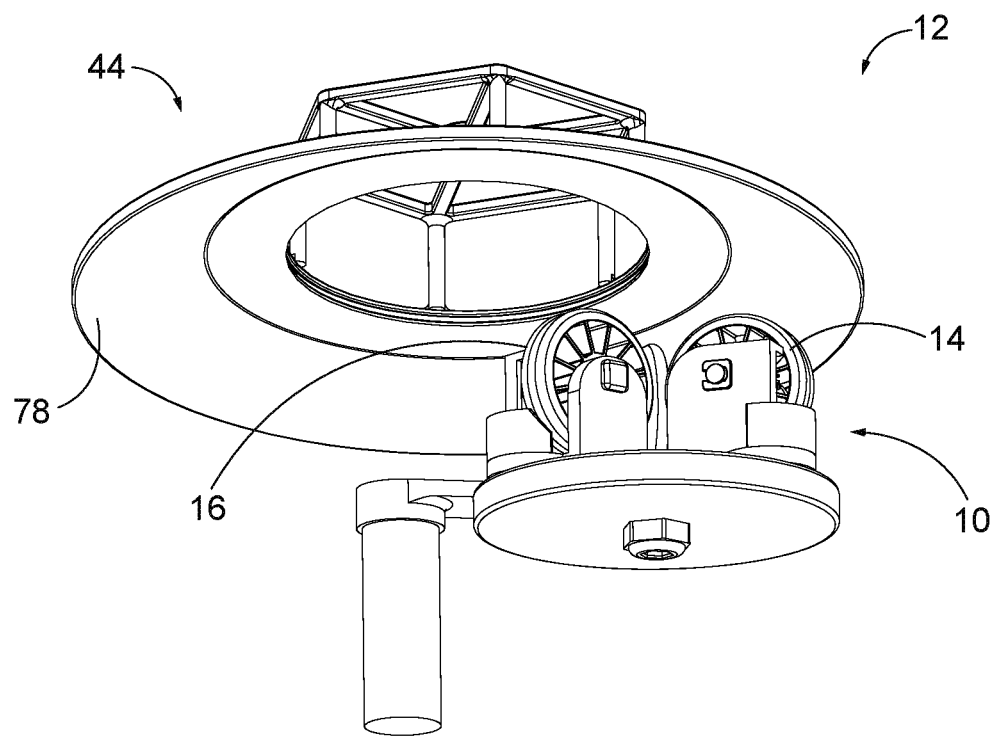
Figure 25:
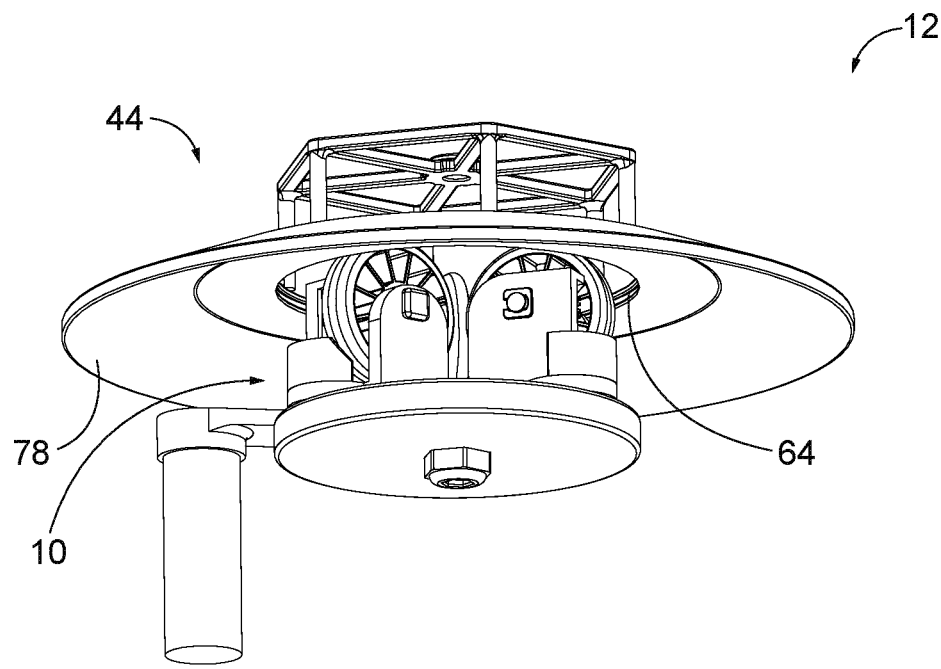
Figure 26:
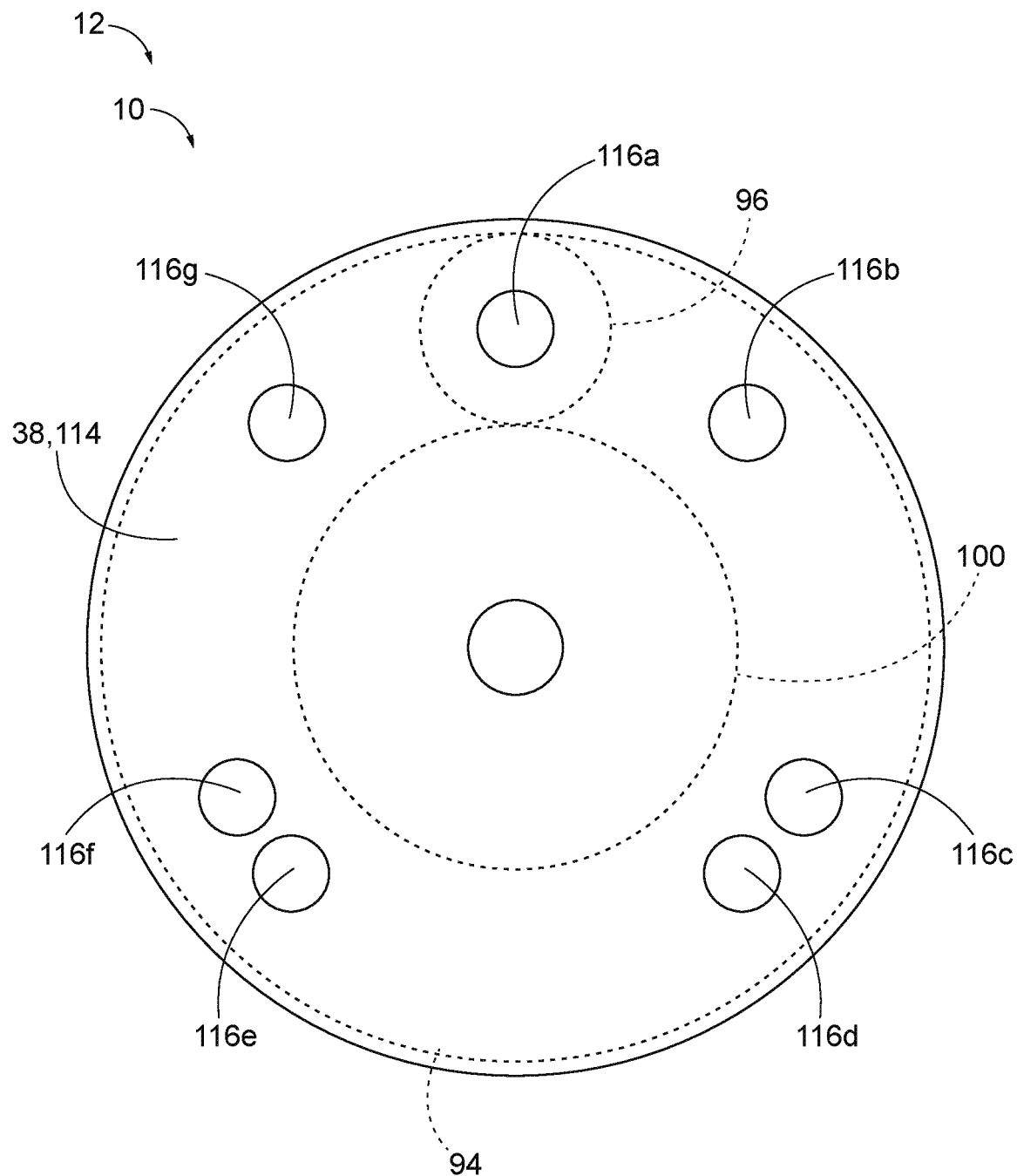
Figure 27:
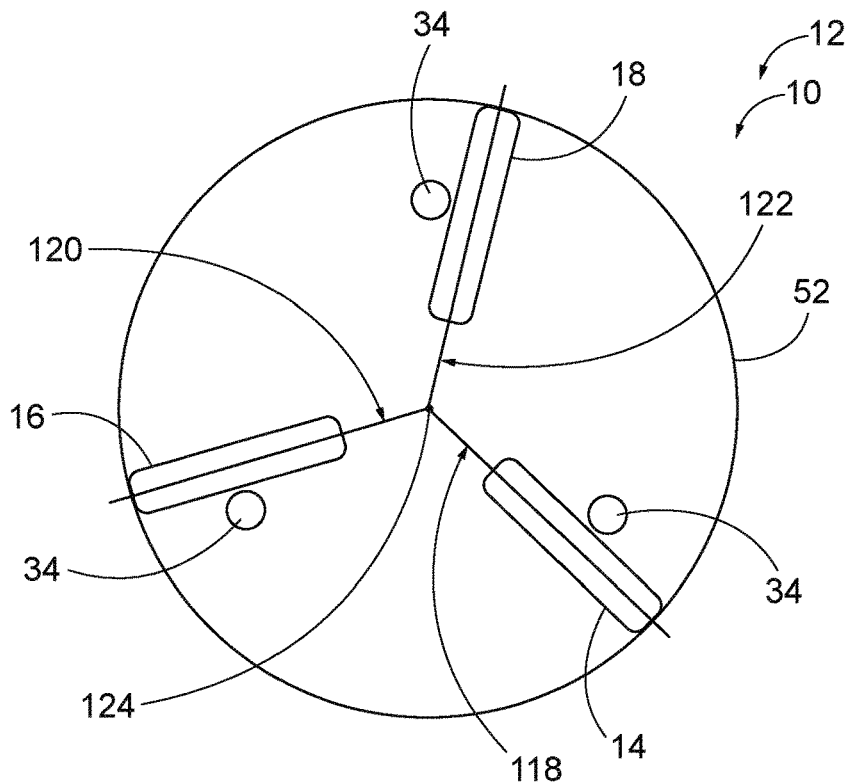
Figure 28:
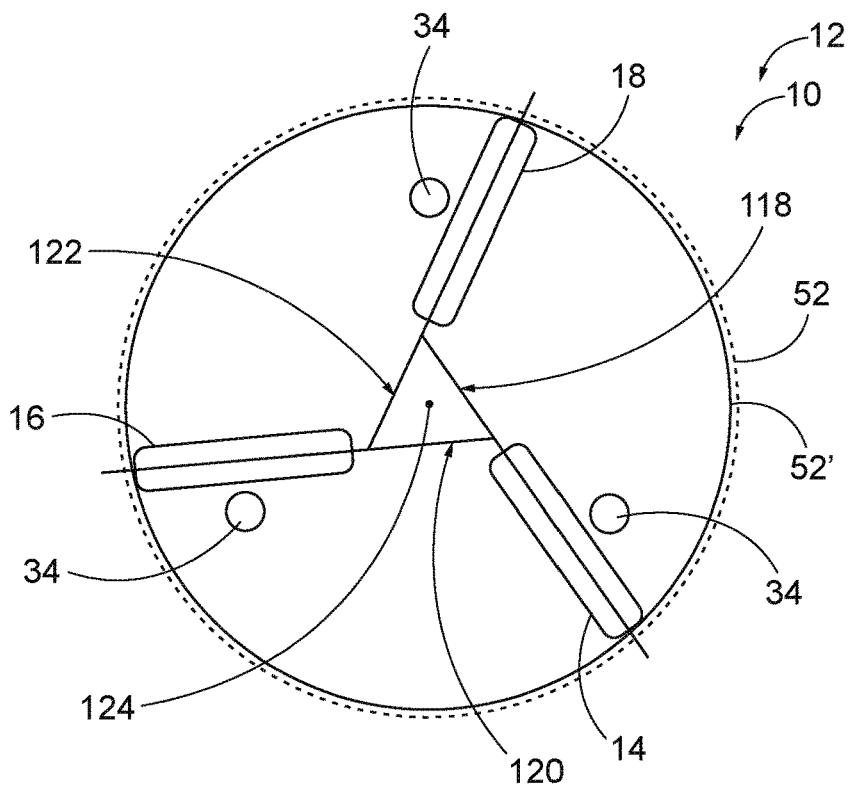
Figure 29:
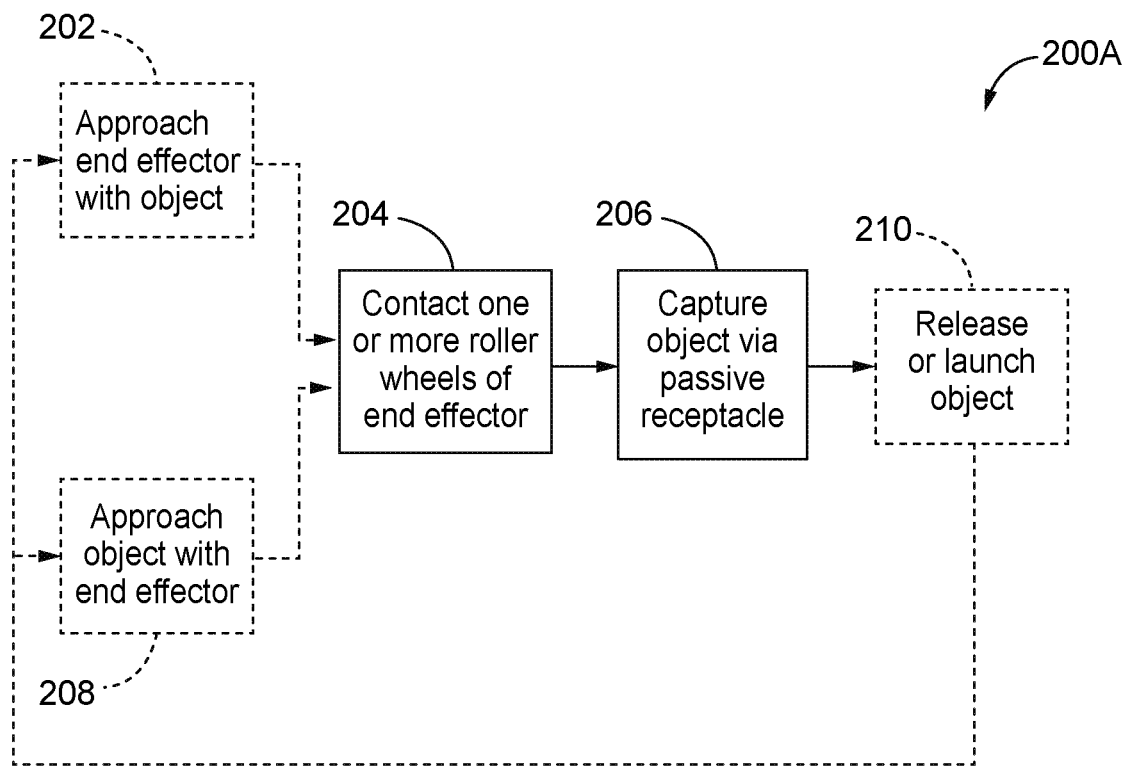
Figure 30:
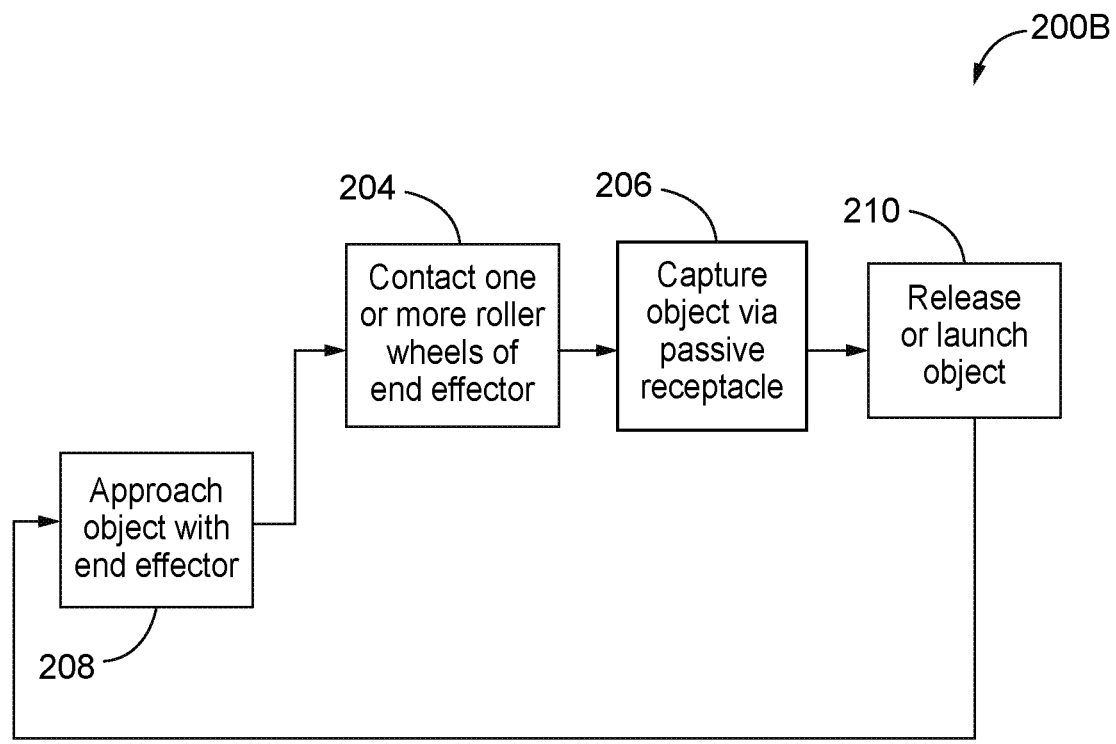
Figure 31:
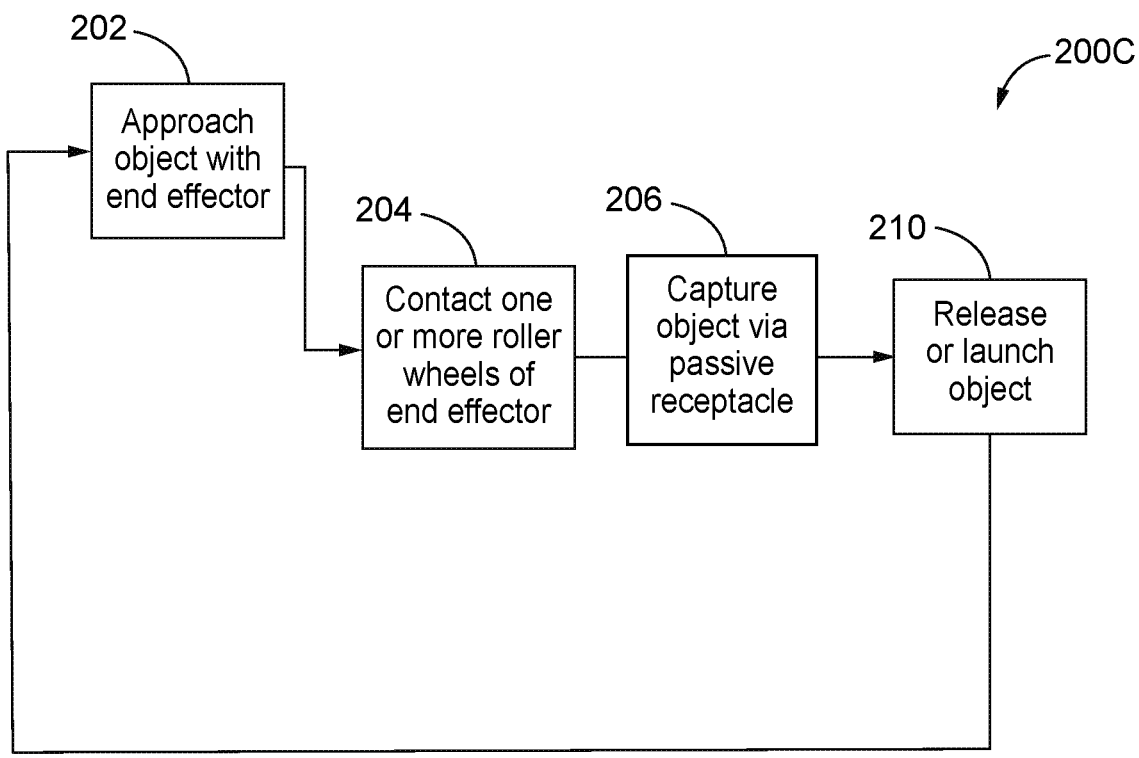
Figure 32A:
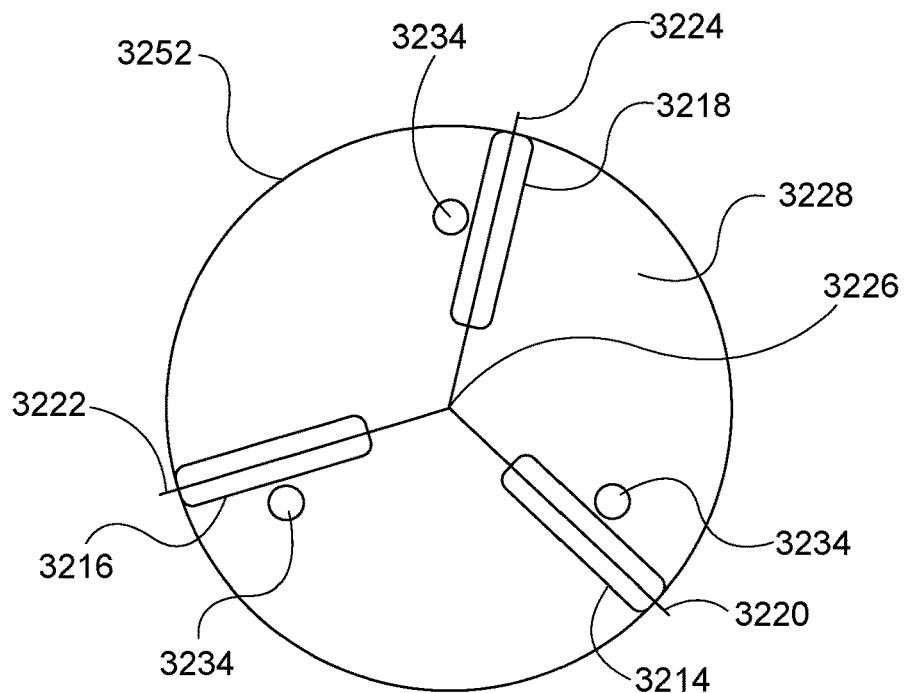
Figure 32B:
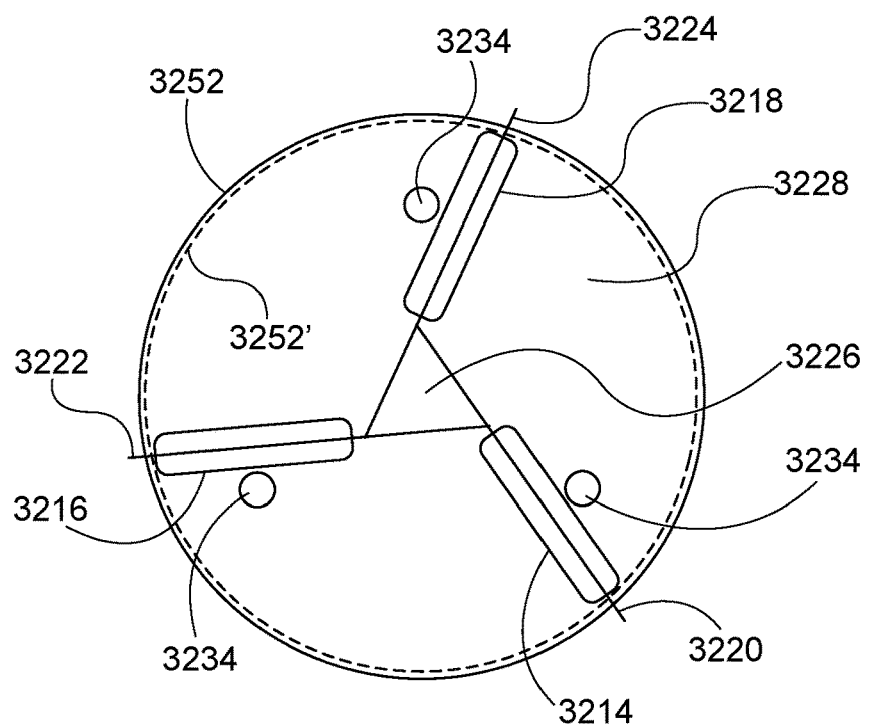
Figure 32C:
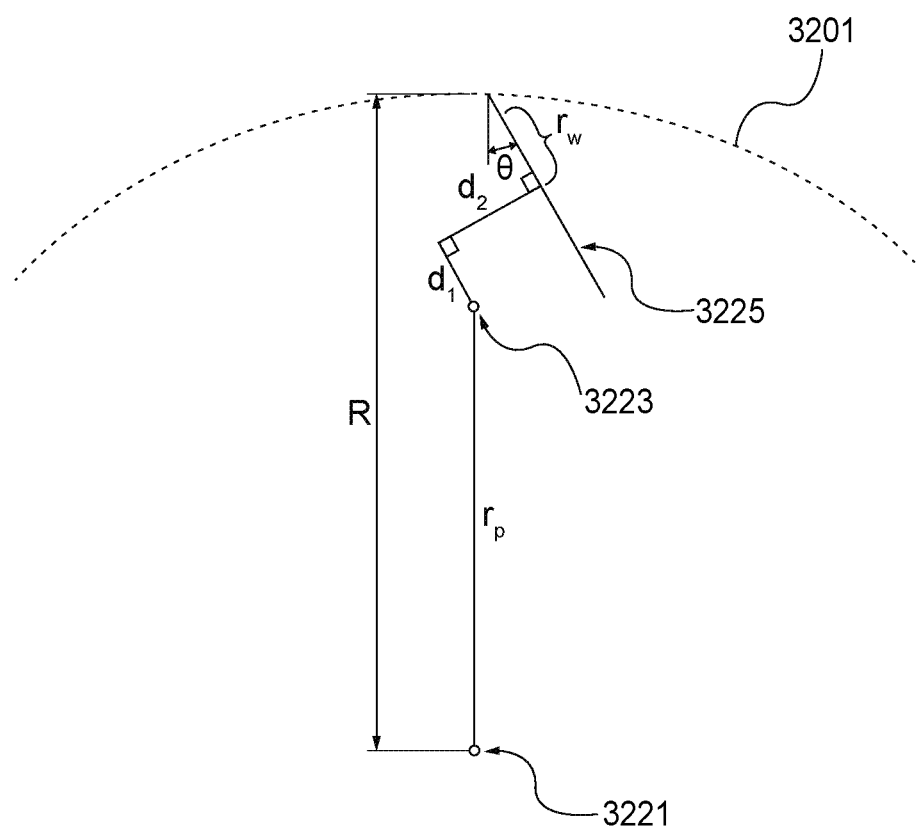
Figure 33A:
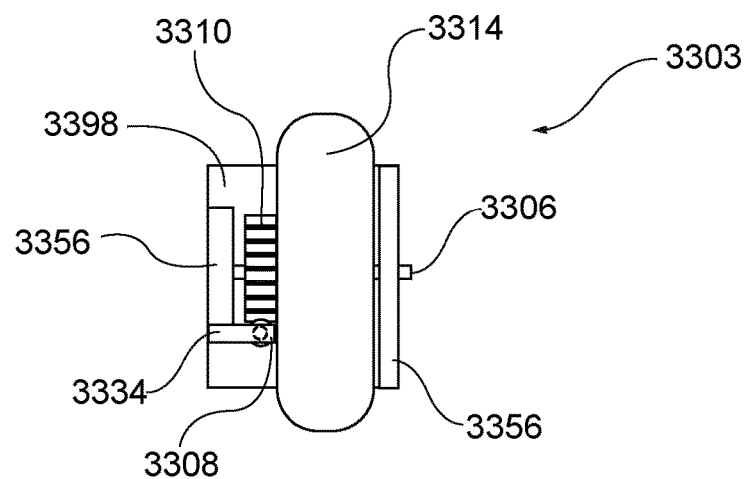
Figure 33B:
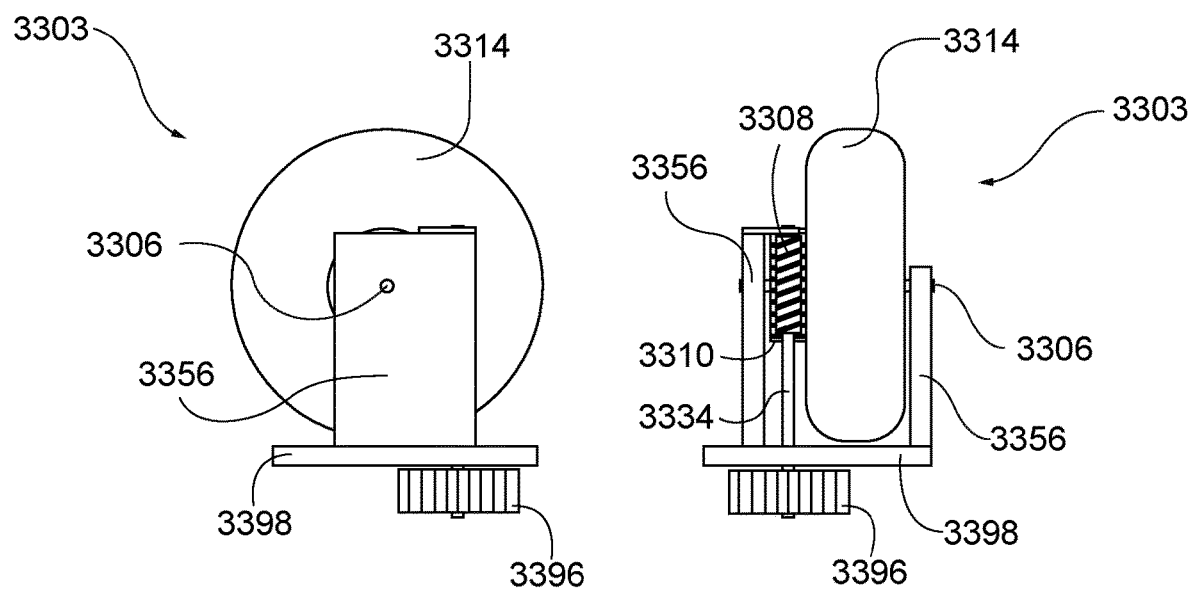
Figure 33C:
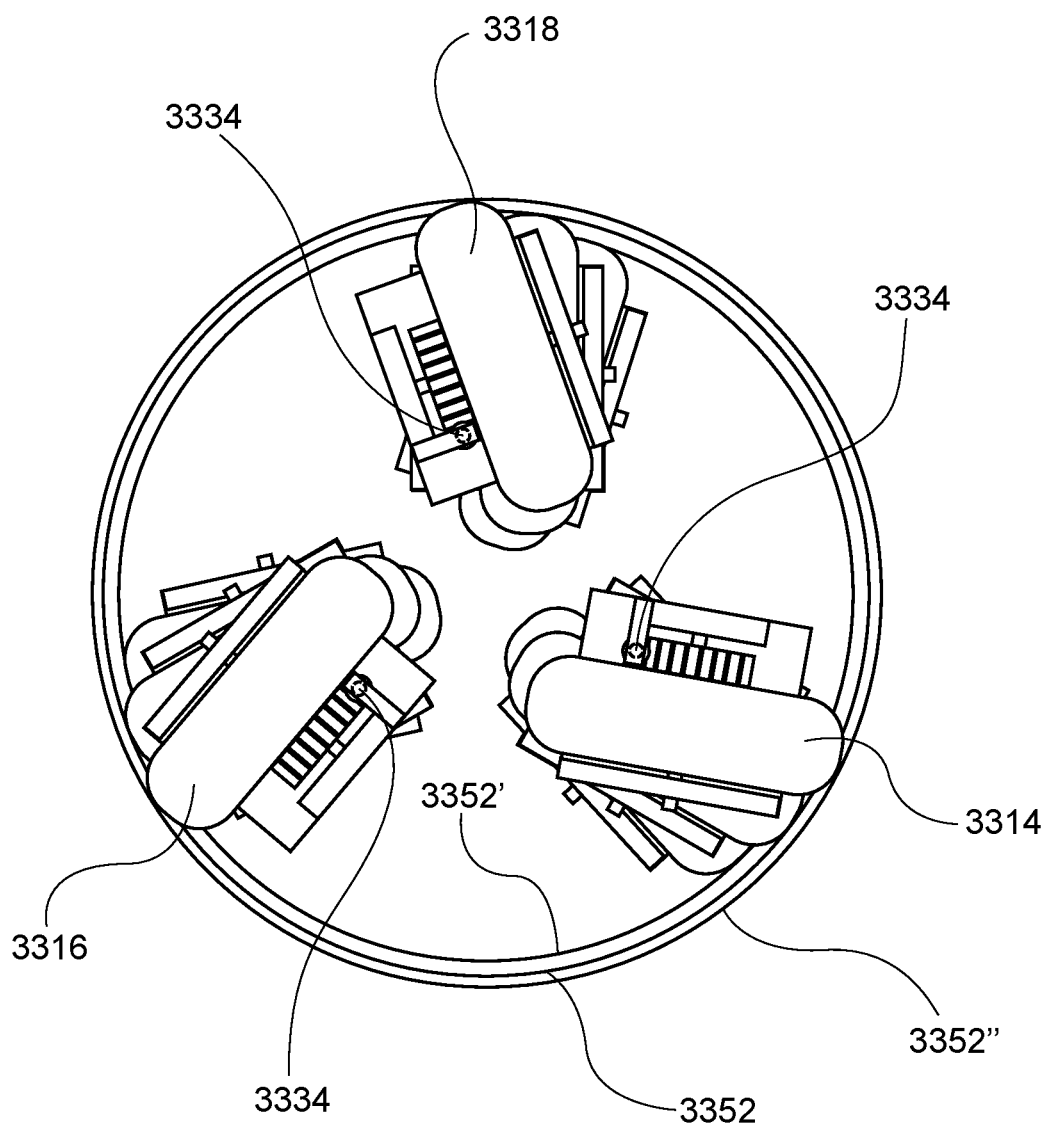
Figure 34A:
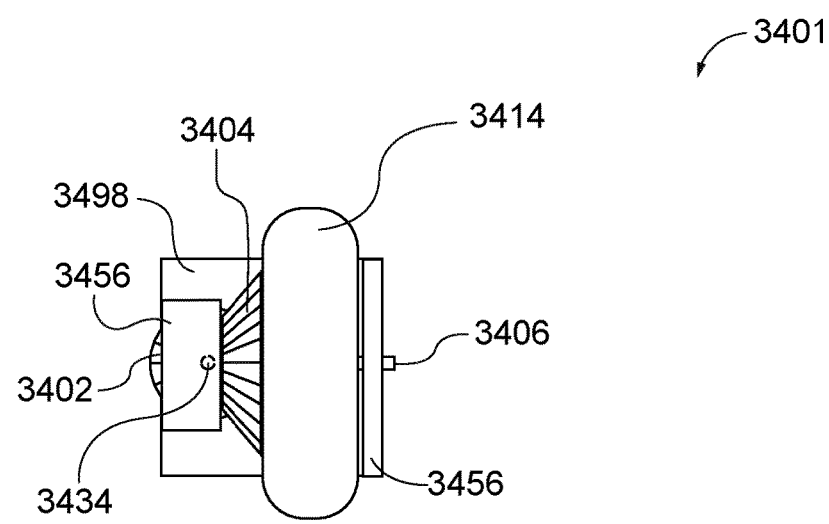
Figure 34B:
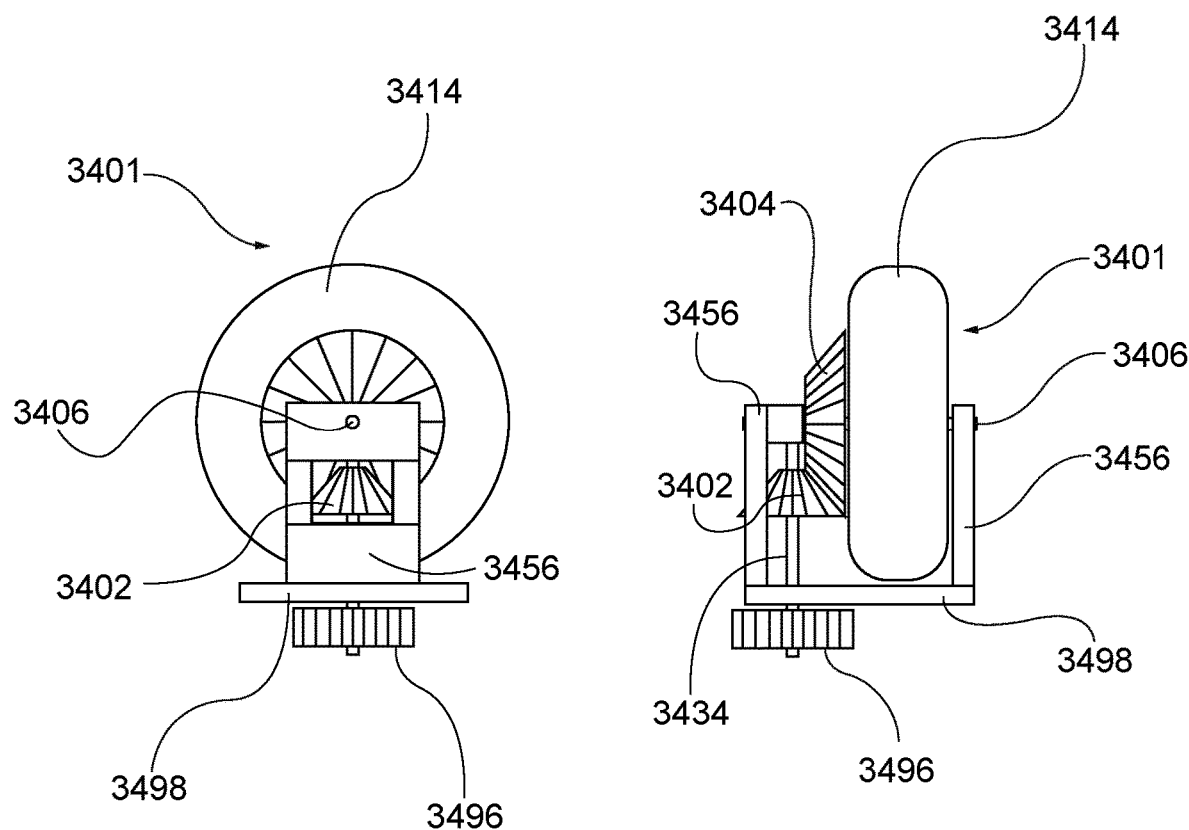
Figure 34C:
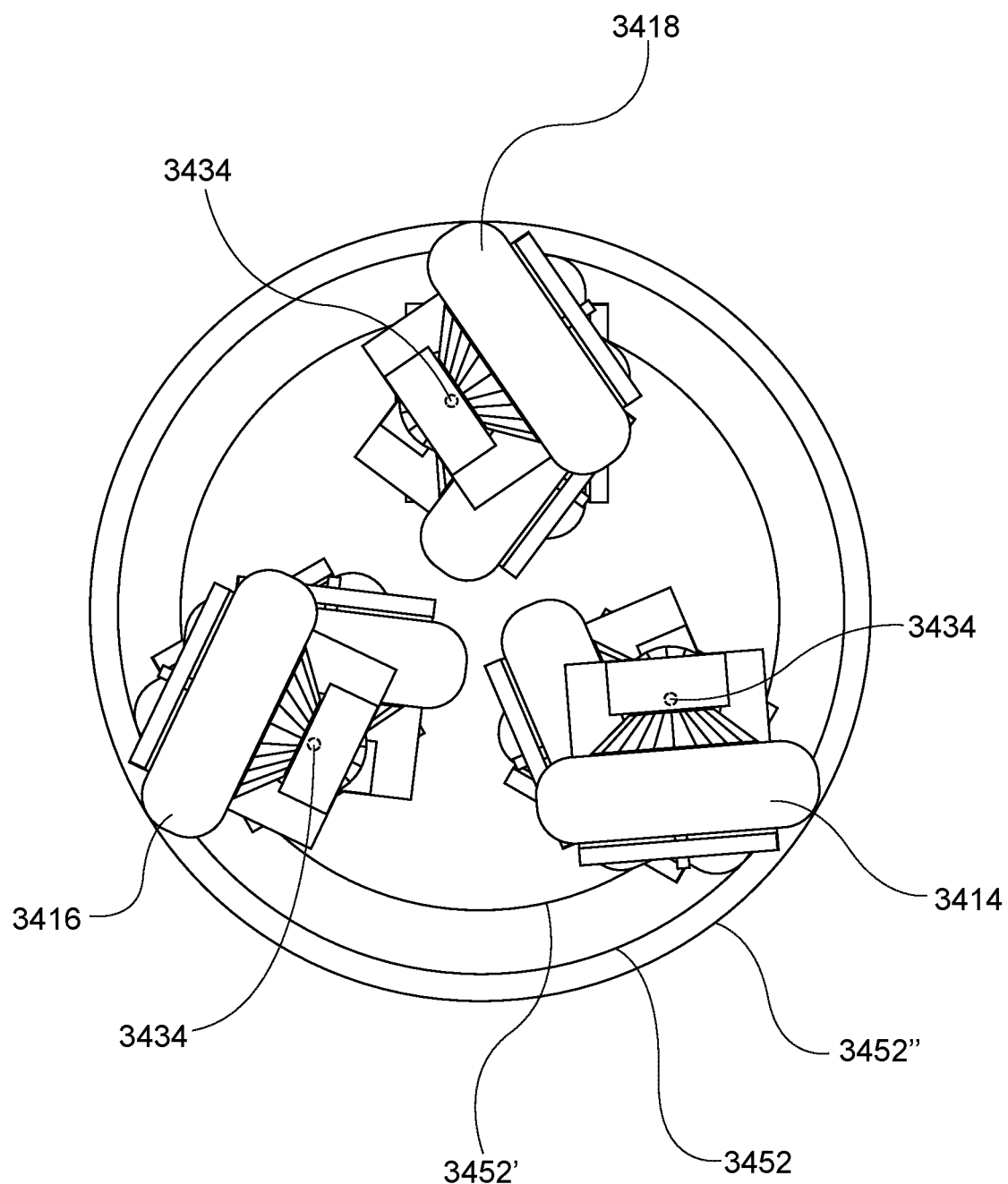
Figure 35A:
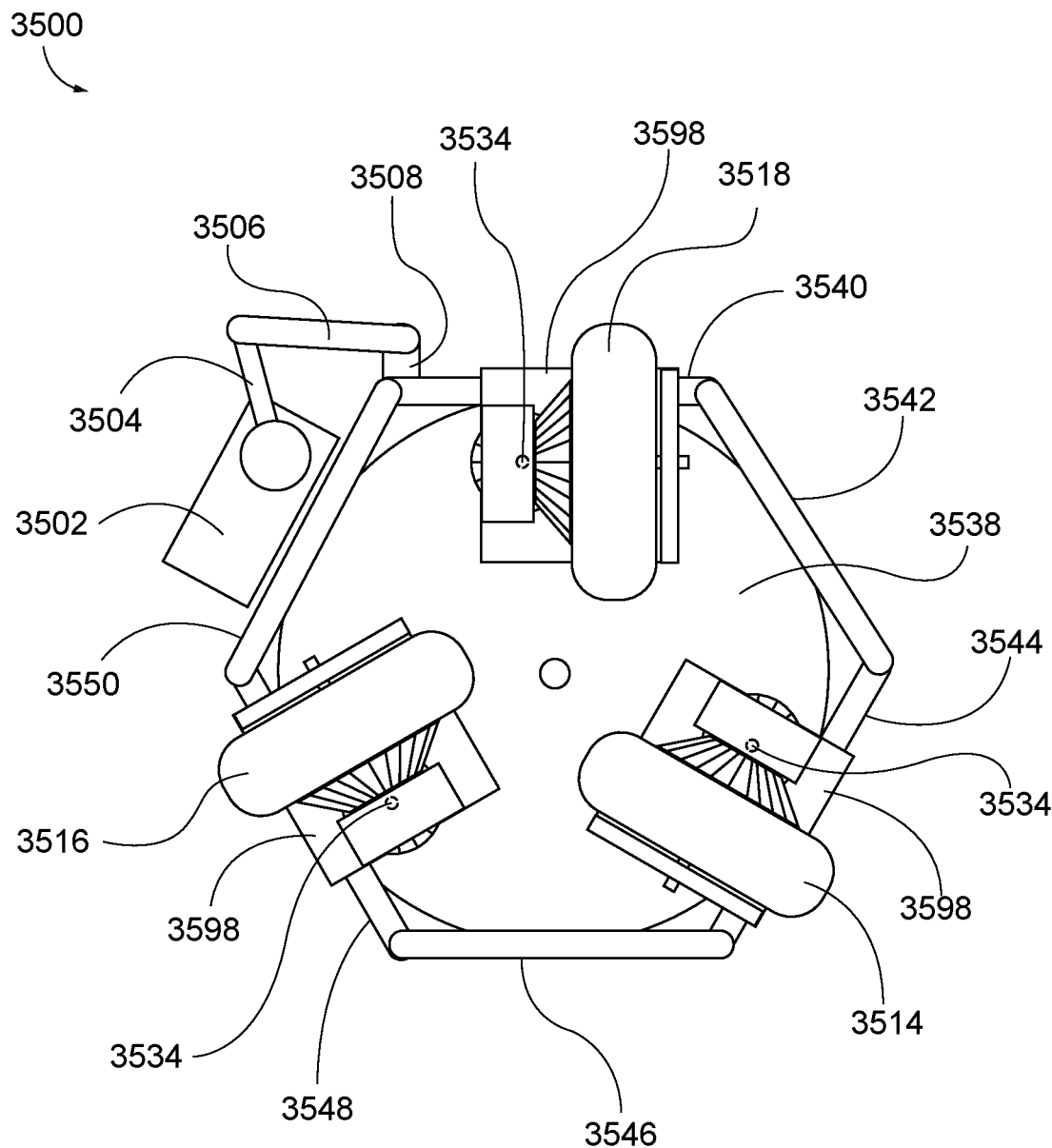
Figure 35B:
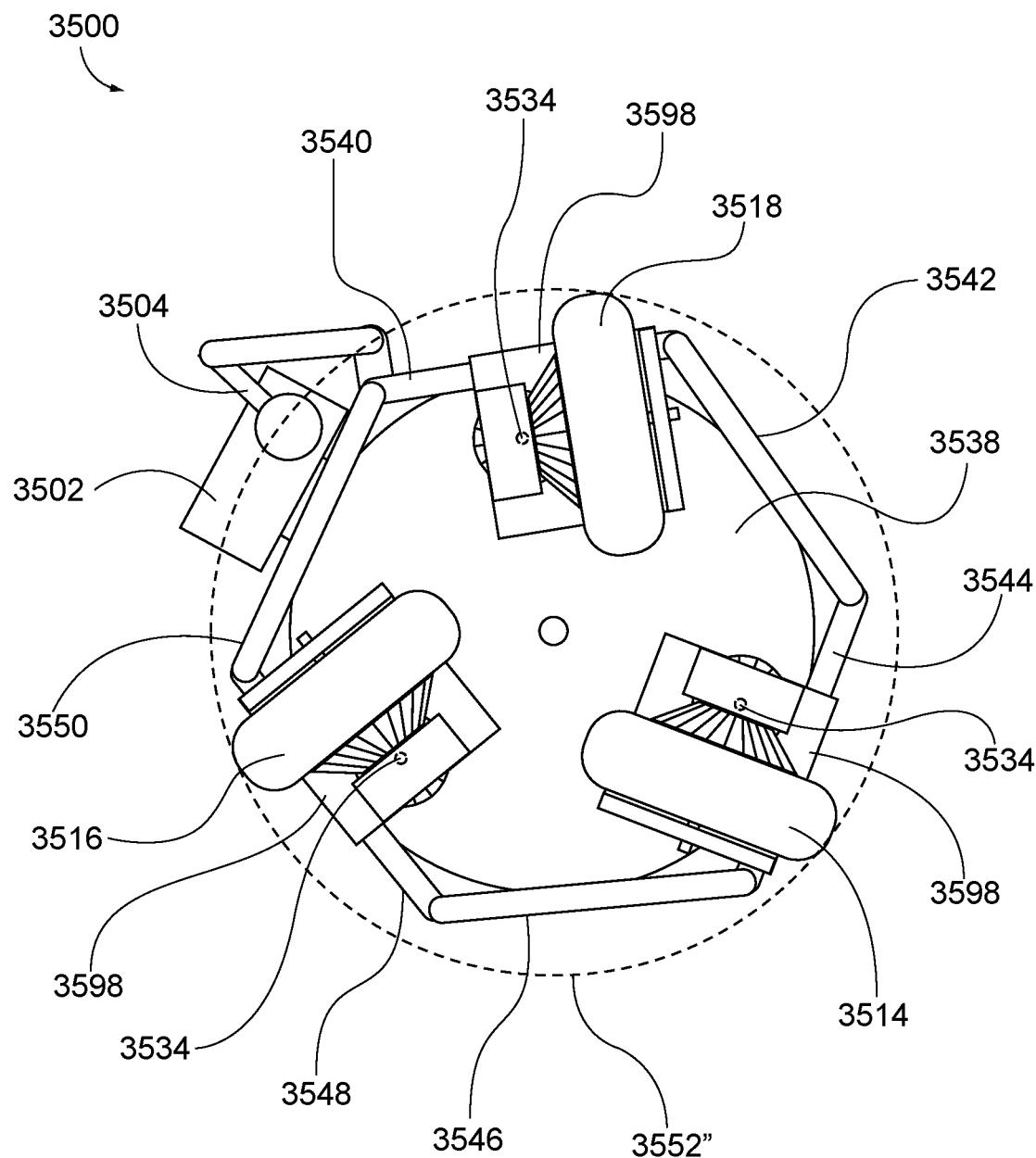
Figure 35C:
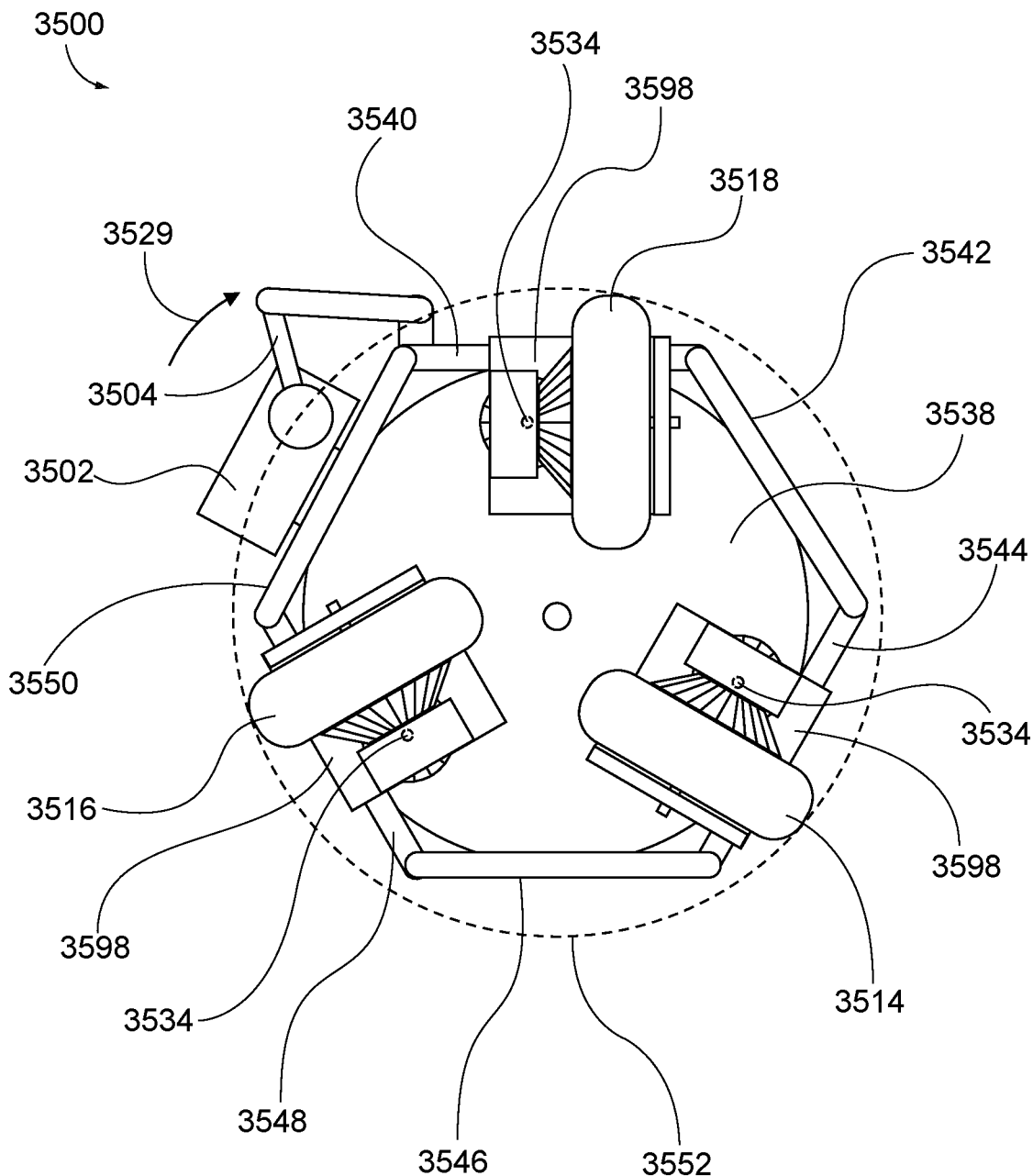
Figure 35D:
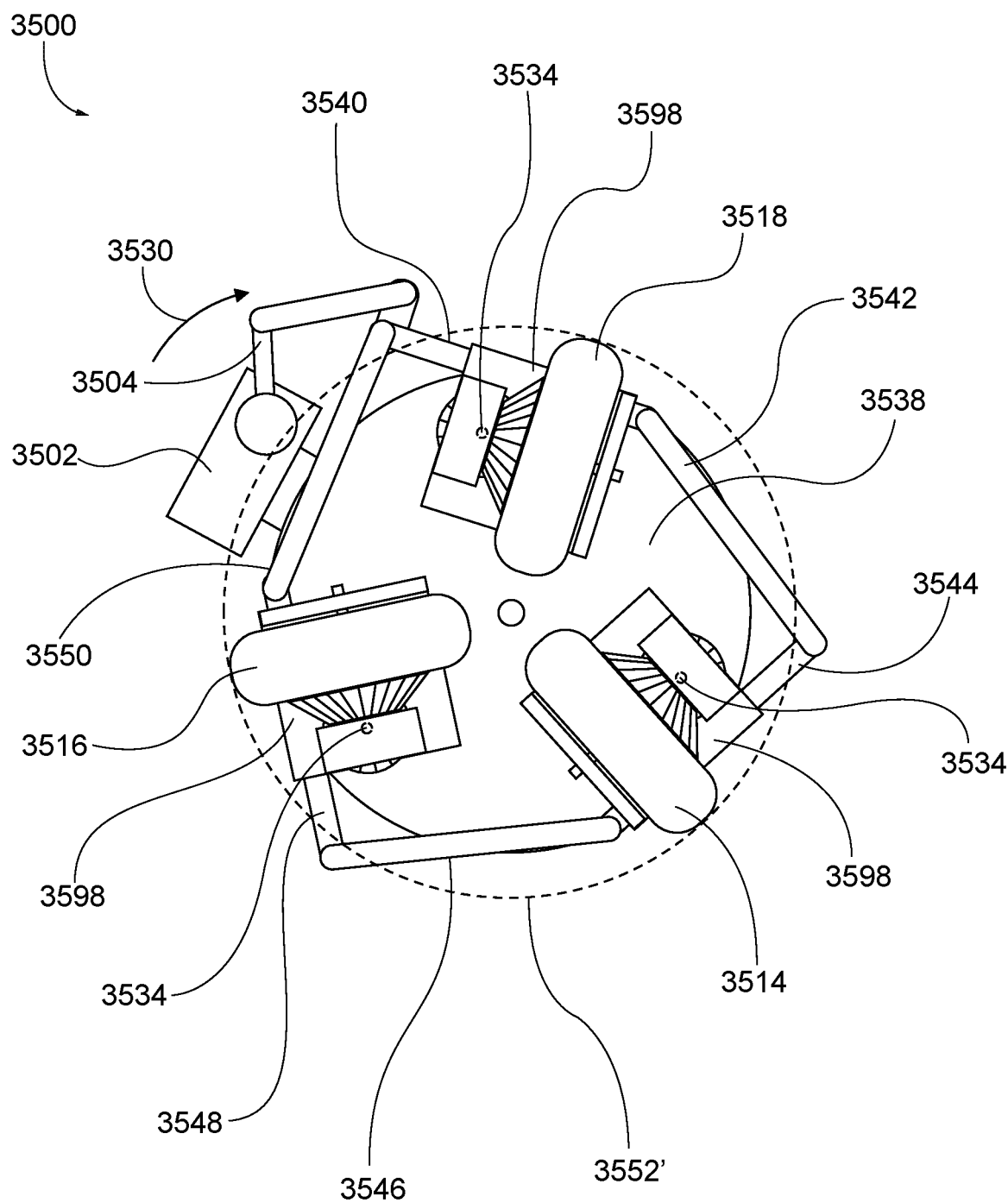
Figure 35E:
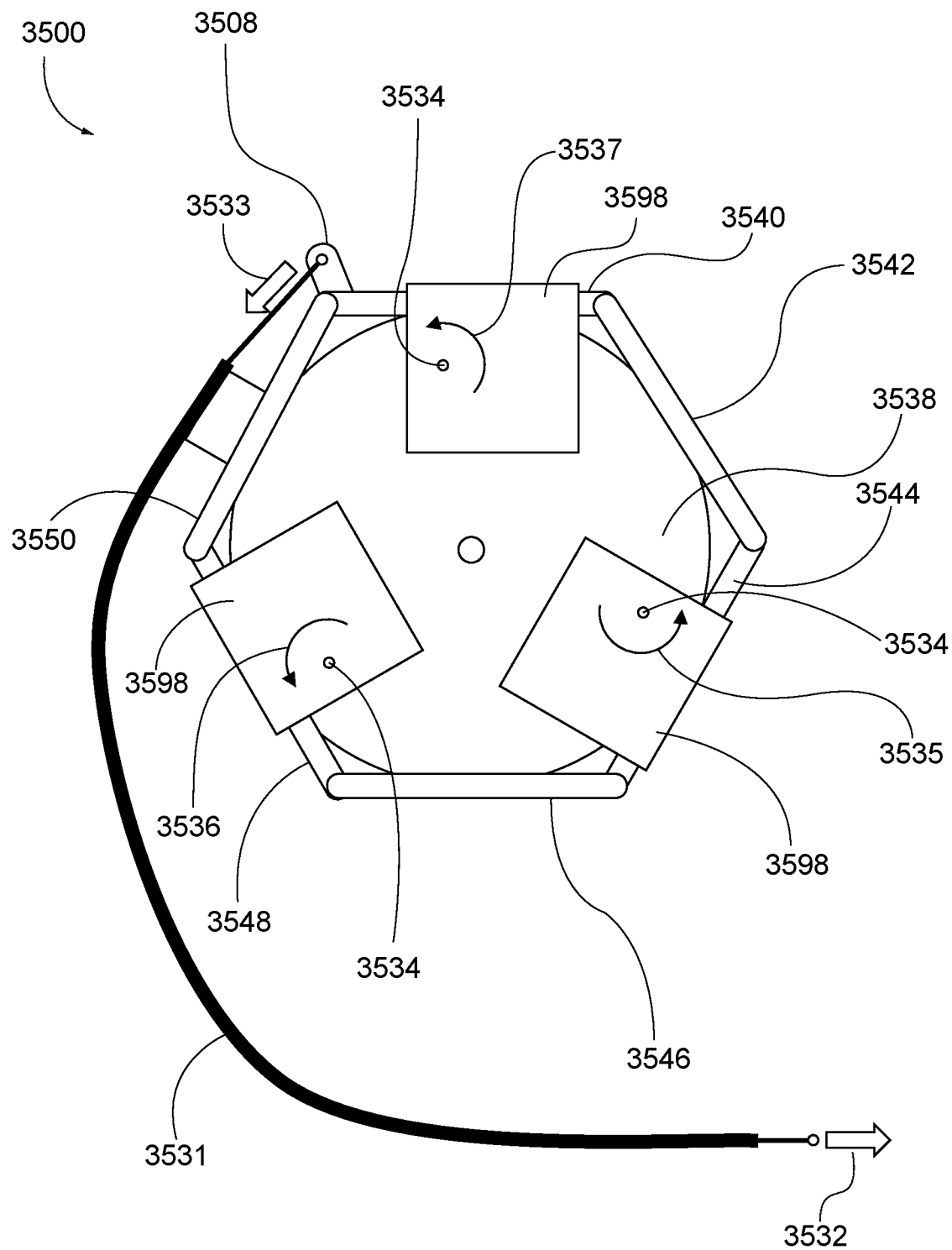
Figure 36A:
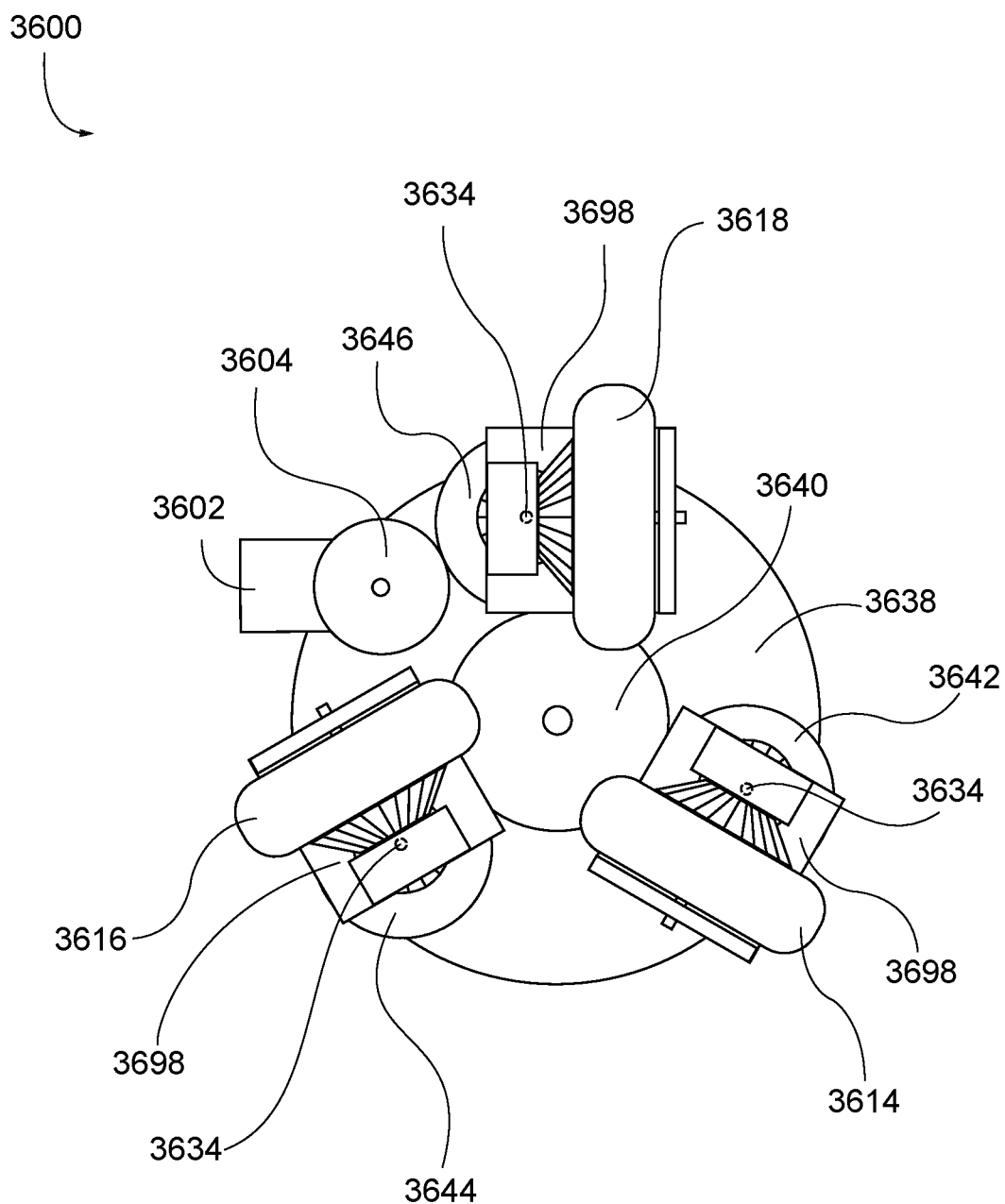
Figure 36B:
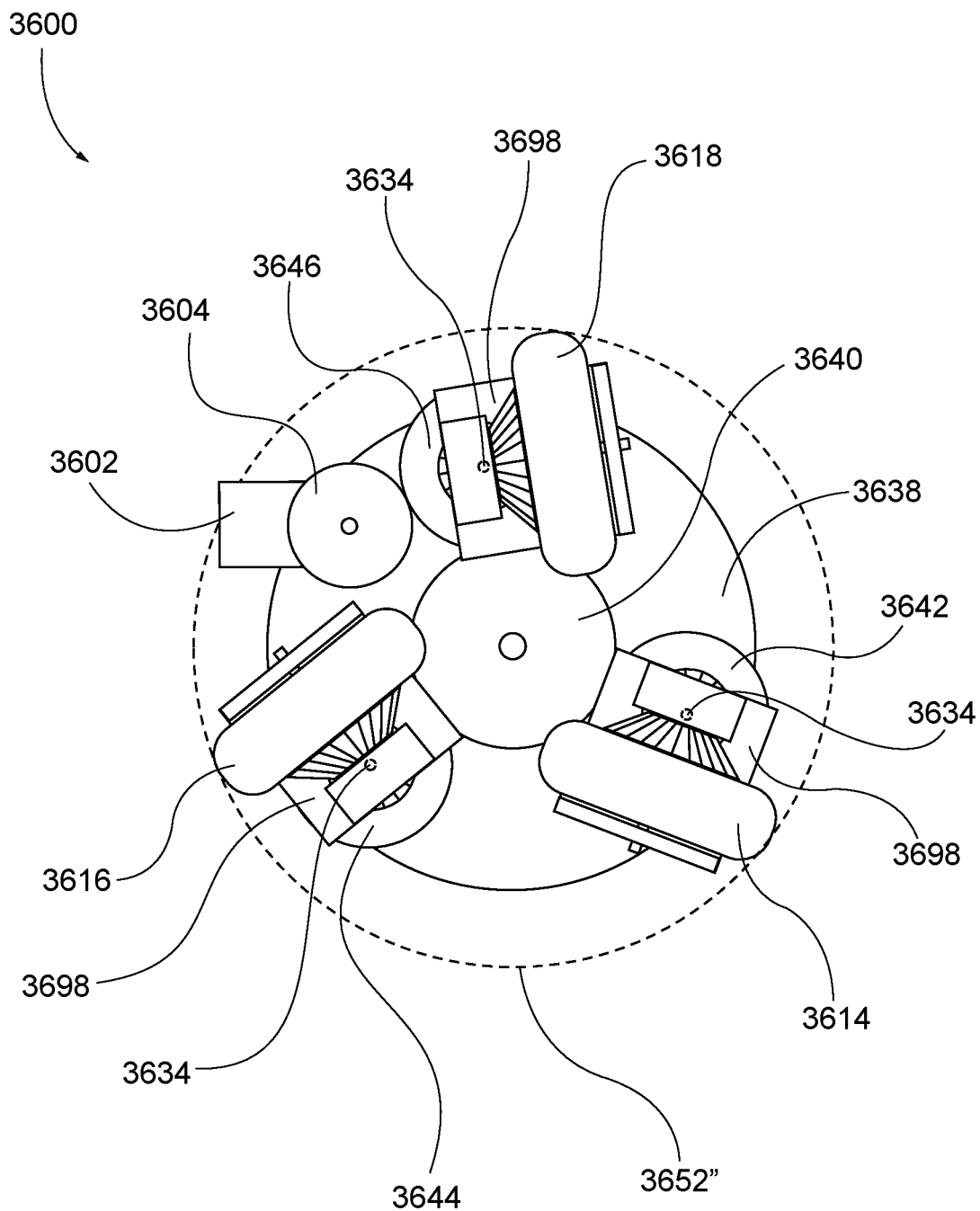
Figure 36C:
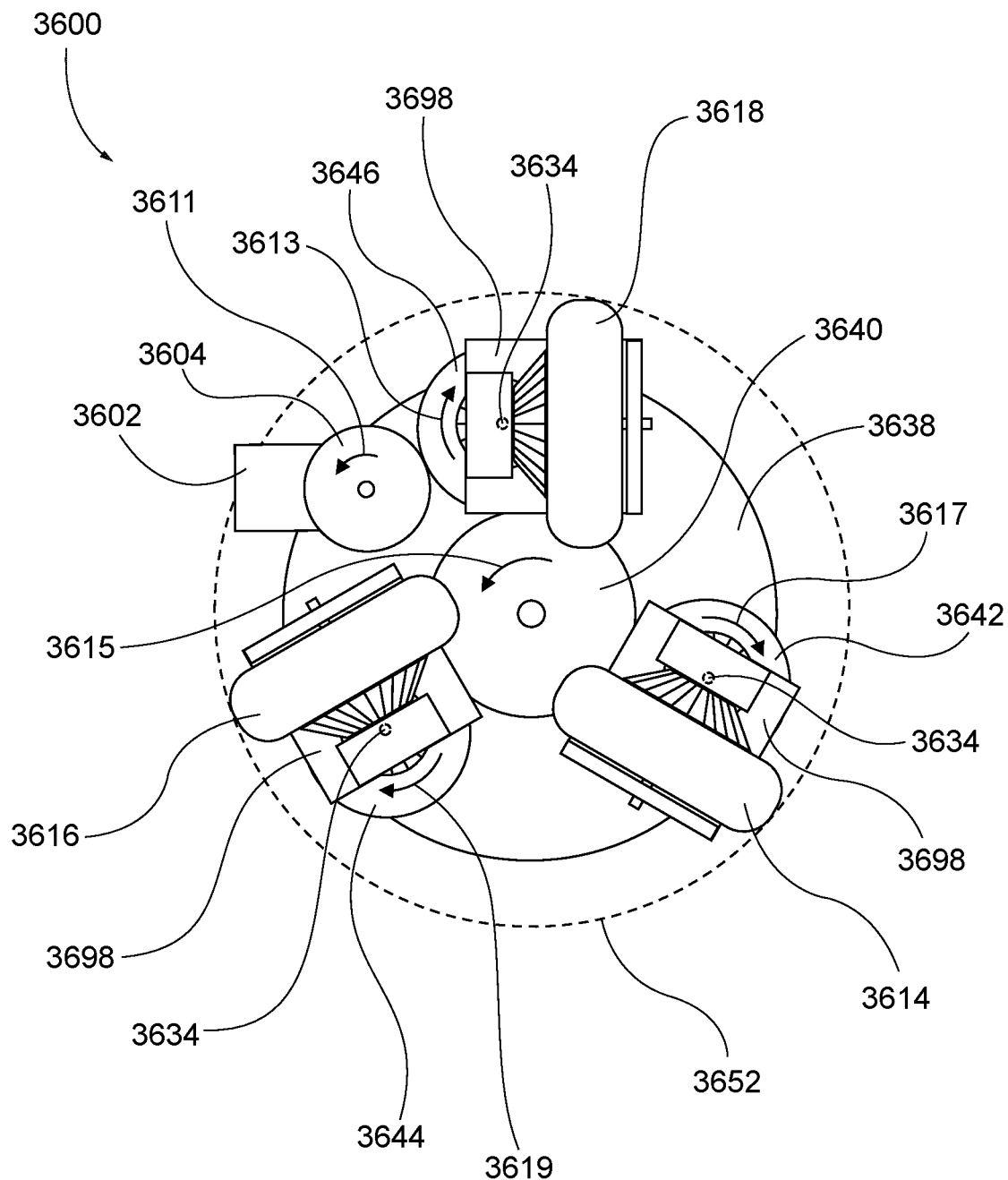
Figure 36D:
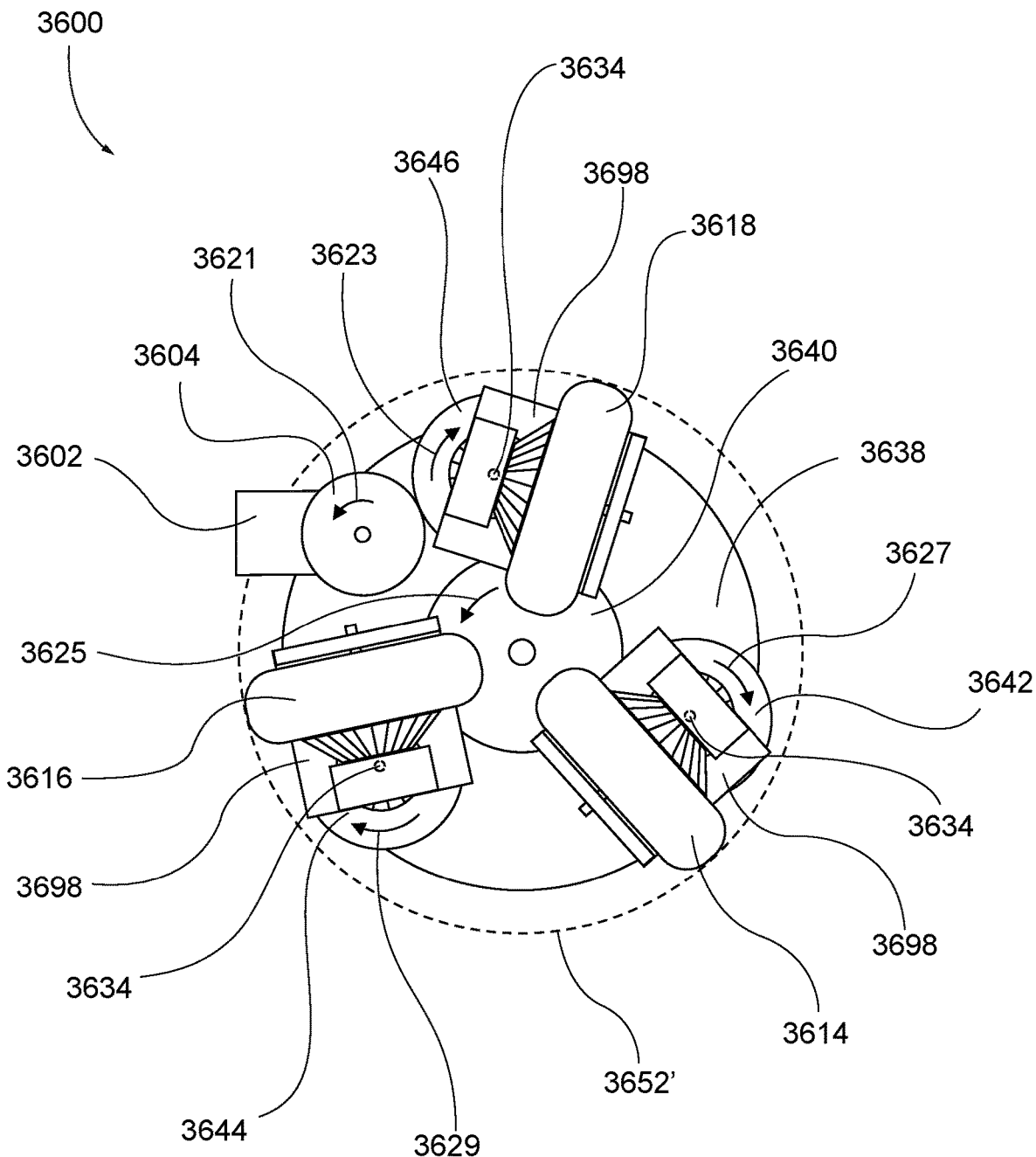
Figure 36E:
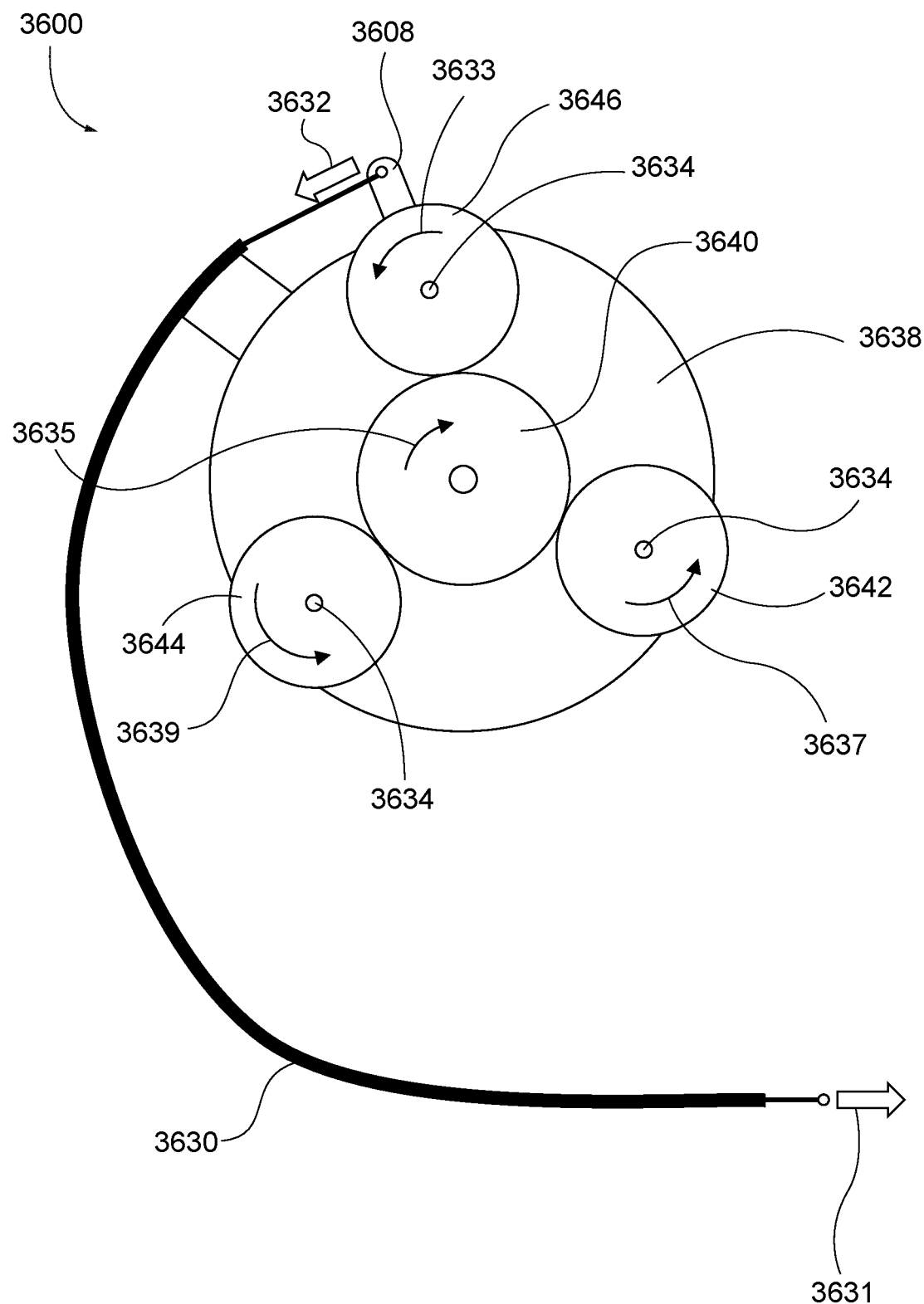
Figure 37A:
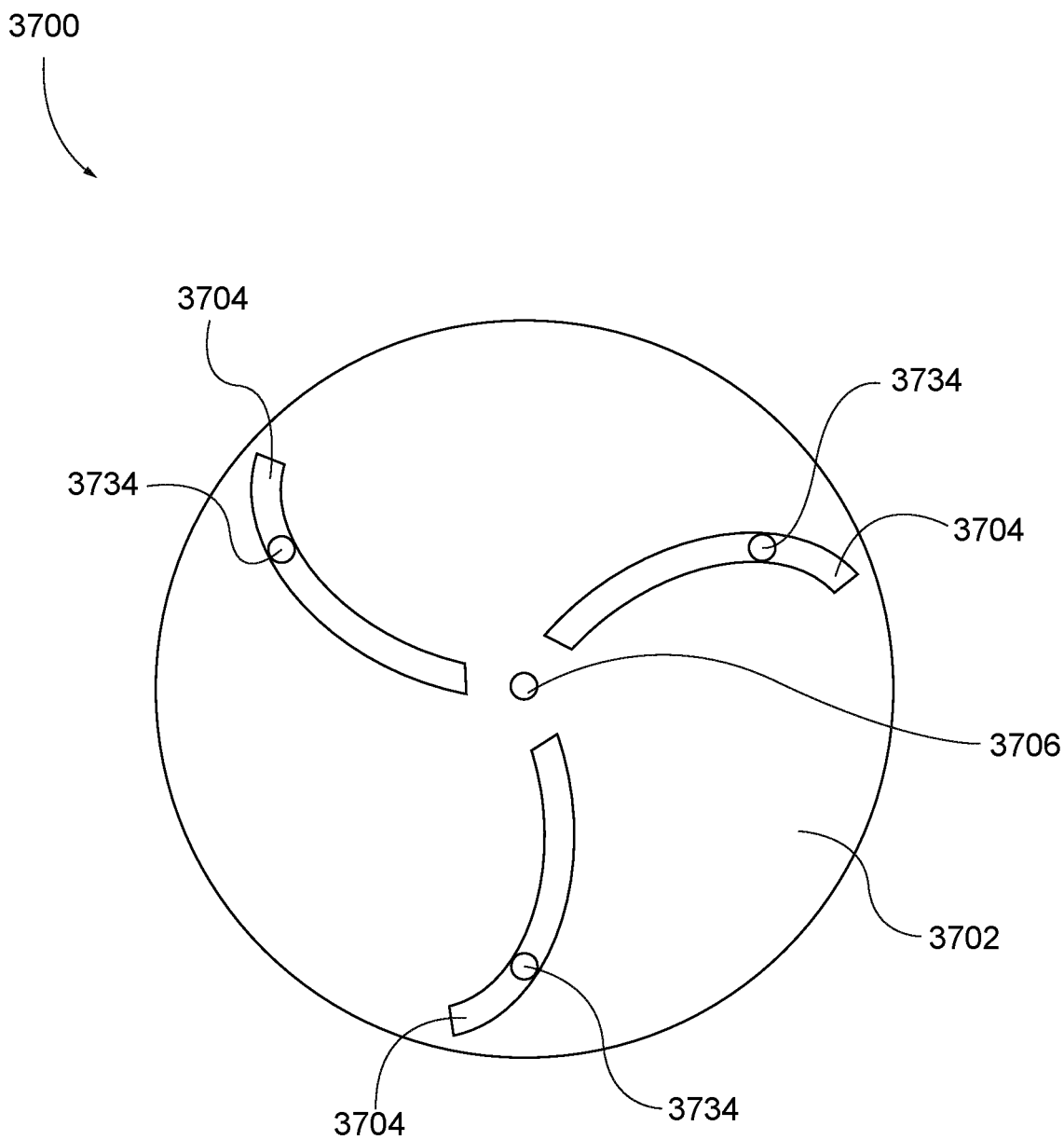
Figure 37B:
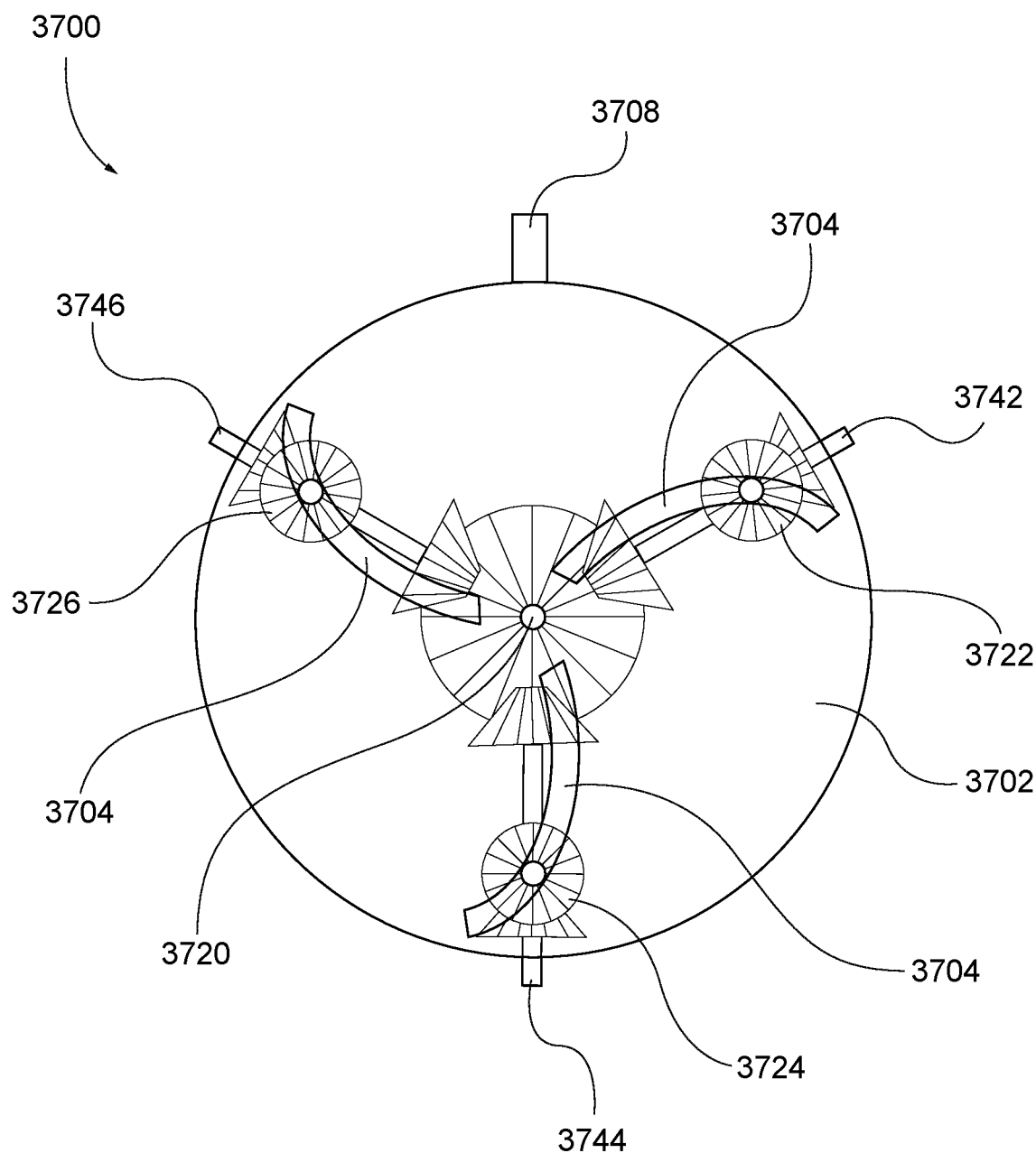
Figure 37C:
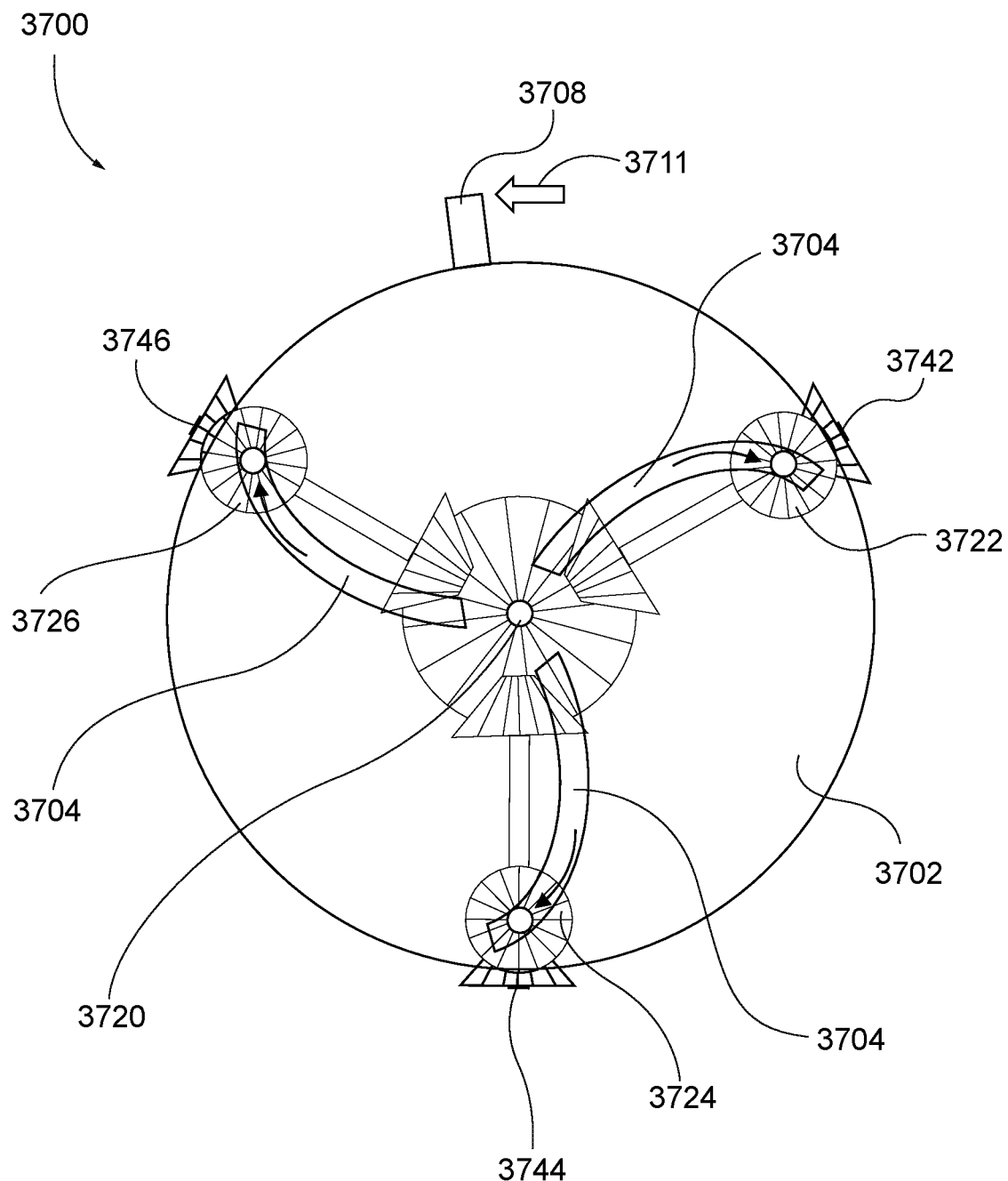
Figure 37D:
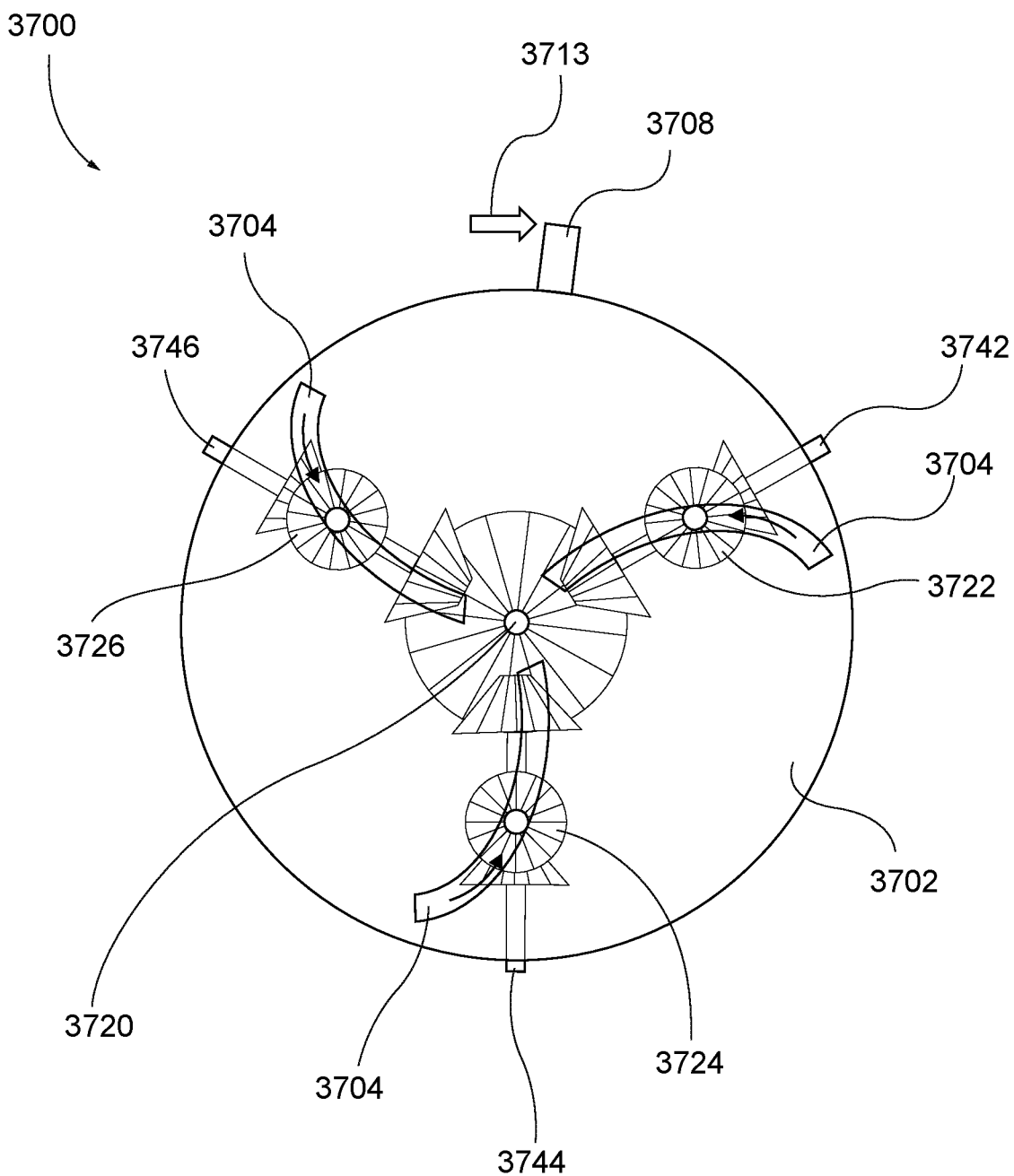
Figure 37E:
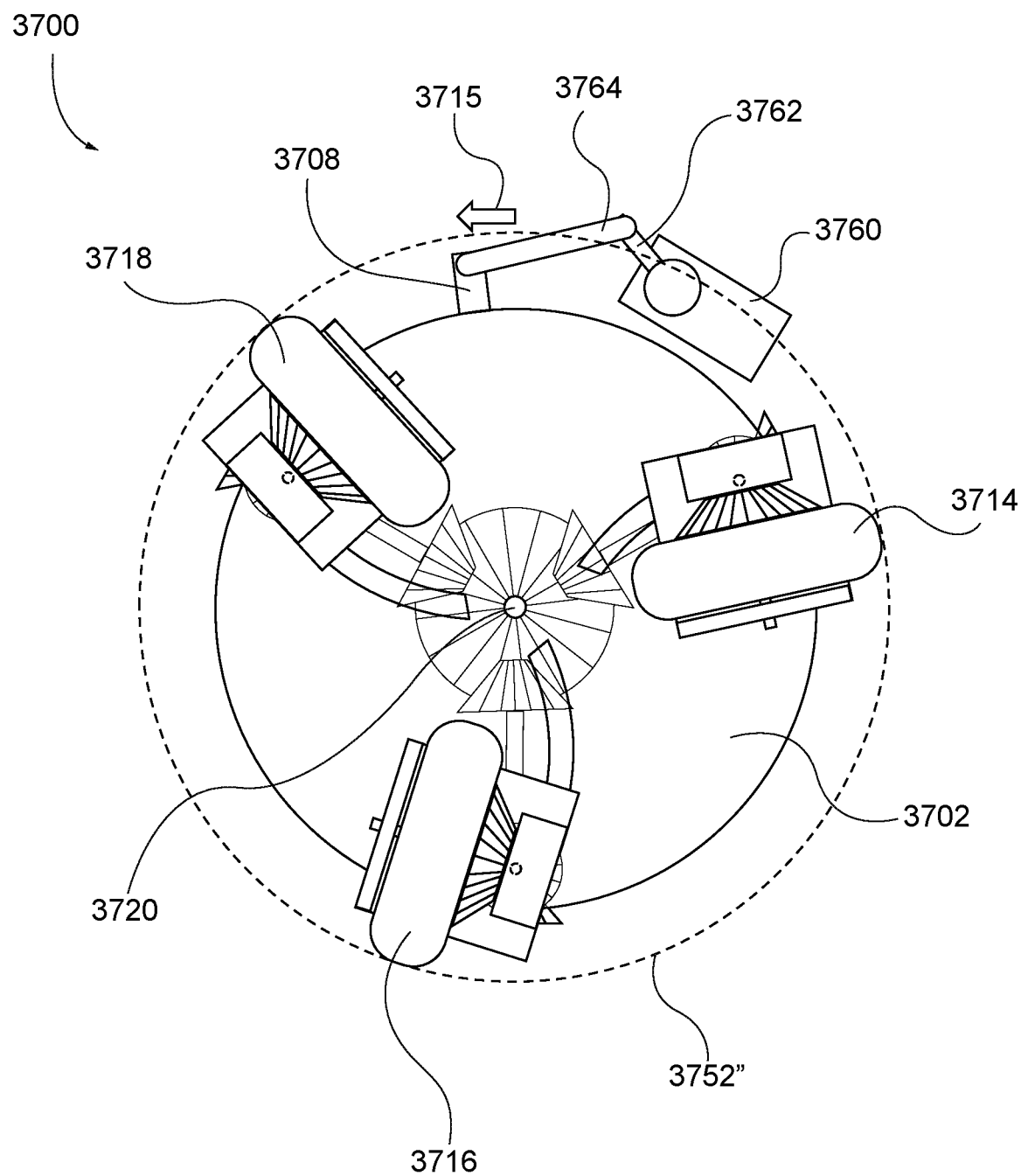
Figure 37F:
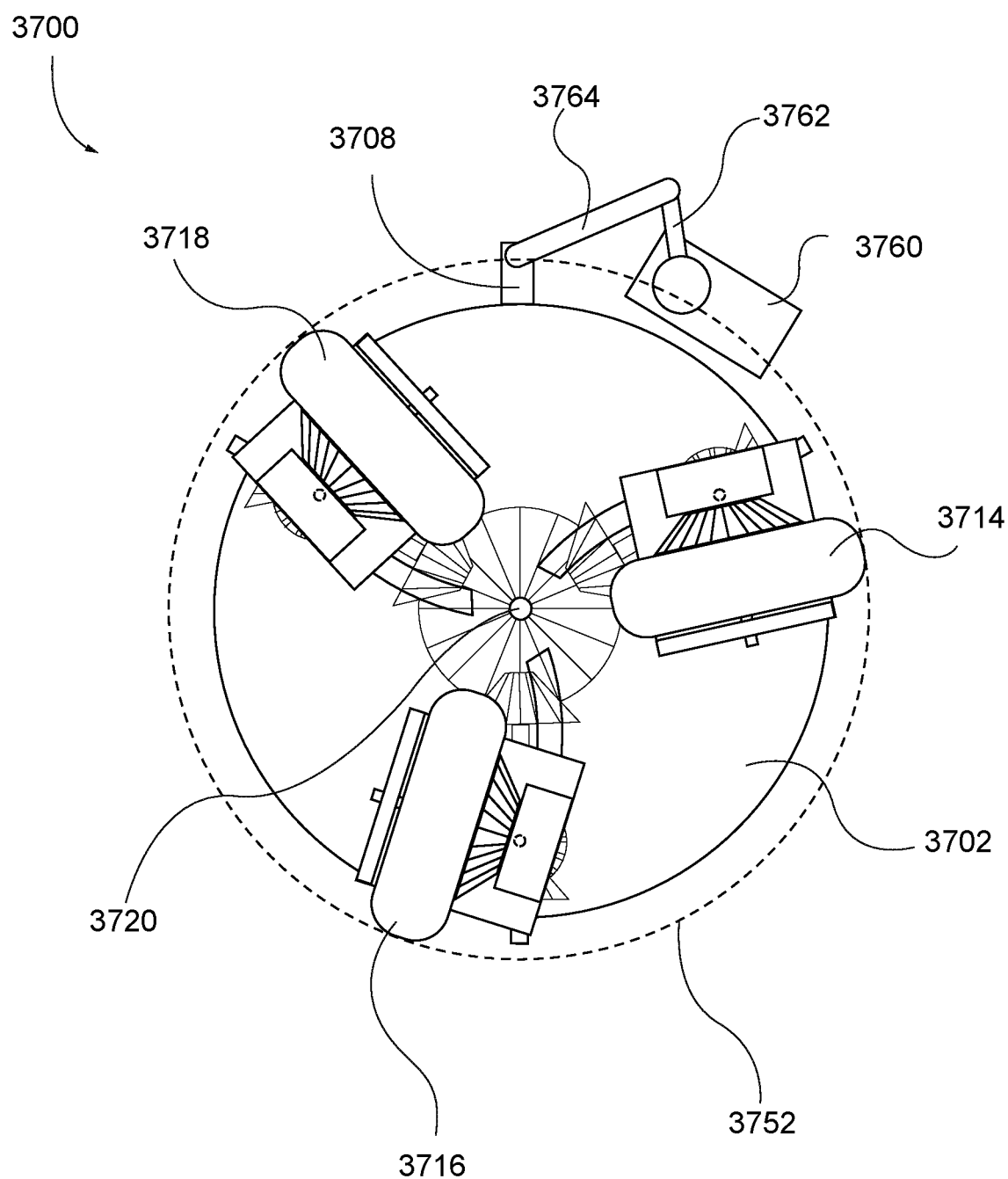
Figure 37G:
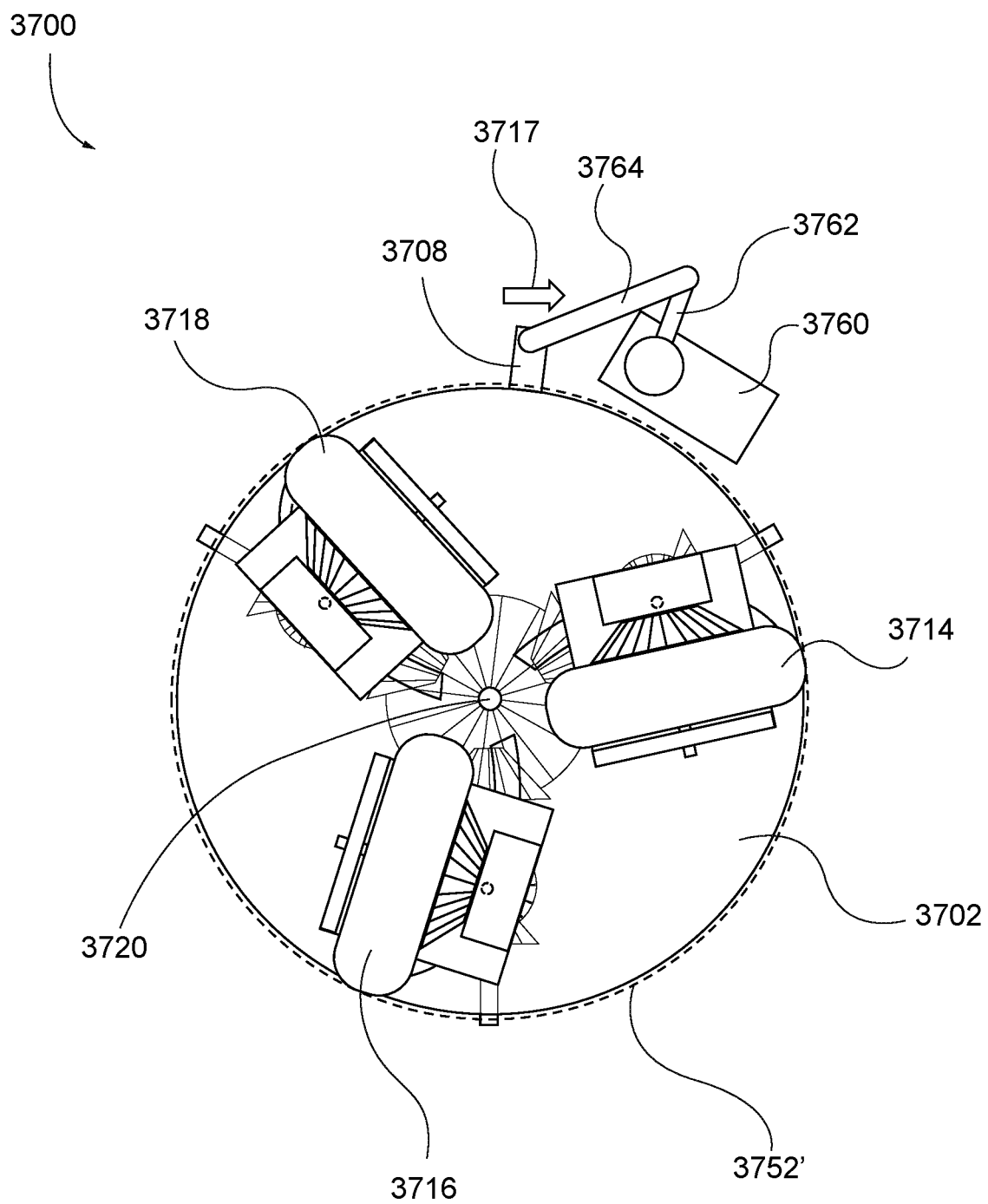

FIG. 14 a side elevational schematic representation of a passive receptacle in rotational misalignment with respect to an end effector, according to some examples of the disclosed apparatuses;

FIG. 15 shows a perspective view of an end effector with a post-type passive receptacle engaged therewith, according to some examples of the disclosed apparatuses;

FIG. 16 shows a side elevational view of an end effector having individual motors for each respective roller wheel of the end effector, according to some examples of the disclosed apparatuses;

FIG. 17 shows a perspective view of an end effector having a single drive motor configured to drive three roller wheels of the end effector, according to some examples of the disclosed apparatuses;

FIG. 18 shows a top plan schematic representation of an external drive gear variation of end effectors, having an external control gear ring and a plurality of radially spaced spur gears configured to drive the roller wheels, according to some examples of the disclosed apparatuses;

FIG. 19 shows a top plan schematic representation of an internal drive gear variation of presently disclosed end effectors, having a central control gear and a plurality of radially spaced spur gears configured to drive the roller wheels, according to some examples of the disclosed apparatuses;

FIG. 20 shows a side elevational view of an example wheel module of an end effector, showing a bevel gear implementation for driving a roller wheel, according to some examples of the disclosed apparatuses;

FIG. 21 shows a side elevational view of an example wheel module of an end effector, showing a worm gear implementation for driving a roller wheel, according to some examples of the disclosed apparatuses;

FIG. 22 shows a side elevational view of a passive receptacle engaging with an end effector, according to some examples of the disclosed apparatuses;

FIG. 23 shows a side elevational view of a UAV engaging with an end effector via a passive receptacle, according to some examples of the disclosed apparatuses;

FIG. 24 shows a perspective view of an end effector configured to correct for position misalignment of a passive receptacle, according to some examples of the disclosed apparatuses;

FIG. 25 shows the passive receptacle and end effector of FIG. 24, with the passive receptacle engaging with the end effector, according to some examples of the disclosed apparatuses;

FIG. 26 shows a top plan schematic representation of a modular central hub for end effectors, according to some examples of the disclosed apparatuses;

FIG. 27 shows a top plan schematic representation of an end effector configured to be selectively adjustable (e.g., set manually before use) for various ring-type receptacle sizes and/or angles of roller wheels, shown in a first configuration, according to some examples of the disclosed apparatuses;

FIG. 28 shows a top plan schematic representation of the end effector of FIG. 27, shown in a second configuration, according to some examples of the disclosed apparatuses;

FIGS. 29-31 show schematic flowchart diagrams illustrating some examples of the disclosed methods;

FIG. 32A shows a top plan schematic representation of an end effector configured to be adjusted in real-time for various ring-type receptacle sizes and/or angles of roller wheels, shown in a first configuration, according to some examples of the disclosed apparatuses;

FIG. 32B shows a top plan schematic representation of the end effector of FIG. 32A, shown in a second configuration, according to some examples of the disclosed apparatuses;

FIG. 32C shows a top plan view of a portion of an outer capture circle, illustrating an example calculation for the radius of the outer capture circle when a roller wheel is pivoted relative to a radial direction of the outer capture circle;

FIG. 33A shows a top plan view of an example wheel module of an end effector, showing a worm gear implementation for driving a roller wheel, according to some examples of the disclosed apparatuses;

FIG. 33B shows side elevational views of the example wheel module of the end effector of FIG. 33A, showing the worm gear implementation for driving the roller wheel, according to some examples of the disclosed apparatuses;

FIG. 33C shows a top plan view of a three-layer overlay of example wheel modules in the worm gear implementation, each overlay in a different corresponding pivot orientation of the roller wheels, according to some examples of the disclosed apparatuses;

FIG. 34A shows a top plan view of an example wheel module of an end effector, showing a bevel gear implementation for driving a roller wheel, according to some examples of the disclosed apparatuses;

FIG. 34B shows side elevational views of the example wheel module of the end effector of FIG. 34A, showing the bevel gear implementation for driving the roller wheel, according to some examples of the disclosed apparatuses;

FIG. 34C shows a top plan view of a three-layer overlay of example wheel modules in the bevel gear implementation, each overlay in a different corresponding pivot orientation of the roller wheels, according to some examples of the disclosed apparatuses;

FIG. 35A shows a top plan view of a linkage actuation for roller wheels using the bevel gear implementation in a first pivot orientation, according to some examples of the disclosed apparatuses;

FIG. 35B shows a top plan view of the linkage actuation for roller wheels of FIG. 35A in a second pivot orientation, according to some examples of the disclosed apparatuses;

FIG. 35C shows a top plan view of the linkage actuation for roller wheels of FIG. 35A in a third pivot orientation, according to some examples of the disclosed apparatuses;

FIG. 35D shows a top plan view of the linkage actuation for roller wheels of FIG. 35A in a fourth pivot orientation, according to some examples of the disclosed apparatuses;

FIG. 35E shows an alternate design for the linkage actuation for roller wheels of FIG. 35A, according to some examples of the disclosed apparatuses;

FIG. 36A shows a top plan view of a gear actuation for roller wheels using the bevel gear implementation in a first pivot orientation, according to some examples of the disclosed apparatuses;

FIG. 36B shows a top plan view of the gear actuation for roller wheels of FIG. 36A in a second pivot orientation, according to some examples of the disclosed apparatuses;

FIG. 36C shows a top plan view of the gear actuation for roller wheels of FIG. 36A in a third pivot orientation, according to some examples of the disclosed apparatuses;

FIG. 36D shows a top plan view of the gear actuation for roller wheels of FIG. 36A in a fourth pivot orientation, according to some examples of the disclosed apparatuses;

FIG. 36E shows an alternate design for the gear actuation for roller wheels of FIG. 36A, according to some examples of the disclosed apparatuses;

FIG. 37A shows a top plan view of a slotted-disk actuation for roller wheels using a bevel gear implementation in a first pivot orientation, according to some examples of the disclosed apparatuses;

FIG. 37B shows a top plan view of the slotted-disk actuation for roller wheels of FIG. 37A in a second pivot orientation, according to some examples of the disclosed apparatuses;

FIG. 37C shows a top plan view of the slotted-disk actuation for roller wheels of FIG. 37A in a third pivot orientation, according to some examples of the disclosed apparatuses;

FIG. 37D shows a top plan view of the slotted-disk actuation for roller wheels of FIG. 37A in a fourth pivot orientation, according to some examples of the disclosed apparatuses;

FIG. 37E shows a top plan view of the slotted-disk actuation for roller wheels of FIG. 37A in a fifth orientation, according to some examples of the disclosed apparatuses;

FIG. 37F shows a top plan view of the slotted-disk actuation for roller wheels of FIG. 37A in a sixth orientation, according to some examples of the disclosed apparatuses; and FIG. 37G shows a top plan view of the slotted-disk actuation for roller wheels of FIG. 37A in a seventh orientation, according to some examples of the disclosed apparatuses.

DETAILED DESCRIPTION

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to a person having ordinary skill in the art ("PHOSITA"). In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different embodiments of the device in use or operation in addition to the embodiment(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the term "position" and "positioned" are associated with translation only (e.g., X-axis, Y-axis, and/or Z-axis).

As used herein, the terms "orientation" and "oriented" are associated with rotation only (e.g., roll, pitch, and/or yaw).

As used herein, the term "location" and "located" are associated with both position and orientation.

The various disclosed elements of apparatuses and methods disclosed herein are not required to all apparatuses and methods according to the present disclosure, and the present disclosure includes all novel and non-obvious combinations and subcombinations of the various elements and methods disclosed herein. Moreover, one or more of the various elements and methods disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

Unless otherwise defined, all terms (including technical and scientific terms) used herein have the same meaning as understood by a PHOSITA. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The present disclosure is directed to end effectors and more particularly to end effectors with two or more roller wheels that are configured to allow real-time adjustments of locking dimensions.

FIGS. 1-14 provide illustrative, non-exclusive examples of systems 12 and end effectors 10 according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure. Additional schematic views are presented later, in FIGS. 18, 19, and 26-30, which also follow the conventions above. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Figure 1:
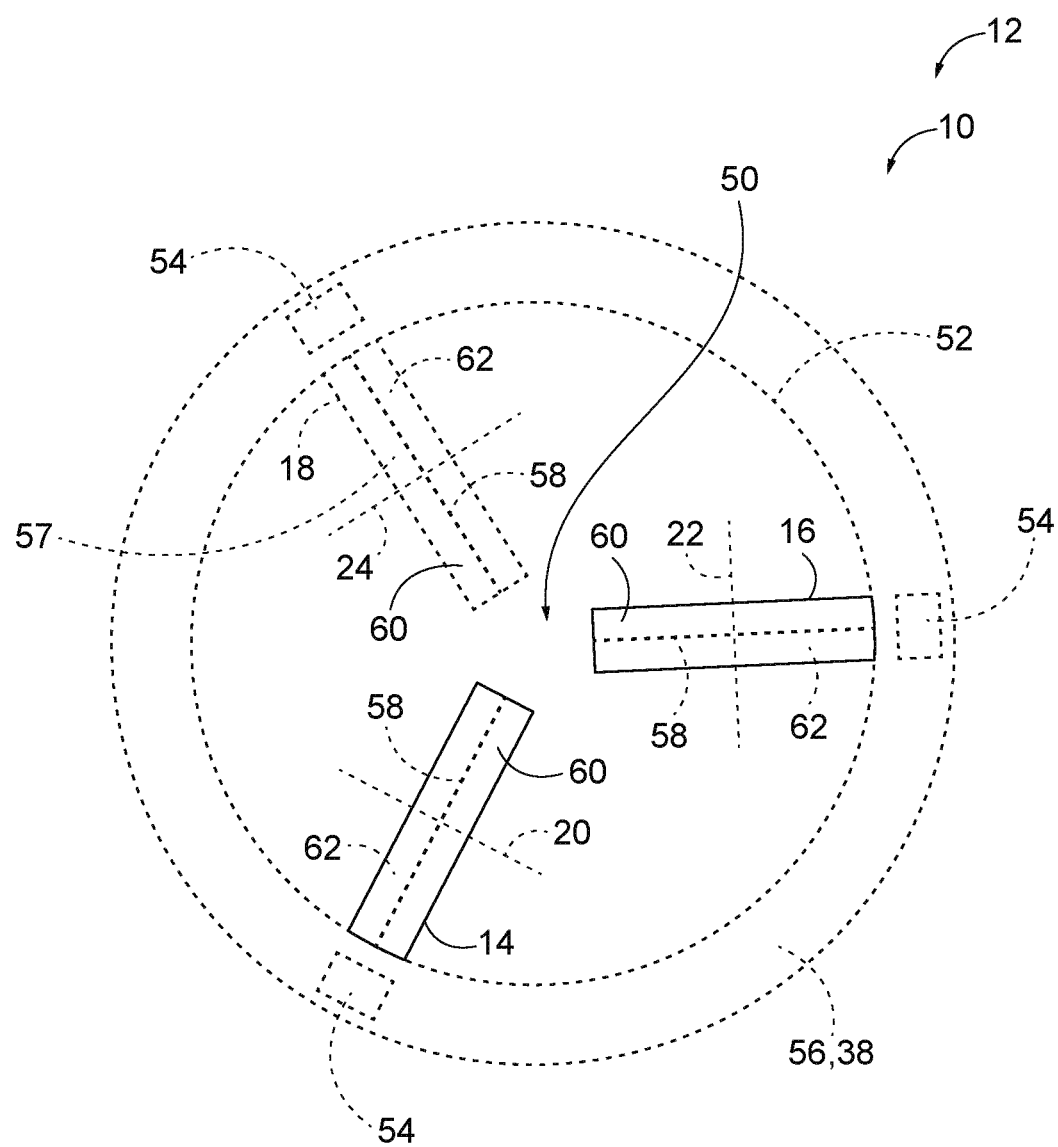
FIG. 1 shows a top plan schematic representation of end effectors and systems including the same, according to some examples of the disclosed apparatuses.
Figure 2:
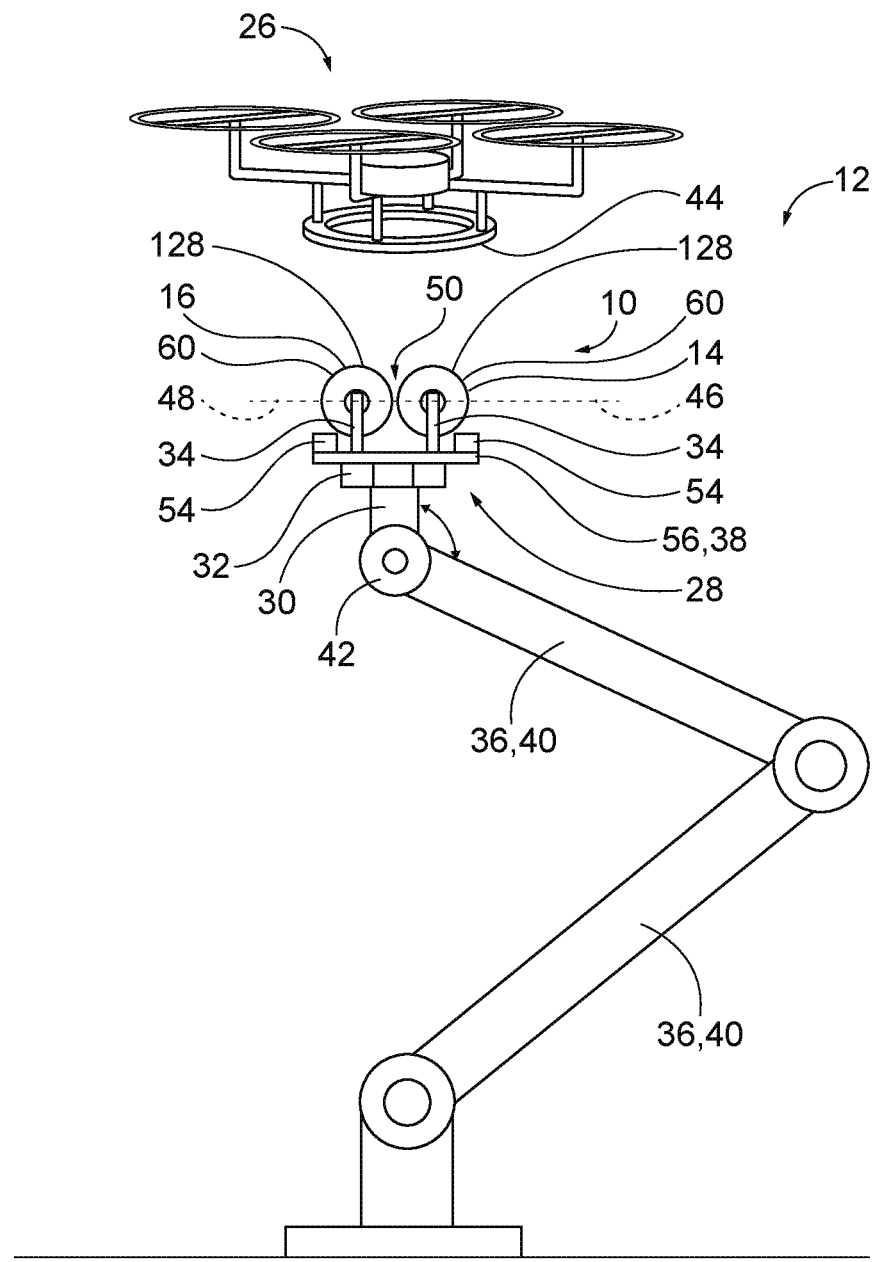
FIG. 2 shows a side elevational schematic representation of end effectors and systems including the same, according to some examples of the disclosed apparatuses.

FIGS. 1-2 schematically represent examples of end effectors 10 of systems 12 of the present disclosure. FIG. 1 schematically represents non-exclusive examples of end effectors 10 viewed from a top plan view, while FIG. 2 schematically represents non-exclusive examples of end effectors 10 viewed from a side elevation view. End effector 10 includes at least a first roller wheel 14 and a second roller wheel 16, and may include one or more additional roller wheels, such as a third roller wheel 18, which is indicated in FIG. 1, but is not shown in FIG. 2, for clarity. Some examples of end effectors 10 include a fourth roller wheel, and/or even further additional roller wheels.

One or more of the roller wheels (e.g., roller wheels 14, 16, 18) rotates in different (e.g., non-parallel) respective plane and/or rotate about a different respective axis than one or more other of the roller wheels. In some examples, each roller wheel may rotate in a different respective plane and rotate about a different respective axis than each other of the roller wheels in a given end effector 10. In some examples, two roller wheels may rotate in the same plane, while two other roller wheels may rotate in a different plane. In other words, in examples of end effectors 10 having an even number of roller wheels (but greater than three roller wheels), one or more pairs of roller wheels may share a geometric plane of rotation. As used herein, the term "geometric plane" is intended to distinguish the word "plane" as used in the field of geometry from the word "plane" as used in the aviation industry.

In some examples, first roller wheel 14 may be said to rotate about first axis 20 that is perpendicular to first geometric plane of rotation 118, and second roller wheel 16 may be said to rotate about second axis 22 that is perpendicular to second geometric plane of rotation 120, with first geometric plane of rotation 118 and second geometric plane of rotation 120 not being parallel to one another. In examples of end effectors 10 that include third roller wheel 18, third roller wheel 18 may be said to rotate about third axis 24 that is perpendicular to third geometric plane of rotation 122 which is not parallel to first geometric plane of rotation 118 and/or second geometric plane of rotation 120. Additionally or alternatively, one or more of first geometric plane of rotation 118, second geometric plane of rotation 120, or third geometric plane of rotation 122 may be at least substantially perpendicular to support base 38 supporting roller wheels 14, 16, 18. Additionally or alternatively, one or more of first geometric plane of rotation 118, second geometric plane of rotation 120, or third geometric plane of rotation 122 may be arranged at a non-perpendicular angle with respect to support base 38. Roller wheels 14, 16, 18 may be arranged such that the first geometric plane, second geometric plane, and/or third geometric plane intersect with one another.

In some examples, some or all of respective roller wheels 14, 16, and/or 18 may rotate about a different and/or non-parallel respective axis, which is represented in FIG. 1 for illustrative purposes. In some examples, each respective roller wheel of end effector 10 rotates about a different respective axis. In some examples, one or more roller wheels of end effector 10 may rotate about an axis that is at least substantially parallel to that of one or more other roller wheels of end effector 10. In some examples, at least one roller wheel of end effector 10 rotates about an axis that is non-parallel to at least one other roller wheel of the end effector. As shown in FIG. 1, first roller wheel 14 may rotate about first axis 20, second roller wheel 16 may rotate about second axis 22, and third roller wheel 18 may rotate about third axis 24. As shown in FIG. 1, each of first axis 20, second axis 22, and third axis 24 are arranged at non-parallel angles with respect to one another. In some examples, each of first axis 20, second axis 22, and third axis 24 are arranged at non-perpendicular angles with respect to one another, though in some examples of end effectors 10, one or more such axes may be at least substantially perpendicular to one another and/or arranged at different angles with respect to one another. End effectors 10 may include additional roller wheels and/or roller wheels arranged in different spacings, orientations, and/or patterns, as discussed herein. Representative examples will primarily be described as having three roller wheels 14, 16, and 18, though end effectors 10 according to the present disclosure are not limited to the same.

End effectors 10 are configured to engage with, mate with, and/or disengage from object 26 via two or more roller wheels (e.g., roller wheels 14, 16, and/or 18). End effectors 10 may be configured to engage with and/or mate with objects 26 approaching from any direction, thereby allowing for a full 360° range of heading angles. This allows for disclosed end effectors 10 to tolerate misalignment in any direction, which was not possible in prior art systems. Roller wheels 14, 16, 18 may be oriented and arranged with respect to one another to allow disclosed end effectors 10 to have this capability. For example, in end effectors 10 with three roller wheels 14, 16, 18, roller wheels 14, 16, 18 may be arranged and oriented such that each respective roller wheel rotates about a different respective non-parallel axis. This arrangement may enable end effectors 10 to engage with objects 26 approaching from a full 360° range of heading angles, though other arrangements disclosed herein also may have this ability as well.

Roller wheels 14, 16, 18 may be rotated in opposite respective directions for engaging with and disengaging from objects 26. For example, roller wheels 14, 16, 18 of end effector 10 may be rotated in a first respective direction when engaging with or mating with object 26, and then may be reversed to rotate in the opposite respective direction to disengage from object 26. In other words, each roller wheel 14, 16, 18 may be configured to be selectively reversed between two opposite directions of rotation. In some examples, the directions of rotation of roller wheels 14, 16, 18 may be said to be "inward" (e.g., roller wheels 14, 16, 18 may be rotated toward interior space 50 between roller wheels 14, 16, 18) in one configuration, and "outward" when roller wheels 14, 16, 18 are rotated in the opposite direction. One or more of roller wheels 14, 16, 18 may be rotated in a different direction than one or more other of roller wheels 14, 16, 18 during engagement with, mating with, and/or disengagement from object 26. Additionally or alternatively, the speed of rotation of one or more of roller wheels 14, 16, 18 may be selectively increased or decreased during engagement or disengagement of object 26.

Object 26 may be floating, hovering, positioned, and/or flying above, beside, below, and/or adjacent end effector 10 in various applications of engaging and/or mating with object 26. End effector 10 additionally or alternatively may be configured to engage with and/or mate with a stationary object 26 while end effector 10 is moved to the stationary object 26. End effectors 10 are designed to engage with and/or mate with object 26 even when the object 26 is misaligned from end effector 10 along one or more positional and/or rotational axes. To engage with, mate with, and/or disengage from objects 26, end effector 10 is configured to engage with a passive receptacle 44 of object 26. Passive receptacle 44 may be integrally formed with object 26, or may be permanently or temporarily coupled thereto. Passive receptacle 44 is generally arranged with respect to object 26 such that passive receptacle 44 is configured to be directed toward end effector 10 during the engagement with object 26. In other words, when object 26 is approaching end effector 10 (or vice versa), object 26 may be configured such that passive receptacle 44 reaches end effector 10 first, to facilitate engagement between end effector 10 and passive receptacle 44, rather than contact with a different part of object 26.

The schematic representation of FIG. 2 illustrates object 26 in the form of a UAV hovering above end effector 10, though systems 12 are not limited to the same. For example, object 26 may be a hovering or other type of aircraft (e.g., a UAV, or drone, or manned aircraft), a package, a load, a cable end, and/or an emergency device that is configured to carry and/or lift a person or animal. In some examples, end effector 10 may be mated with object 26 in adverse and/or unpredictable conditions, such as in refueling flying aircraft situations. In examples involving UAVs or other aircraft as objects 26, the aircraft may be a fixed wing aircraft, a quadcopter, a helicopter, a multirotor, a rotorcraft, a military aircraft, a vertical take-off and landing ("VTOL") aircraft, a short take-off and vertical landing ("STOVL") aircraft, a low observable UAV, and/or an aircraft without landing gear. Other types of objects 26 may be fitted with passive receptacles 44 to engage end effectors 10 disclosed herein to be utilized with disclosed systems 12.

Presently disclosed systems 12 and end effectors 10 may be used to engage with and/or disengage from an aerial vehicle, and/or to lift and/or load a package or load, and may be used for commercial applications, military applications, and/or personal applications. Systems 12 and end effectors 10 may address the shortcomings with conventional solutions because presently disclosed end effectors 10 and systems 12 may be configured to engage with and/or mate with objects in adverse and/or unpredictable conditions, and/or in instances with positional and/or rotational misalignment between the end effector and the object, such as when the end effector and/or the object are in motion. In other examples, systems 12 may be used for applications involving mating components, such as in as manufacturing (e.g., robotic material handling), aerial refueling systems, and agriculture usages (e.g., picking fruit and other agricultural products). Disclosed systems 12 and end effectors 10 may create cost savings and/or cost avoidance as compared to conventional solutions, such as due to avoidance or reduction of injuries and/or hardware wear. In some examples, end effectors 10 and systems 12 may improve safety for operators and the objects 26 being engaged or mated with, as compared to conventional solutions. Presently disclosed systems 12 and end effectors 10 also advantageously have the ability to operate spatially in three dimensions, with multi-axis engagement capability. Systems 12 and end effectors 10 also are configured to be scalable to be adapted for larger or smaller objects 26 being engaged, mated with, and/or launched. Additionally, systems 12 and end effectors 10 may be selectively reconfigurable to have different numbers of roller wheels, and/or different arrangements and positioning of roller wheels 14, 16, 18.

Systems 12 may include a drive system 28 (FIG. 2) configured to control rotation of first roller wheel 14, second roller wheel 16, and/or third roller wheel 18. For example, drive system 28 may include one or more rotational power sources 30, one or more drive gears 32, and one or more drive shafts 34. While rotational power sources 30 are generally described herein as motors 30, it is to be understood that rotational power sources 30 may include one or more electric motors, a pneumatic power source, a hydraulic motor or other hydraulic power source, a spring-powered power source (e.g., wind-up rotatable power sources), manually powered (e.g., hand cranks), and/or air powered (e.g., a rotary vane air device) sources. In some examples, drive system 28 includes a single motor 30 that drives first roller wheel 14, second roller wheel 16, and third roller wheel 18. In some examples, drive system 28 includes a respective motor 30 for each respective roller wheel. As will be described in more detail herein, drive gears 32 of drive system 28 may include a central control gear or external control gear ring, and a plurality of radially spaced spur gears, with the central control gear or external control gear ring being configured to rotate the plurality of radially spaced spur gears, and each respective spur gear being configured to drive a respective roller wheel 14, 16, 18 by driving a respective drive shaft 34. In some examples, drive gears 32 include a set of planetary and internal gears. Drive systems 28 additionally or alternatively may include a limit switch configured to stop first roller wheel 14, second roller wheel 16, and/or third roller wheel 18 after object 26 is engaged by end effector 10. End effectors 10 may be configured for manual and/or automated operation (e.g., manual or automated engagement with, mating with, and/or disengagement from object 26).

With continued reference to FIGS. 1-2, end effector 10 may be coupled to, mounted to, and/or supported by a support structure 36, such as an arm, a pole, a handle, and/or a platform (stationary or moving). For example, support structure 36 of FIG. 2 is illustrated in the form of a robotic arm 40, which may be coupled to drive system 28 via adjustable joint angle 42. Robotic arm 40 is illustrated as a stationary robotic arm 40, though in other examples of systems 12, robotic arm 40 may be an arm of a mobile robot. In other examples of system 12, end effector 10 may be coupled to other types of support structures 36 via adjustable joint angle 42. For example, end effector 10 may be coupled to a handle for handheld or manual operation in some systems 12. In other examples, end effector 10 may be supported by arm support structure 36 that is mounted on a ship-based mounting platform or other moving vehicle. In these and other setups for supporting end effector 10, support structure 36 may be used to help in aligning end effector 10 for mating with or engaging object 26 by positioning and/or moving end effector 10 for engagement with, mating with, and/or disengagement from object 26.

As used herein, the term "end effectors" is not limited to end effectors for robots and robot arms, and may be implemented with many different types of systems. For example, end effectors 10 may be configured to be implemented using a robotic device, a transportation device, a stationary robotic arm, a land-based system, a mobile robot, and/or a ship-based system. To that end, support structure 36 may include a ship or other marine vessel (including underwater vessels), an aircraft, a spacecraft, a stationary robot, a mobile robot, a transportation device, a robotic device, a handheld device, and/or a land-based surface or structure. Additionally or alternatively, end effector 10 may include support element 56, such as support base 38, that supports roller wheels 14, 16, 18, drive system 28, and/or one or more stop structures 54. Moreover, end effector 10 may include a locking mechanism (not shown) associated, for example, with one or more of support base 38, stop structures 54, or support element 56 that provides for positive retention of object 26 using, for example, one or more bars, hooks, or the like designed to interact, directly or indirectly, with object 26. The locking mechanism is configured to lock object 26 to end effector 10 independent of roller wheels 14, 16, 18.

End effector 10 is configured to engage with passive receptacle 44 of object 26 to engage with, mate with, and/or disengage from object 26. Passive receptacle 44 may take many different forms in various examples of systems 12. For example, passive receptacle 44 may be a ring-type receptacle that has an annular feature configured to engage with end effector 10, a post-type receptacle that has an elongated post-like member configured to engage with end effector 10, or any other suitable shape for a given example of end effector 10. End effectors 10 may be arranged to interface with or engage with a ring-type, post-type, or other type of passive receptacle of a specific size. For example, end effector 10 may be configured to have an outer perimeter 52 (e.g., an "outer capture circle") that is sized to engage with an inner diameter of the ring of passive receptacle 44. In some examples, end effector 10 may have a press fit or interference fit with the ring of passive receptacle 44 when the ring is positioned about the centerlines of roller wheels 14, 16, 18. Similarly, end effectors 10 may be configured such that roller wheels 14, 16, 18 are spaced with respect to one another to have an interference fit or press fit with the post or enlarged nub of passive receptacle 44 when the post is engaged within interior space 50 between roller wheels 14, 16, 18 (e.g., an "inner capture circle") and the enlarged nub of the post is at or past the centerlines of roller wheels 14, 16, 18. As passive receptacle 44 interfaces with roller wheels 14, 16, 18, roller wheels 14, 16, 18 are rotated in a direction that pulls passive receptacle 44 onto or into end effector 10 (e.g., pulling a ring of passive receptacle 44 about outer perimeter 52 of roller wheels 14, 16, 18, or by pulling a post of passive receptacle 44 into interior space 50 between roller wheels 14, 16, 18).

With reference to FIG. 2, end effector 10 may be configured to automatically lock passive receptacle 44 in place (thereby engaging object 26) once passive receptacle 44 is grasped and pulled vertically past first centerline 46 of first roller wheel 14 (e.g., toward support base 38), second centerline 48 of second roller wheel 16, and/or a third centerline of third roller wheel 18. Centerlines 46, 48 generally correspond to the points of maximum grasping force between roller wheels 14, 16 and passive receptacle 44. In some examples, roller wheels 14, 16, 18 are substantially vertically aligned with one another and substantially equal in diameter, such that the respective centerlines 46, 48 may be substantially co-planar. In some examples, end effector 10 is configured to grasp passive receptacle 44 such that passive receptacle 44 is positioned interiorly to and between first roller wheel 14 and second roller wheel 16, thereby engaging object 26. For example, a post-type passive receptacle 44 may be grasped between roller wheels 14, 16, 18 in an interior space indicated generally at 50. In some examples, end effector 10 is configured to grasp passive receptacle 44 such that passive receptacle 44 is positioned exteriorly about an outer perimeter 52 (FIG. 1) when object 26 is engaged, with outer perimeter 52 being defined by roller wheels 14, 16, 18 and end effector 10. For example, in end effectors 10 having three roller wheels 14, 16, 18, outer perimeter 52 may be defined by first roller wheel 14, second roller wheel 16, and third roller wheel 18. In other examples of end effector 10, additional roller wheels may be present that further define outer perimeter 52.

Systems 12 may include one or more stop structures 54 configured to limit movement of object 26 (e.g., passive receptacle 44) with respect to end effector 10. For example, stop structures 54 may be configured to limit vertical translation of passive receptacle 44 with respect to roller wheels 14, 16, 18 by physically substantially preventing further vertical translation of passive receptacle 44 once passive receptacle 44 meets or contacts stop structures 54. Stop structures 54 may be coupled to one or more of roller wheels 14, 16, 18, and/or stop structures 54 may be coupled to or supported by support element 56 (e.g., support base 38). For example, end effectors 10 may include a respective stop structure 54 positioned adjacent each respective roller wheel 14, 16, 18 such that a portion of passive receptacle 44 contacts stop structures 54 once passive receptacle 44 is pulled sufficiently onto end effector 10. In some examples, stop structures 54 may be configured to prevent passive receptacle 44 from being pulled entirely down off of roller wheels 14, 16, 18, such that passive receptacle 44 maintains at least minimal contact with roller wheels 14, 16, 18 when passive receptacle 44 is grasped by end effector 10 and in the locked configuration. In some examples, stop structures 54 may be sized and positioned to ensure that object 26 may be held away from roller wheels 14, 16, 18 when passive receptacle 44 is grasped by roller wheels 14, 16, 18. Additionally or alternatively, stop structures 54 may be coupled to or form a part of passive receptacle 44 of object 26. For example, passive receptacle 44 may include a ring attachment structure, base plate, or other structure that serves as a stop structure 54 by limiting vertical translation of passive receptacle 44 with respect to end effector 10. For example, ring attachment structure, base plate, or other structure of passive receptacle 44 may be configured to contact upper surfaces 128 of roller wheels 14, 16, 18, which may prevent passive receptacle 44 from being pulled further down toward support base 38 by roller wheels 14, 16, 18. In some examples, stop structure 54 may be compliant, including flexible materials and/or spring-loaded elements, to provide a small amount of force toward roller wheels 14, 16, 18 to help passive receptacle 44 re-engage with roller wheels 14, 16, 18 for launching.

Roller wheels 14, 16, 18 may be any suitable roller wheels, including airless tires, pneumatic tires, rubber wheels, belts, and/or solid wheels in various examples of end effector 10. Roller wheels 14, 16, 18 may be rigid, compliant, and/or compressible in various examples of end effector 10. In some examples, all roller wheels 14, 16, 18 of a given end effector 10 may be the same type, material, size, and density, while in other examples, one or more of roller wheels 14, 16, 18 may be different from one or more other of roller wheels 14, 16, 18. In some examples, end effectors 10 are configured such that each roller wheel 14, 16, 18 may be selectively removed from end effector 10 and replaced with a replacement roller wheel or different type of roller wheel. In this manner, roller wheels 14, 16, 18 may be selectively replaceable when worn or damaged, and/or different roller wheels may be switched out and used for different objects 26 being engaged with, mated with, and/or disengaged from. Additionally or alternatively, end effectors 10 may be modular, such that end effector 10 is selectively reconfigurable with different numbers of roller wheels 14, 16, 18, multiple drive shaft mounts, and/or structural attachment points.

In some examples, first roller wheel 14, second roller wheel 16, and/or third roller wheel 18 have one or more compliant regions. Additionally or alternatively, the durometer of one or more of roller wheels 14, 16, 18 may be selected based on the type of passive receptacle 44 of object 26 being engaged. For example, roller wheels 14, 16, 18 may be selected to be more rigid for applications involving heavier engagements (e.g., heavier passive receptacle 44 and/or objects 26). In some examples, one or more roller wheels 14, 16, 18 may be pneumatic, with selectively adjustable tire pressures such that it may be increased or decreased as needed for different applications. One or more of roller wheels 14, 16, 18 may be compressible and/or compliant in some examples. Additionally or alternatively, one or more of roller wheels 14, 16, 18 may be airless. These adjustments may be selected based on the weight, mass, and/or materials used in the objects being engaged.

In some examples, one or more of roller wheels 14, 16, 18 may include a central groove 58 formed in a perimeter face 60 of roller wheels 14, 16, 18, which may be configured to improve alignment of object 26 as it is engaged or mated with. Additionally or alternatively, perimeter face 60 of one or more roller wheels 14, 16, 18 may include a secondary feature 62 configured to enhance the ability of end effector 10 to engage object 26. For example, secondary feature 62 may include one or more radial grooves and/or a tread pattern.

FIGS. 3-6 schematically illustrate engagement with and disengagement from an object 26, such as a hovering aircraft, via passive receptacle 44, in the form of a ring-type receptacle 64. While the object being engaged is not illustrated in FIGS. 3-6, it is to be understood that passive receptacle 44 is associated with the object (e.g., coupled to, integrally formed with, etc.) such that the object is effectively engaged by end effector 10 when ring-type receptacle 64 is grasped by roller wheels 14, 16, 18 (only roller wheels 14, 16 are visible in FIGS. 3-6, for clarity). Passive receptacle 44 may be said to be "grasped" by roller wheels 14, 16, 18 when passive receptacle 44 is engaged around the outside of roller wheels 14, 16, 18, or engaged between roller wheels 14, 16, 18. Again, two roller wheels 14, 16 are illustrated in FIGS. 3-6 for clarity, though end effectors 10 may include third roller wheel 18 (FIG. 1) and/or additional roller wheels, with one or more roller wheels of end effector 10 being in non-parallel planes with one another. Furthermore, while the simplified, schematic nature of FIGS. 3-6 makes it appear as though roller wheels 14, 16 are rotating in the same plane as one another, it is to be understood that roller wheels 14, 16 may be configured to rotate in non-parallel with one another in various examples of end effectors 10.

In the example of FIGS. 3-6, the object approaches end effector 10 with passive receptacle 44 directed toward roller wheels 14, 16 as shown in FIG. 3, with passive receptacle 44 moving generally toward end effector 10, in the direction indicated by arrows 66. First roller wheel 14 is rotated in a first direction (indicated by arrow 68) and second roller wheel 16 is rotated in a second direction (indicated by arrow 70) while the object is engaged. As shown in FIG. 4, once passive receptacle 44 contacts roller wheels 14, 16, roller wheels 14, 16 begin to pull on passive receptacle 44, such that passive receptacle 44 is pulled further in the direction indicated by arrows 66. As shown, passive receptacle 44 engages with the outer edges of roller wheels 14, 16 (e.g., about outer perimeter 52 around roller wheels 14, 16, 18; see FIG. 1) as it is grasped by end effector 10. Passive receptacle 44 is effectively locked onto roller wheels 14, 16 once passive receptacle 44 is pulled down past centerlines 46, 48 (FIG. 5) of roller wheels 14, 16. Again, while a third roller wheel is not visible in the schematic representations of FIGS. 3-6, it is to be understood that passive receptacle 44 may be effectively locked onto one or more additional roller wheels beyond the illustrated roller wheels 14, 16, such as being locked onto three roller wheels 14, 16, 18 (FIG. 1).

Stop structures 54 serve as a stop to prevent ring-type receptacle 64 from being pulled further down, and may ensure that passive receptacle 44 remains in contact with roller wheels 14, 16 and/or any additional roller wheels of end effector 10. In some examples, stop structures 54 may be compliant so as to provide a cushion for passive receptacle 44 as it is pressed into stop structures 54 during engagement with the object. At this point, the motor or motors of drive system 28 may be turned off, if desired (or may be automatically turned off via a limit switch), though in some examples, the motor or motors may continue to run in the retraction/engagement direction without stalling drive system 28, because end effectors 10 may be configured to only be applying a small amount of retraction force on passive receptacle 44 when passive receptacle 44 is in the locked configuration (e.g., contacting stop structures 54 and/or pulled down past centerlines 46, 48 of roller wheels 14, 16). In other words, in some examples, roller wheels 14, 16 do not need to be stopped once object 26 is engaged, because end effectors 10 and systems 12 may be configured to allow for continued rotation of roller wheels 14, 16 (and any additional roller wheels of end effector 10) after engagement, without damaging object 26 or passive receptacle 44.

FIGS. 3-5 may be said to represent end effector 10 in an engagement configuration, while FIG. 6 may be said to represent end effector 10 in a disengagement, or launch, configuration. The roller wheels of end effector 10 may be driven such that the rotate inwardly in one configuration, and outwardly in the other configuration. For example, as shown in FIG. 6, to disengage from the object from end effector 10, drive system 28 reverses the direction of rotation of roller wheels 14, 16 (and any additional roller wheels of end effector 10). Namely, first roller wheel 14 is reversed in FIG. 6 such that it rotates in the opposite direction from during the engagement sequence of FIGS. 3-5, as indicated by arrow 72, and second roller wheel 16 is reversed such that it also rotates in the opposite direction from during the engagement sequence, as indicated by arrow 74. As a result, roller wheels 14, 16, will grab the edges of passive receptacle 44 and push it away from stop structures 54 such that passive receptacle 44 lifts off of stop structures 54 and away from support base 38, in the direction indicated by arrows 76. In this manner, passive receptacle 44 begins to be pushed off of roller wheels 14, 16, until passive receptacle 44 is entirely free from roller wheels 14, 16 (e.g., it is propelled off the top of roller wheels 14, 16 and any other roller wheels of end effector 10), thereby effectuating disengagement of the object from end effector 10.

Because systems 12 and end effectors 10 may be configured to retain object 26 in an engaged, or locked, configuration via passive receptacle 44 until the direction of rotation of roller wheels 14, 16, 18 is reversed for launch/disengagement, this may enable UAV motors of object 26 to be started to prepare for takeoff, as end effectors 10 may be configured to prevent disengagement of object 26 until the roller wheels (e.g., roller wheels 14, 16, 18) are reversed to push passive receptacle 44 away from end effector 10. While systems 12 are described herein as engaging and disengaging passive receptacle 44 by translating it in the substantially vertical direction, other examples of systems 12 and end effectors 10 may be configured to engage with and disengage from objects 26 that are moved toward end effector 10 horizontally or in other directions relative to end effector 10. Similarly, end effectors 10 may be supported and positioned to disengage from or launch objects 26 horizontally or at other angles/in other directions in various implementations.

Advantageously, systems 12 are configured to be tolerant of positional and rotational misalignment between passive receptacle 44 and end effector 10 in any direction. In other words, presently disclosed end effectors 10 are configured to engage objects 26 via passive receptacles 44 even when conditions, tolerances, or other errors prevent correct alignment between passive receptacle 44 and end effector 10. For example, in windy conditions when object 26 and/or end effector 10 may be moving around unpredictably, presently disclosed end effectors 10 may be configured to engage with and/or mate with the object despite these difficulties, due to the system's tolerance for positional and rotational misalignment provided by the orientation and arrangement of the roller wheels with respect to one another. End effectors 10 may be configured to handle approaching objects from any angle, allowing for a full 360° range of heading angles, thus being tolerant of misalignment in any direction. While prior art systems may be able to tolerate misalignment in a single direction, they are not capable of engaging objects from a full 360° range of heading angles.

To illustrate, FIGS. 3-4 schematically show a substantially ideal alignment between passive receptacle 44 and roller wheels 14, 16, with passive receptacle 44 approaching end effector 10 such that passive receptacle 44 is centered over roller wheels 14, 16. On the other hand, FIG. 7 illustrates an example where passive receptacle 44 is positionally misaligned from roller wheels 14, 16, in that passive receptacle 44 is off-center from roller wheels 14, 16 when passive receptacle 44 has contacted roller wheels 14, 16. Nonetheless, end effectors 10 are still configured to engage the object via passive receptacle 44 even when it is off-center, because the rotation of roller wheels 14, 16 will serve to pull passive receptacle 44 over and onto all the roller wheels of end effector 10. Similarly, FIG. 8 illustrates an example where passive receptacle 44 is rotationally misaligned from roller wheels 14, 16, in that passive receptacle 44 is not level with the tops of roller wheels 14, 16, but is angled such that passive receptacle 44 contacts second roller wheel 16, but not first roller wheel 14, when passive receptacle 44 first contacts end effector 10. Nonetheless, end effectors 10 are still configured to engage the object via passive receptacle 44 even when it is rotationally misaligned, because rotation of second roller wheel 16 will serve to pull passive receptacle 44 down into contact with first roller wheel 14 as well. End effectors 10 may be configured to engage objects 26 experiencing both positional misalignment (FIG. 7) and rotational misalignment (FIG. 8), due to the arrangement and orientation of the roller wheels.

FIG. 9 illustrates a variation of passive receptacle 44 which includes tapered edge guides 78, which also may be referred to as a skirt 78, around an outer perimeter of passive receptacle 44. As shown in FIG. 9, tapered edge guide 78 may facilitate, or aid, in correcting the alignment of passive receptacle 44 with respect to the roller wheels (roller wheels 14 and 16 are shown in FIG. 9, though end effector 10 may include one or more additional roller wheels, such as third roller wheel 18) when tapered edge guide 78 contacts one or more of the roller wheels. Thus, tapered edge guide 78 may be configured to facilitate engagement with the object by end effector 10 even when only one roller wheel (e.g., only first roller wheel 14 or only second roller wheel 16) contacts passive receptacle 44.

Figure 10:
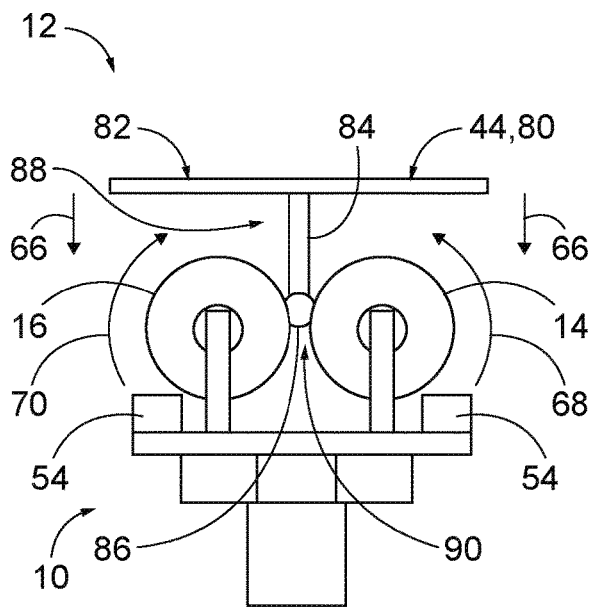
FIG. 10 shows a side elevational schematic representation of a passive receptacle in the process of engaging with an end effector, according to some examples of the disclosed apparatuses.
Figure 11:
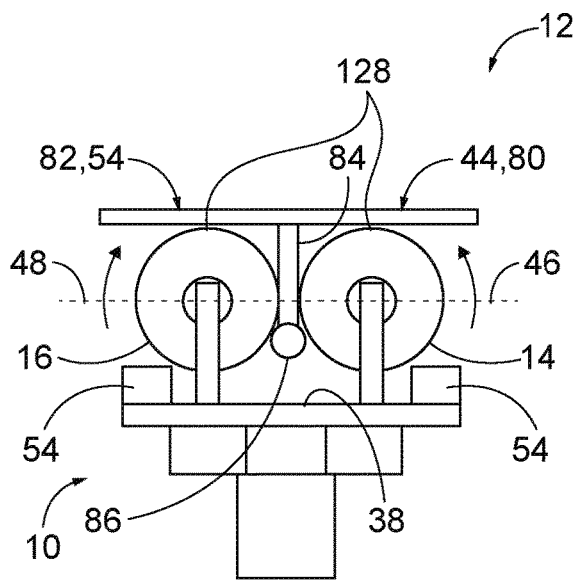
FIG. 11 shows a side elevational schematic representation of a passive receptacle effectively locked into place on an end effector, according to some examples of the disclosed apparatuses.
Figure 12:
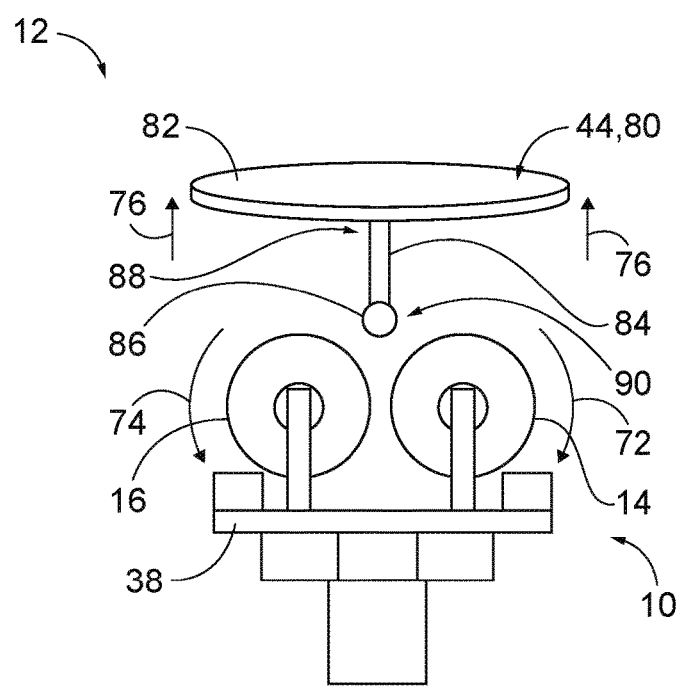
FIG. 12 shows a side elevational schematic representation of a launch of a passive receptacle from an end effector, according to some examples of the disclosed apparatuses.

FIGS. 10-12 illustrate another example of system 12, in which end effector 10 is configured to engage with an object 26 via passive receptacle 44 in the form of a post-type receptacle 80. Post-type receptacle 80 may include a base plate 82, from which an elongated post, or peg, 84 extends from a proximal end region 88 to a distal end region 90. Post 84 is coupled to (or formed integrally with) base plate 82 at or within proximal end region 88 of post 84. Post 84 includes an enlarged nub 86 at or within distal end region 90 of post 84. As with FIGS. 3-6, the object being engaged is not illustrated in FIGS. 10-12 (for clarity), though it is to be understood that passive receptacle 44 is associated with the object (e.g., coupled to, integrally formed with, etc.) such that the object is effectively engaged by end effector 10 when post-type receptacle 80 is grasped by the roller wheels (e.g., roller wheels 14, 16, 18). Similarly, while only two roller wheels 14, 16 are visible in FIGS. 10-12 for clarity, such end effectors 10 may include one or more additional roller wheels (e.g., roller wheels 14, 16, 18), with one or more of the roller wheels rotating in a different plane than one or more other of the roller wheels.

While ring-type receptacle 64 is grasped by the outer edges of the roller wheels in the example of FIGS. 3-6, post-type receptacle 80 of FIGS. 10-12 is grasped by the inner edges of roller wheels 14, 16, 18. In other words, post-type receptacle 80 is positioned between the roller wheels when post-type receptacle 80 is grasped by end effector 10, such as within interior space 50 between roller wheels 14, 16, 18 (FIG. 1). Specifically, as shown in FIG. 10, the object having post-type receptacle 80 approaches end effector 10 such that enlarged nub 86 contacts one or more of roller wheels 14, 16 (and/or roller wheel 18, which is not visible in FIGS. 10-12). During engagement with the object, first roller wheel 14 is rotated in a first direction (indicated by arrow 68) and second roller wheel 16 is rotated in a second direction (indicated by arrow 70). The rotation of roller wheels 14, 16 pulls post-type receptacle 80 down toward support base 38, such that post-type receptacle 80 continues to move in the direction indicated by arrows 66. It is to be understood that any additional roller wheels of end effector 10 may be rotated accordingly, in coordination and cooperation with roller wheels 14, 16, to engage post-type receptacle 80 and pull it between the roller wheels to engage the object.

As shown in FIG. 11, when the object is engaged by end effector 10, enlarged nub 86 may be drawn past the centerlines of the roller wheels such that post 84 may be positioned interiorly between the roller wheels. For example, FIG. 11 shows enlarged nub 86 having been pulled down past centerlines 46, 48 of roller wheels 14, 16, and post 84 being positioned interiorly between roller wheels 14, 16, though it is to be understood that enlarged nub 86 is also pulled down past other respective centerlines of other roller wheels that may be included in end effector 10, and post 84 may be positioned interiorly between all the roller wheels as well. The centerlines of the roller wheels (e.g., centerlines 46, 48) may effectively serve as a pinch point for enlarged nub 86 as it is pulled into end effector 10 or launched away from end effector 10 after being engaged. In some examples, base plate 82 of post-type receptacle 80 may serve as a stop structure 54 because base plate 82 may engage with, or contact, the upper surfaces 128 of roller wheels 14, 16 once post-type receptacle 80 is grasped by end effector 10, thereby preventing further movement of post-type receptacle 80 toward support base 38 of end effector 10. As shown in FIG. 12, to disengage from the object, the directions of rotation of roller wheels 14, 16 (and any additional roller wheels) are selectively reversed. Thus, first roller wheel 14 is rotated in the opposite direction from which it was rotated during the engagement sequence, as indicated by arrow 72, and second roller wheel 16 is rotated in the opposite direction from which it was rotated during the engagement sequence, as indicated by arrow 74. As a result, the roller wheels push post 84 away from support base 38, in the direction indicated by arrows 76, and thereby push enlarged nub 86 past the centerlines of the roller wheels (e.g., past centerlines 46, 48 of roller wheels 14, 16, which are labeled in FIG. 11). In this manner, post-type receptacle 80 (and thereby the associated object) is disengaged from end effector 10.

Figure 13:
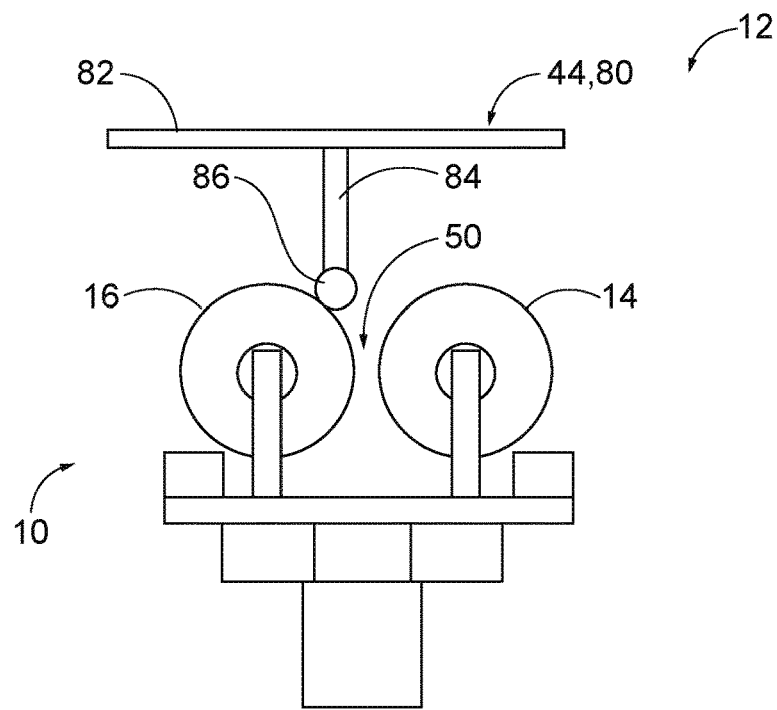
FIG. 13 shows a side elevation schematic representation of a passive receptacle in positional misalignment with respect to an end effector, according to some examples of the disclosed apparatuses.

Again, systems 12 are configured to be tolerant of positional and rotational misalignment between passive receptacle 44 and end effector 10, which is illustrated in FIGS. 13-14 using an example of post-type receptacle 80. While FIGS. 10-11 illustrate substantially ideal alignment between passive receptacle 44 and roller wheels 14, 16, with passive receptacle 44 approaching end effector 10 such that passive receptacle 44 is centered over roller wheels 14, 16, FIGS. 13-14 illustrate examples of misalignment between post-type receptacle 80 and roller wheels 14, 16. In FIG. 13, post-type receptacle 80 is positionally misaligned from roller wheels 14, 16, in that passive receptacle 44 is off-center from the space between roller wheels 14, 16 to the extent that enlarged nub 86 has contacted second roller wheel 16 but not first roller wheel 14. Nonetheless, end effectors 10 are still configured to engage the object via post-type receptacle 80 even when it is off-centered, because the rotation of roller wheels 14, 16 will serve to pull enlarged nub 86 and post 84 between the roller wheels of end effector 10 (e.g., toward and into interior space 50) due to rotation of roller wheels 14, 16 and the resulting forces applied to enlarged nub 86 and post 84.

Similarly, FIG. 14 illustrates an example where post-type receptacle 80 is rotationally misaligned from roller wheels 14, 16, in that base plate 82 is not level with upper surfaces 128 of roller wheels 14, 16, but is angled such that one end of base plate 82 is closer to one of roller wheels 14, 16 than another of the roller wheels is to the other end of base plate 82 (e.g., base plate 82 is angled to be closer to first roller wheel 14 than to second roller wheel 16, in the illustrated example). Nonetheless, end effector 10 is still configured to engage the object via post-type receptacle 80 even when it is rotationally misaligned, because rotation of second roller wheel 16 will serve to pull enlarged nub 86 and post 84 toward support base 38, which will level base plate 82 of post-type receptacle 80 in the process. End effector 10 may thus be configured to engage objects 26 experiencing both positional misalignment (FIG. 13) and rotational misalignment (FIG. 14), due to the arrangement and orientation of roller wheels 14, 16 as described herein.

Turning now to FIGS. 15-17 and 20-25, illustrative, non-exclusive examples of systems 12, end effectors 10, and/or components thereof are presented. Where appropriate, the reference numerals from the schematic illustrations of FIGS. 1-14 (or FIGS. 18-19 and 26-30) are used to designate corresponding parts in FIGS. 15-17 and 20-25; however, the examples of FIGS. 15-17 and 20-25 are non-exclusive and do not limit systems 12 or end effectors 10 to the illustrated examples of FIGS. 15-17 and 20-25. That is, end effectors 10 and systems 12 are not limited to the specific examples illustrated in FIGS. 15-17 and 20-25 and may incorporate any number of the various aspects, configurations, characteristics, properties, etc. that are illustrated in and discussed with reference to the schematic representations of FIG. 1-14, 18-19, or 26-30, and/or the examples of FIGS. 15-17 and 20-25, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 15-17 and 20-25; however, it is within the scope of the present disclosure that the previously discussed features, variants, etc. may be utilized therewith.

FIG. 15 is a perspective view of an example of end effector 10 with three roller wheels 14, 16, 18. As shown, in this example, roller wheels 14, 16, 18 are all arranged to rotate in different planes that are at non-parallel and non-perpendicular angles with respect to one another. First roller wheel 14 rotates about first axis 20, second roller wheel 16 rotates about second axis 22, and third roller wheel 18 rotates about third axis 24, with each of first axis 20, second axis 22, and third axis 24 being non-parallel and non-perpendicular to one another. In this example, a passive receptacle 44 in the form of a post-type receptacle 80 is shown engaged, or grasped, within interior space 50 between roller wheels 14, 16, 18 (though object 26 is not shown in FIG. 15 for clarity). As shown in FIG. 15, one or more of roller wheels 14, 16, 18 may have a central groove 58 formed in perimeter face 60 of each roller wheel 14, 16, 18. When post-type receptacle 80 is engaged by end effector 10, enlarged nub 86 may be positioned at least partially within the central grooves 58 of roller wheels 14, 16, 18. In other words, central grooves 58 may be sized and shaped to facilitate engagement with enlarged nub 86 and/or post 84 of post-type receptacle 80.

Systems 12 generally include drive systems 28 to power roller wheels 14, 16, 18 of end effectors 10. FIG. 16 illustrates an example of drive system 28 that includes a respective motor 30 for each respective roller wheel 14, 16, 18. A respective drive gear 32 operatively coupled to each respective motor 30 transfers rotational energy from each respective motor 30 to the respective roller wheel 14, 16, 18. Drive system 28 may include one or more additional respective gears 92 operatively coupled to each drive gear 32 as desired for a particular layout of end effector 10.

While the example of FIG. 16 includes a respective drive motor 30 for each respective roller wheel 14, 16, 18, the drive system 28 in the example of FIG. 17 includes just a single motor 30 that drives all of roller wheels 14, 16, 18. In other examples, a respective motor 30 may be configured to drive a subset of roller wheels 14, 16, 18 in a given end effector 10, while other roller wheels 14, 16, 18 may be driven by one or more other respective motors 30. In the example of FIG. 17, support base 38 supports an external control gear ring 94 (which also may be referred to as an annular gear 94) positioned within or adjacent outer perimeter 52 of support base 38, and a plurality of radially spaced spur gears 96. A single motor 30 (not shown in FIG. 17, for clarity) may be configured to drive external control gear ring 94, which in turn is configured to rotate the plurality of spur gears 96 (e.g., external control gear ring 94 may be engaged with, or meshed with, spur gears 96). For example, there may be a respective spur gear 96 for each respective roller wheel 14, 16, 18, as in the example of FIG. 17. Each respective spur gear 96 may be operatively coupled to a respective drive shaft 34 of a respective roller wheel 14, 16, 18 (e.g., via a worm screw and worm gear, or via beveled gears) to drive the respective roller wheel such that rotation of each respective spur gear 96 causes rotation of the respective drive shaft 34 to which the respective spur gear 96 is coupled (e.g., positioned on). In this manner, rotation of external control gear ring 94 by a single motor 30 may effectuate rotation of all of roller wheels 14, 16, 18.

In the example of FIG. 17, support element 56 includes a housing 98 that positions and aligns roller wheels 14, 16, 18 with respect to one another. Housing 98 also supports stop structures 54 in this example, with this example of end effector 10 including a respective stop structure 54 for each respective roller wheel 14, 16, 18. Housing 98 may be coupled to or engaged with support base 38. Additionally or alternatively, housing 98 may be coupled to or engaged with support structure 36, such as a handle or robot arm.

An example of a drive system 28 similar to the implementation illustrated in FIG. 17 is schematically represented in FIG. 18, which shows a top plan schematic representation of external control gear ring 94 engaged with three spur gears 96, with each respective spur gear 96 being configured to drive a respective roller wheel via a respective drive shaft 34, such as using a respective worm screw and worm gear, or bevel gears to transfer power from each respective spur gear 96 to the corresponding respective drive shaft 34. Other examples of drive system 28 are schematically represented in FIG. 19, which shows a central control gear 100 engaged with a plurality of radially spaced spur gears 96, with central control gear 100 being configured to rotate the plurality of radially spaced spur gears 96. Again, each respective spur gear 96 may be configured to drive a respective roller wheel 14, 16, 18 via a respective drive shaft 34. Central control gear 100 may be positioned centrally between the plurality of radially spaced spur gears 96. While illustrated examples show spur gears 96, other examples of end effectors 10 may have different drive systems 28 using different types of gear sets, such as herringbone gear sets, helical gear sets, or double helical gear sets.

Regardless of whether an external control gear ring 94 or a central control gear 100 is used (or a different gearing arrangement altogether), end effectors 10 may include additional gears configured to rotate roller wheels 14, 16, 18 and transfer energy from the motors and spur gears 96 to each roller wheel 14, 16, 18 via drive shafts 34. FIGS. 20-21 illustrate two examples of such additional gears to implement presently disclosed end effectors 10, though end effectors 10 are not limited to these particular examples. A wheel module for first roller wheel 14 is shown in each of FIGS. 20-21, for simplicity, though those of ordinary skill in the art will appreciate that the illustrated arrangements can be used for the other roller wheels of end effector 10 that are not illustrated in FIGS. 20-21.

In the example wheel module 101 of FIG. 20, spur gear 96 drives drive shaft 34, which in turn rotates a first bevel gear 102 coupled to drive shaft 34. First bevel gear 102 is engaged with a second bevel gear 104, which is coupled to an axle 106 of first roller wheel 14. Thus, rotation of first bevel gear 102 causes corresponding rotation of second bevel gear 104, which in turn rotates axle 106, thereby rotating first roller wheel 14 about first axis 20. Rotation of spur gear 96 in the opposite direction, therefore, is configured to rotate first roller wheel 14 in the opposite direction as well. Drive systems 28 that utilize this arrangement may include a respective first bevel gear 102 and a respective second bevel gear 104 for each respective roller wheel of the end effector.

In the example wheel module 103 of FIG. 21, spur gear 96 drives drive shaft 34, which in turn rotates a worm screw 108 coupled to drive shaft 34 (e.g., worm screw 108 may be positioned on drive shaft 34, or integrally formed with drive shaft 34). Worm screw 108 is engaged with a worm gear 110, which is positioned on or coupled to axle 106. Thus, rotation of worm screw 108 causes corresponding rotation of worm gear 110, which in turn rotates axle 106, thereby rotating first roller wheel 14 about first axis 20. Rotation of spur gear 96 in the opposite direction, therefore, is configured to rotate first roller wheel 14 in the opposite direction as well. Drive systems 28 that utilize this arrangement may include a respective worm screw 108 and a respective worm gear 110 for each respective roller wheel of the end effector. Of course, other types of gears besides those illustrated in FIGS. 20-21 additionally or alternatively may be utilized in presently disclosed end effectors 10. For example, in addition to bevel and worm gear sets, other types of gears such as spiral bevel gears, and hypoid gear sets are also within the scope of the present disclosure.

As illustrated throughout the figures, but particularly apparent in FIGS. 20-21, drive systems 28 of disclosed end effectors 10 may be configured to avoid interference with objects 26 being engaged with, mated with, or disengage/launched from. For example, the gears and motors may be positioned under, beside, or out of the way from outer perimeter 52 (FIG. 1) defined by roller wheels 14, 16, 18. Additionally or alternatively, housing 98 and/or other components of support element 56 and/or support base 38 may be configured to at least partially shield or enclose one or more gears of drive system 28 and/or otherwise prevent passive receptacle 44 or object 26 from becoming entangled with the gears. For example, as shown in FIGS. 20-21, spur gears 96 may be separated from first roller wheel 14 by housing 98. Additionally or alternatively, first bevel gear 102, second bevel gear 104, worm screw 108, and/or worm gear 110 may be at least partially positioned within, at least partially shielded by, or at least partially enclosed by, housing 98. In other words, end effectors 10 may be configured such that roller wheels 14, 16, 18 are the only moving parts that passive receptacles 44 and objects 26 may contact during engagement with the object, because the gears and axles and drive shafts of drive system 28 may be substantially shielded via housing 98 and other support elements 56.

FIG. 22 shows an example of passive receptacle 44 hovering just above end effector 10, just before engagement by engaging the ring with the roller wheels and pulling the passive receptacle down over the roller wheels of end effector 10. In the example of FIG. 22, passive receptacle 44 is shown as a ring-type receptacle 64, that includes tapered edge guide 78 and a ring attachment structure 112, which may be sized and shaped to fit over and around roller wheels 14, 16, 18 when the object is engaged (e.g., when passive receptacle 44 is grasped by end effector 10). In other examples, passive receptacle 44 may simply be a ring, or a ring with ring attachment structure 112 without tapered edge guide 78. In some examples, tapered edge guide 78 may be stepped, rather than tapered. Ring attachment structures 112 may be larger or smaller, or different designs in various examples of systems 12. Similarly, the skirts or edge guides 78 may be larger or smaller in various examples of passive receptacles 44. Object 26 is not shown in FIG. 22, for clarity, though it is to be understood that an object 26 is coupled to or integrally formed with passive receptacle 44, such as via ring attachment structure 112.

As shown in FIG. 23, ring attachment structure 112 may be configured to support object 26 above end effector 10 when object 26 is engaged by end effector 10 via passive receptacle 44. For example, FIG. 23 shows object 26 in the form of a UAV 130 coupled to ring attachment structure 112 of ring-type receptacle 64. As shown, ring attachment structure 112 may be configured to both couple passive receptacle 44 to object 26, and also prevent object 26 from contacting roller wheels 14, 16, 18 when object 26 is engaged by end effector 10. For example, ring attachment structure 112 may be sized and shaped to fit atop or over the roller wheels of end effector 10 such that the ring attachment structure 112 itself need not contact the roller wheels in some examples, and such that object 26 (e.g., UAV 130) is held away from the roller wheels as well. Thus, in some examples, passive receptacle 44 may be configured such that ring-type receptacle 64 contacts the roller wheels to engage passive receptacle 44 (and thereby object 26), while also separating other components (e.g., ring attachment structure 112 and object 26) from the roller wheels. FIG. 23 shows passive receptacle 44 at rest on end effector 10 (e.g., with passive receptacle 44 being grasped, or engaged, by end effector 10). In this configuration, ring-type receptacle 64 has been pulled toward support base 38, past the centerlines of each roller wheel, such that the ring of ring-type receptacle 64 rests on, or is pressed against, stop structure 54. In this configuration, the ring of ring-type receptacle 64 is positioned about the outer perimeter 52 of the roller wheels of end effector 10. FIG. 23 shows an example of ring-type receptacle 64 having a ring with a smaller profile shape than the example of FIG. 22.

FIGS. 24-25 illustrate an example of engaging an object 26 with positional misalignment, via tapered edge guide 78 of passive receptacle 44. In the example of FIG. 24, passive receptacle 44 has approached end effector 10, though it is misaligned from roller wheels 14, 16, 18. Rather than being centered over all of roller wheels 14, 16, 18 of end effector 10, passive receptacle 44 is positionally misaligned such that tapered edge guide 78 contacts just first roller wheel 14 at the point of initial contact with end effector 10. However, rotation of first roller wheel 14 urges passive receptacle 44 into positional alignment, via friction applied to tapered edge guide 78 by first roller wheel 14. Thus, end effector 10 may be configured to account for such positional misalignment and automatically urge passive receptacle 44 into the correct alignment substantially centered over roller wheels 14, 16, 18, as shown in FIG. 25.

End effectors 10 may be modular such that they may be selectively set up differently for different tasks. For example, FIG. 26 illustrates an example of a shaft plate, or central hub 114, which may be an example of, incorporated into, or coupled to support base 38. Central hub 114 may include a plurality of drive shaft mounts 116. For example, drive shaft mounts 116 may be holes formed through central hub 114, or other forms of structural attachment points of central hub 114, for receiving different numbers of drive shafts 34 in different positions as described herein. In some examples, central hub 114 may include bearings (e.g., ball bearings or journal bearings) in the drive shaft mounts 116. The example of central hub 114 of FIG. 26 includes seven drive shaft mounts 116, individually labeled as 116a, 116b, 116c, 116d, 116e, 116f, and 116g, for illustrative purposes. Other examples of central hub 114 may include more or fewer drive shaft mounts 116, and/or drive shaft mounts 116 in different positions or arrangements than shown in the example. The placement of drive shaft mounts 116 may be configured to facilitate reconfiguration of end effector 10 to have different numbers of the roller wheels, which may enable disclosed end effectors 10 to be set up differently for various different tasks. Such a modular configuration can allow for selective addition or subtraction of drive shafts 34 from central hub 114 in a more efficient and simpler manner than creating systems with multiple different hubs or plates for different arrangements of drive shafts 34 and different numbers of roller wheels. Of course, such systems with multiple different hubs or plates for different arrangements of drive shafts 34 also are within the scope of the present disclosure.

Such modular functionality can create different numbers of drive shafts 34 for driving different numbers of roller wheels. For example, in an implementation having two roller wheels, drive shafts 34 may be mounted to (and/or may extend through) central hub 114 via drive shaft mounts 116d and 116g, or via drive shaft mounts 116b and 116e, either combination of which would allow for at least substantially equidistant spacing between two drive shafts 34 positioned through the respective drive shaft mounts that are at least substantially 180° apart (though such equidistant spacing is not a requirement for variations of end effectors 10 having two drive shafts 34). Similarly, in an implementation having three roller wheels, drive shafts 34 may be mounted to (and/or may extend through) central hub 114 via drive shaft mounts 116a, 116c, and 116f, which would allow for at least substantially equidistant spacing between three drive shafts 34 positioned through the respective drive shaft mounts that are at least substantially 120° apart (though such equidistant spacing is not a requirement for variations of end effectors 10 having three drive shafts 34; more generally, the horizontal angle between a first pair of geometric planes of rotation does not have to be the same as the horizontal angle between a second or subsequent pair of geometric planes of rotation). In an implementation having four roller wheels, drive shafts may be mounted to (and/or may extend through) central hub 114 via drive shaft mounts 116b, 116d, 116e, and 116g, which would allow for substantially equidistant spacing between four drive shafts positioned through the respective drive shaft mounts that are at least substantially 90° apart (though such equidistant spacing is not a requirement for variations of end effectors 10 having four drive shafts 34). Of course, other variations are also within the scope of the present disclosure, with or without substantially equidistant spacing between respective drive shafts 34 and corresponding roller wheels.

In some examples, end effector 10 may be configured such that the angle of roller wheels 14, 16, 18 and/or the diameter of outer perimeter 52 may be selectively adjustable (e.g., set manually before use). For example, FIGS. 27-28 schematically represent top plan views of non-exclusive examples of end effectors 10 that may be selectively adjustable in this manner.

In FIG. 27, roller wheels 14, 16, 18 are shown in a first configuration set manually before use. In this first configuration, first roller wheel 14 is aligned in, or defines, first geometric plane of rotation 118, second roller wheel 16 is aligned in, or defines, second geometric plane of rotation 120, and third roller wheel 18 is aligned in, or defines, third geometric plane of rotation 122. In this example, each of first geometric plane of rotation 118, second geometric plane of rotation 120, and third geometric plane of rotation 122 are oriented with respect to one another such that they are each non-perpendicular and non-parallel to each of the other respective geometric planes of rotation 118, 120, 122. Roller wheels 14, 16, 18 define outer perimeter 52, about which a ring-type receptacle 64 may be grasped by end effector 10. In this example, first geometric plane of rotation 118, second geometric plane of rotation 120, and third geometric plane of rotation 122 all intersect one another at or near a geometric center 124 of end effector 10.

In FIG. 28, roller wheels 14, 16, 18 are shown in a second configuration set manually before use. In this second configuration, each of roller wheels 14, 16, 18 has been pivoted clockwise a relatively small amount with respect to its respective drive shaft 34 (e.g., respective drive shaft 34 acting as a pivot axis for respective roller wheels 14, 16, 18). As a result of the pivoting of roller wheels 14, 16, 18, the diameter of outer perimeter 52 is reduced—in FIG. 28, the original outer perimeter 52 from FIG. 27 is shown in dashed line, while the reduced diameter outer perimeter 52' of the second configuration of FIG. 28 is shown in solid line. Thus, end effectors 10 may be selectively adjustable to engage with and/or mate with differently sized ring-type receptacles 64 by selectively adjusting the size of outer perimeter 52 via the orientation of roller wheels 14, 16, 18. Additionally or alternatively, end effectors 10 may be selectively adjustable to provide different levels of pressure to passive receptacles 44 being engaged by virtue of the changes to outer perimeter 52. The angle of roller wheels 14, 16, 18 may be adjusted to reduce the diameter of outer perimeter 52 to a greater extent than shown, or to increase the diameter of outer perimeter 52. In some examples, similar results may be obtained for examples of end effectors 10 configured to engage post-type receptacles 80—namely, the angles and spacing of roller wheels 14, 16, 18 may be selectively adjustable to create a larger or smaller interior space between roller wheels 14, 16, 18, for interfacing with larger or smaller posts 84 and enlarged nubs 86, and/or for adjusting the level of pressure applied to the post and/or the enlarged nubs by roller wheels 14, 16, 18. These selective adjustments of end effectors 10 can facilitate the use of end effectors 10 with different sizes of passive receptacles 44 without changing the size of roller wheels 14, 16, 18, though the size of roller wheels 14, 16, 18 may be selectively changed in various examples, additionally or alternatively to adjust the angles and/or positions of roller wheels 14, 16, 18.

As a result of the change in orientation of roller wheels 14, 16, 18, their respective planes also are shifted such that they do not intersect at geometric center 124 in the configuration shown in FIG. 28. For example, first geometric plane of rotation 118 still intersects second geometric plane of rotation 120 and third geometric plane of rotation 122 at a non-parallel and non-perpendicular angle (and second geometric plane of rotation 120 still intersects third geometric plane of rotation 122 at a non-parallel and non-perpendicular angle, as well), though they do not all intersect one another in the same point or along the same line.

FIGS. 29-31 schematically provide flowcharts that represent illustrative, non-exclusive examples of methods 200A-C according to the present disclosure. In FIG. 29, some steps are illustrated in dashed boxes indicating that such steps may be optional or may correspond to an optional version of a given method 200A-C according to the present disclosure. That said, not all methods 200A-C according to the present disclosure are required to include the steps illustrated in solid boxes. The methods 200A-C and steps illustrated in FIGS. 29-31 are not limiting and other methods and steps are within the scope of the present disclosure, including methods having greater than or fewer than the number of steps illustrated, as understood from the discussions herein.

Methods 200A-C generally include approaching an end effector (e.g., end effector 10) with a passive receptacle of an object being engaged (e.g., passive receptacle 44 of object 26), at 202. As the object gets closer to the end effector with the passive receptacle facing, or directed toward, the roller wheels (e.g., roller wheels 14, 16, 18) of the end effector, the passive receptacle is brought into contact with one or more roller wheels at 204. For example, contacting one or more roller wheels at 204 may include contacting an inward-facing surface of one or more roller wheels with an enlarged nub of a post-type receptacle (e.g., enlarged nub 86 of post-type receptacle 80), or contacting an outward facing surface and/or upper surface of one or more roller wheels with a ring of a ring-type receptacle (e.g., ring-type receptacle 64). The roller wheels typically will already have been rotating as the object approaches the end effector, thus, once the passive receptacle contacts one or more of the roller wheels of the end effector, the motion of the roller wheels serves to pull the passive receptacle onto or into the end effector, thereby engaging the object by grasping the passive receptacle at 206.

Additionally or alternatively, methods 200A-C may include approaching an object (e.g., a passive receptacle 44 of the object) with the end effector at 208 to contact one or more roller wheels with the passive receptacle at 204, and engage the object via the passive receptacle at 206. In other words, in various methods 200A-C, the end effector may be substantially stationary while the object approaches the end effector, the object may be substantially stationary while the end effector approaches the object, and/or both the end effector and the object may be moved toward one another to engage with and/or mate with one another.

Engaging the object at 206 includes rotating the roller wheels to pull at least a portion of the passive receptacle past the respective centerlines of the roller wheels such that it is effectively locked onto or between the roller wheels of the end effector (which may be referred to as a locked configuration). In the locked configuration, the end effector is configured such that the passive receptacle will remain grasped by the roller wheels even when the drive system is turned off and the roller wheels are stationary. To engage the object at 206, the passive receptacle may be grasped by the roller wheels such that the passive receptacle is positioned exteriorly about an outer perimeter defined by the roller wheels, when the object is engaged. Additionally or alternatively, engaging the passive receptacle at 206 may include grasping the passive receptacle such that the passive receptacle is positioned interiorly to and between the first roller wheel and the second roller wheel. In some examples, engaging the passive receptacle at 206 includes drawing the enlarged nub of the passive receptacle past the first centerline of the first roller wheel and the second centerline of the second roller wheel. Additionally or alternatively, engaging the passive receptacle at 206 may include automatically locking the passive receptacle in place between the first roller wheel and the second roller wheel and one or more stop structures of the end effector (e.g., stop structures 54) or stop structures of the passive receptacle itself (e.g., base plate 82). In some examples, engaging the passive receptacle at 206 comprises engaging an upper surface of the roller wheels with the base plate of the post-type receptacle, such that the base plate is configured to act as a stop structure that limits movement of the object with respect to the end effector. Processors or controllers of disclosed systems may utilize one or more decision steps to determine whether the target object has been engaged, and thus whether to continue rotating the roller wheels for the engagement configuration, whether to stop the roller wheels, and/or whether to reverse the roller wheels for the launch/disengagement configuration of the end effector.

To this end, methods 200A-C may include disengaging or launching the object from the end effector at 210. Disengaging or launching the object from the end effector at 210 may be accomplished by reversing directions of rotation of the roller wheels, such that the passive receptacle and the object are pushed off of and/or away from the roller wheels of the end effector. In disengaging or launching the object at 210, the roller wheels push or force at least a portion of the passive receptacle backwards past the respective centerlines of the roller wheels until the passive receptacle is pushed off of the end effector via the roller wheels. In some methods 200A-C, after the object is launched at 210 it may later be engaged and/or mated to the end effector by approaching the end effector with the object at 202 and/or approaching the object with the end effector at 208, to initiate the engagement sequence.

Methods 200A-C may be performed to engage with, mate with, and/or disengage from a UAV or other type of aircraft or object. In other examples, methods 200A-C may be performed to, for example, grab a cable or grab an object lifted by a cable, or pick up and/or move a package or a load via the engaging the object at 206. In other examples, methods 200A-C may be performed for applications involving mating components, such as in manufacturing (e.g., robotic material handling), engaging the refueling probe of an aerial refueling system, and agriculture usages (e.g., picking fruit and other agricultural products). Methods 200A-C also may be used in underwater applications, such as by an autonomous underwater vehicle ("AUV"), an unmanned underwater vehicle ("UUV"), or a remotely operated vehicle ("ROV").

An end effector comprising two or more roller wheels can provide for the engagement, locking, and/or disengagement of a flying or hovering object, with a single-axis roller-gripper configuration or a multi-axis roller-gripper configuration, by changing a locking dimension of the end effector from a passive locking configuration to an active locking configuration and/or from the active locking configuration to the passive locking configuration.

As used herein, the term "locking dimension" means, for engagement with, locking, and/or disengagement from a ring-type receptacle, a diameter of an outer capture circle, and for engagement with, locking, and/or disengagement from a post-type receptacle, a diameter of an inner capture circle.

As used herein, the term "passive locking configuration" means that the two or more roller wheels of the end effector are oriented, positioned, or oriented and positioned to allow engagement with and/or disengagement from a target object (e.g., for engagement with and/or disengagement from a ring-type receptacle of a given target object, the diameter of the outer capture circle allows engagement with and/or disengagement from the given target object, and for engagement with and/or disengagement from a post-type receptacle, the diameter of the inner capture circle allows engagement with and/or disengagement from the given target object). In a first example, for an object with a ring-type receptacle, passive locking occurs when the two or more roller wheels pull the ring-type receptacle of the object past the centerline of the two or more roller wheels in a first direction (e.g., the object is captured by the end effector). In a second example, for the object with the ring-type receptacle, the object is released by the end effector when the two or more roller wheels push the ring-type receptacle of the object past the centerline of the two or more roller wheels in a second direction generally opposite to the first direction.

As used herein, the term "active locking configuration" means that the two or more roller wheels of the end effector are oriented, positioned, or oriented and positioned to prevent engagement with and/or disengagement from a target object and/or to lock the target object to the end effector (e.g., for engagement with and/or disengagement from a ring-type receptacle of a given target object, the diameter of the outer capture circle prevents engagement with and/or disengagement from the given target object and/or locks the given target object to the end effector, and for engagement with and/or disengagement from a post-type receptacle, the diameter of the inner capture circle prevents engagement with and/or disengagement from the given target object and/or locks the given target object to the end effector). In a first example, for an object with a ring-type receptacle, active locking occurs when the object is already passively locked by the end effector and then one or more wheel modules of the two or more roller wheels are rotated about a pivot axis of the one or more wheel modules in a first rotation direction so as to tighten the two or more roller wheels against the ring-type receptacle. In a second example, for the object with the ring-type receptacle, active unlocking occurs when the object is already actively locked by the end effector and then one or more wheel modules of the two or more roller wheels are rotated about a pivot axis of the one or more wheel modules in a second rotation direction, opposite to the first direction, so as to loosen the two or more roller wheels from the ring-type receptacle so that the object is passively locked.

For example, an operator can set the locking dimension of the inner capture circle for an object having a post-type receptacle at a value corresponding to a passive locking configuration. Once the object is engaged and captured, the operator can change the locking dimension of the inner capture circle from the passive locking configuration to an active locking configuration, which would decrease the diameter of the inner capture circle to lock the object into the end effector (e.g., more tightly hold the post-type receptacle). In addition or in the alternative, the operator could engage a locking mechanism configured to lock the object to the end effector independent of the roller wheels. To reverse this process, assuming that the locking mechanism has not been used or has been unlocked, the operator can change the locking dimension of the inner capture circle from the active locking configuration to a passive locking configuration, which would increase the diameter of the inner capture circle in order to allow the object to disengage from the end effector (e.g., less tightly hold the post-type receptacle).

In some examples of the end effector, the end effector can comprise: a support base; and two or more roller wheels mounted on the support base.

For end effectors with two roller wheels (e.g., first and second roller wheels), the drive axis for rotating the first roller wheel is perpendicular to a first geometric plane of rotation of the first roller wheel, and the drive axis for rotating the second roller wheel is perpendicular to a second geometric plane of rotation of the second roller wheel.

Although not required, the drive axis for rotating the first roller wheel and the drive axis for rotating the second roller wheel can be parallel to each other and can define a third geometric plane that is perpendicular to both the first and second geometric planes of rotation. The support base can be parallel to the third geometric plane.

Generally, the first and second roller wheels can be located on opposite sides of a center point of the third geometric plane ("geometric center"), with the drive axis for rotating the first roller wheel and the drive axis for rotating the second roller wheel being equidistant from the geometric center of the third geometric plane. If viewed from a direction perpendicular to the geometric center of the third geometric plane, a horizontal angle between the first geometric plane of rotation and the second geometric plane of rotation can be approximately 180°, which effectively can result in the first geometric plane of rotation and the second geometric plane of rotation being parallel or coplanar.

In part because of this horizontal angle, when the first roller wheel turns about the drive axis for rotating the first roller wheel and the second roller wheel turns about the drive axis for rotating the second roller wheel, the sense of movement of the first and second roller wheels relative to the geometric center is the same—that is, the first and second roller wheels both rotate inward (e.g., for engagement) or the first and second roller wheels both rotate outward (e.g., for disengagement).

Although not required, a pivot axis for swiveling the first roller wheel and a pivot axis for swiveling the second roller wheel can be parallel to each other and can be perpendicular to the third geometric plane.

As discussed above, generally, the first and second roller wheels can be located on opposite sides of the geometric center of the third geometric plane, with the pivot axis for swiveling the first roller wheel and the pivot axis for swiveling the second roller wheel being equidistant from the geometric center of the third geometric plane. If viewed from a direction perpendicular to the geometric center of the third geometric plane, when the first roller wheel turns about the pivot axis for swiveling the first roller wheel and the second roller wheel turns about the pivot axis for swiveling the second roller wheel, the sense of movement of the first and second roller wheels relative to the third geometric plane is the same—that is, the first and second roller wheels both swivel clockwise or the first and second roller wheels both swivel counterclockwise.

For end effectors with three roller wheels (e.g., first, second, and third roller wheels), the drive axis for rotating the first roller wheel is perpendicular to a first geometric plane of rotation of the first roller wheel, the drive axis for rotating the second roller wheel is perpendicular to a second geometric plane of rotation of the second roller wheel, and the drive axis for rotating the third roller wheel is perpendicular to a third geometric plane of rotation of the third roller wheel.

Although not required, the drive axis for rotating the first roller wheel, the drive axis for rotating the second roller wheel, and the drive axis for rotating the third roller wheel can define a fourth geometric plane that is mutually perpendicular to the first, second, and third geometric planes of rotation. The support base can be parallel to the fourth geometric plane.

Generally, the first, second, and third roller wheels can be located around a center point of the fourth geometric plane ("geometric center"), with the drive axis for rotating the first roller wheel, the drive axis for rotating the second roller wheel, and the drive axis for rotating the third roller wheel being equidistant from the geometric center of the fourth geometric plane. If viewed from a direction perpendicular to the geometric center of the fourth geometric plane, a horizontal angle between the first geometric plane of rotation and the second geometric plane of rotation can be approximately 120°, a horizontal angle between the second geometric plane of rotation and the third geometric plane of rotation can be approximately 120°, and a horizontal angle between the third geometric plane of rotation and the first geometric plane of rotation can be approximately 120°. However, the horizontal angle between any pair of geometric planes of rotation is not required to be the same as the horizontal angle between any other pair of geometric planes of rotation.

In part because of these horizontal angles, when the first roller wheel turns about the drive axis for rotating the first roller wheel, the second roller wheel turns about the drive axis for rotating the second roller wheel, and the third roller wheel turns about the drive axis for rotating the third roller wheel, the sense of movement of the first, second, and third roller wheels relative to the geometric center is the same—that is, the first, second, and third roller wheels all rotate inward (e.g., for engagement) or the first, second, and third roller wheels all rotate outward (e.g., for disengagement). Although not required, a pivot axis for swiveling the first roller wheel, a pivot axis for swiveling the second roller wheel, and a pivot axis for swiveling the third roller wheel can be parallel to each other and can be perpendicular to the fourth geometric plane.

As discussed above, generally, the first, second, and third roller wheels can be located around the geometric center of the fourth geometric plane, with the pivot axis for swiveling the first roller wheel, the pivot axis for swiveling the second roller wheel, and the pivot axis for swiveling the third roller wheel being equidistant from the geometric center of the fourth geometric plane. If viewed from a direction perpendicular to the geometric center of the fourth geometric plane, when the first roller wheel turns about the pivot axis for swiveling the first roller wheel, the second roller wheel turns about the pivot axis for swiveling the second roller wheel, and the third roller wheel turns about the pivot axis for swiveling the third roller wheel, the sense of movement of the first, second, and third roller wheels relative to the fourth geometric plane is the same—that is, the first, second, and third roller wheels all swivel clockwise or the first, second, and third roller wheels all swivel counterclockwise.

As would be understood by a PHOSITA, for end effectors with 'n' roller wheels, when viewed from a direction perpendicular to the geometric center of the geometric plane defined by the drive axes for rotating the 'n' roller wheels, a horizontal angle between two adjacent geometric planes of rotation can be, but is not required to be, approximately 360°/n (e.g., 90° for 'n'=4, 72° for 'n'=5, 60° for 'n'=6).

Similar to FIG. 27, FIG. 32A shows a top plan schematic representation of first roller wheel 3214, second roller wheel 3216, and third roller wheel 3218 around geometric center 3226. Drive shafts 3234 are shown for first roller wheel 3214, second roller wheel 3216, and third roller wheel 3218.

Outer perimeter 3252 (e.g., an "outer capture circle") defines a first locking dimension of first roller wheel 3214, second roller wheel 3216, and third roller wheel 3218 around geometric center 3226 with the orientation shown of first roller wheel 3214, second roller wheel 3216, and third roller wheel 3218. However, unlike FIG. 27, in which the first configuration can be selectively adjustable (e.g., set manually before use), in FIG. 32A, the roller-gripper end effector systems of the present application provide for real-time adjustment of the orientation, position, or orientation and position of first roller wheel 3214, second roller wheel 3216, and third roller wheel 3218. In some examples, this real-time adjustment can be provided by swiveling the associated roller wheel around a pivot axis, such as its associated drive shaft 3234, either clockwise or counterclockwise in the top plan schematic representation shown in FIG. 32A.

FIG. 32A also shows first geometric plane of rotation 3220 of first roller wheel 3214, second geometric plane of rotation 3222 of second roller wheel 3216, third geometric plane of rotation 3224 of third roller wheel 3218, and fourth geometric plane 3228. Fourth geometric plane 3228 is mutually perpendicular to first geometric plane of rotation 3220, second geometric plane of rotation 3222, and third geometric plane of rotation 3224.

As shown in FIG. 32A, the horizontal angle between first geometric plane of rotation 3220 and second geometric plane of rotation 3222, measured in fourth geometric plane 3228, is approximately 120°; the horizontal angle between second geometric plane of rotation 3222 and third geometric plane of rotation 3224, measured in fourth geometric plane 3228, is approximately 120°; and the horizontal angle between third geometric plane of rotation 3224 and first geometric plane of rotation 3220, measured in fourth geometric plane 3228, is approximately 120°. As discussed above, the horizontal angle between a first pair of geometric planes of rotation does not have to be the same as the horizontal angle between a second or subsequent pair of geometric planes of rotation. In addition, there is no requirement that the horizontal angle between any pair of geometric planes of rotation is approximately 120° (or any other specific horizontal angle).

As shown in FIG. 32A, the intersection of first geometric plane of rotation 3220 and second geometric plane of rotation 3222 can define a first line perpendicular to fourth geometric plane 3228 (e.g., in a direction in/out of the page), the intersection of second geometric plane of rotation 3222 and third geometric plane of rotation 3224 can define a second line perpendicular to fourth geometric plane 3228 (e.g., in a direction in/out of the page), and the intersection of third geometric plane of rotation 3224 and first geometric plane of rotation 3220 can define a third line perpendicular to fourth geometric plane 3228 (e.g., in a direction in/out of the page). In this case, the first, second, and third lines can be coincident (e.g., in a direction in/out of the page). However, if one or more of the intersections of the geometric planes of rotation do not define a line perpendicular to fourth geometric plane 3228, then the first, second, and third lines may not be coincident.

Similar to FIG. 28, FIG. 32B shows a top plan schematic representation of first roller wheel 3214, second roller wheel 3216, and third roller wheel 3218 around geometric center 3226. Drive shafts 3234 are shown for first roller wheel 3214, second roller wheel 3216, and third roller wheel 3218.

Reduced diameter outer perimeter 3252' (e.g., an "outer capture circle") defines a second locking dimension of first roller wheel 3214, second roller wheel 3216, and third roller wheel 3218 around geometric center 3226 with the orientation shown of first roller wheel 3214, second roller wheel 3216, and third roller wheel 3218. However, unlike FIG. 28, in which the second configuration can be selectively adjustable (e.g., set manually before use), in FIG. 32B, the roller-gripper end effector systems of the present application provide for real-time adjustment of the orientation, position, or orientation and position of first roller wheel 3214, second roller wheel 3216, and third roller wheel 3218. In some examples, this real-time adjustment can be provided by swiveling the associated roller wheel around a pivot axis, such as its associated drive shaft 3234, either clockwise or counterclockwise in the top plan schematic representation shown in FIG. 32B.

FIG. 32B also shows first geometric plane of rotation 3220 of first roller wheel 3214, second geometric plane of rotation 3222 of second roller wheel 3216, third geometric plane of rotation 3224 of third roller wheel 3218, and fourth geometric plane 3228. As in FIG. 32B, fourth geometric plane 3228 is mutually perpendicular to first geometric plane of rotation 3220, second geometric plane of rotation 3222, and third geometric plane of rotation 3224.

As shown in FIG. 32B, the horizontal angle between first geometric plane of rotation 3220 and second geometric plane of rotation 3222, measured in fourth geometric plane 3228, is approximately 120°; the horizontal angle between second geometric plane of rotation 3222 and third geometric plane of rotation 3224, measured in fourth geometric plane 3228, is approximately 120°; and the horizontal angle between third geometric plane of rotation 3224 and first geometric plane of rotation 3220, measured in fourth geometric plane 3228, is approximately 120°. As discussed above, the horizontal angle between a first pair of geometric planes of rotation does not have to be the same as the horizontal angle between a second or subsequent pair of geometric planes of rotation. In addition, there is no requirement that the horizontal angle between any pair of geometric planes of rotation is approximately 120° (or any other specific horizontal angle).

As shown in FIG. 32B, the intersection of first geometric plane of rotation 3220 and second geometric plane of rotation 3222 can define a first line perpendicular to fourth geometric plane 3228 (e.g., in a direction in/out of the page), the intersection of second geometric plane of rotation 3222 and third geometric plane of rotation 3224 can define a second line perpendicular to fourth geometric plane 3228 (e.g., in a direction in/out of the page), and the intersection of third geometric plane of rotation 3224 and first geometric plane of rotation 3220 can define a third line perpendicular to fourth geometric plane 3228 (e.g., in a direction in/out of the page). In this case, the first, second, and third lines are not coincident, but can be parallel to each other (e.g., in directions in/out of the page). However, if one or more of the intersections of the geometric planes of rotation do not define a line perpendicular to fourth geometric plane 3228, then the first, second, and third lines may not be parallel to each other.

As can be seen in FIG. 32B, the diameter of outer perimeter 3252 is greater than the diameter of reduced diameter outer perimeter 3252'. In FIG. 32B, both outer perimeter 3252 and reduced diameter outer perimeter 3252' are examples of an "outer capture circle".

Real-time adjustment of the locking dimension of the outer capture circle among outer perimeter 3252, reduced diameter outer perimeter 3252', or other values for the locking dimension can be provided by swiveling the associated roller wheel around a pivot axis, such as its associated drive shaft 3234, either clockwise or counterclockwise in the top plan schematic representation shown in FIG. 32B.

As discussed above, in FIGS. 32A and 32B, the roller-gripper end effector systems of the present application provide for real-time adjustment of the orientation, position, or orientation and position of first roller wheel 3214, second roller wheel 3216, and third roller wheel 3218. This capability for real-time adjustment of the orientation, position, or orientation and position of first roller wheel 3214, second roller wheel 3216, and third roller wheel 3218 allows an operator, during use of the end effector, to change the locking dimension of an outer capture circle (for engagement with, locking, and/or disengagement from a ring-type receptacle) and/or the locking dimension of an inner capture circle (for engagement with, locking, and/or disengagement from a post-type receptacle).

Thus, an operator, during use of the end effector, can change the locking dimension of an outer capture circle (for engagement with, locking, or disengagement from a ring-type receptacle), for example, by shifting from outer perimeter 3252 toward and/or past reduced diameter outer perimeter 3252' or shifting from reduced diameter outer perimeter 3252' toward and/or past outer perimeter 3252. In a corresponding way, the operator, during use of the end effector, can change the locking dimension of an inner capture circle (for engagement with, locking, or disengagement from a post-type receptacle), for example, by adjusting the outermost diameter of the inner capture circle, as can be envisioned in FIG. 32B.

In this way, the operator can, for example, in real-time change first roller wheel 3214, second roller wheel 3216, and third roller wheel 3218 from a passive locking configuration to an active locking configuration or change first roller wheel 3214, second roller wheel 3216, and third roller wheel 3218 from the active locking configuration to the passive locking configuration. In addition or in the alternative, the operator can: tune engagement forces of first roller wheel 3214, second roller wheel 3216, and third roller wheel 3218; tune locking forces of first roller wheel 3214, second roller wheel 3216, and third roller wheel 3218; tune disengagement forces of first roller wheel 3214, second roller wheel 3216, and third roller wheel 3218; compensate for wear on first roller wheel 3214, second roller wheel 3216, and third roller wheel 3218; and/or compensate for wear on a passive receptacle of an object for engagement, locking, and/or disengagement (e.g., UAV, UUV).

FIG. 32C shows a top plan view of a portion of outer capture circle 3201, illustrating an example calculation for radius R of outer capture circle 3201 when a roller wheel of a given wheel module is pivoted to angle θ relative to a radial direction of outer capture circle 3201:

$$R = r + (r_w + d_1) * \cos(\theta) + d_2 * \sin(\theta);$$

R is the radius of outer capture circle 3201;
r is the distance from center 3221 of outer capture circle 3201 to pivot point 3223, in a plane of outer capture circle 3201, for the given wheel module;
$r_w$ is the radius of the associated roller wheel;
$d_1$ is the vertical distance (e.g., in a direction perpendicular to both the axle/drive axis and the pivot axis) from pivot point 3223, in the plane of outer capture circle 3201, to the axle/drive axis of the associated roller wheel;
$d_2$ is the horizontal offset between the pivot axis (e.g., in a direction parallel to the axle/drive axis through pivot point 3223) and geometric plane of rotation 3225 (e.g., perpendicular to the page) of the associated roller wheel; and
θ is the pivot angle relative to a radial direction for outer capture circle 3201.

In some examples, first roller wheel 3214, second roller wheel 3216, and/or third roller wheel 3218 can have one or more compliant regions. Additionally or alternatively, the durometer of one or more of roller wheels 3214, 3216, 3218 can be selected based on the type of object intended to be engaged. For example, roller wheels 3214, 3216, 3218 can be selected to be more rigid for applications involving heavier engagements (e.g., heavier passive receptacles and/or objects). In some examples, one or more or roller wheels 3214, 3216, 3218 can be pneumatic, with selectively adjustable tire pressures such that they can be increased or decreased as needed for different applications. One or more of roller wheels 3214, 3216, 3218 can be compressible and/or compliant in some examples. Additionally or alternatively, one or more of roller wheels 3214, 3216, 3218 can be airless. These adjustments can be selected based on the weight, mass, and/or materials used in the objects intended to be engaged.

In addition to radius R of outer capture circle 3201, an operator can factor in the adjustments and considerations discussed above when effectively selecting the locking dimension for engagement with, locking, and/or disengagement from a ring-type receptacle. Similarly, in addition to the radius of an inner capture circle, the operator can factor in the adjustments and considerations discussed above when effectively selecting the locking dimension for engagement with, locking, and/or disengagement from a post-type receptacle.

Similar to FIG. 21, FIG. 33A shows a top plan view of example wheel module 3303 of an end effector of first roller wheel 3314, and FIG. 33B shows side elevational views of example wheel module 3303 of an end effector of first roller wheel 3314, both along axle/drive axis 3306 for rotating first roller wheel 3314 (left-hand side) and perpendicular to axle/drive axis 3306 for rotating first roller wheel 3314 (right-hand side). A similar description would apply to second roller wheel 3316, third roller wheel 3318, or additional roller wheels.

In the example of FIGS. 33A and 33B, first roller wheel 3314 and associated axle/drive axis 3306 for rotating first roller wheel 3314 are supported by support elements 3356 on housing 3398 of example wheel module 3303. Rotation of spur gear 3396 in a first direction drives drive shaft 3334, which in turn rotates worm screw 3308 coupled to drive shaft 3334 (e.g., worm screw 3308 can be positioned on drive shaft 3334 or integrally formed with drive shaft 3334). Worm screw 3308 is engaged with worm gear 3310, which is positioned on or coupled to axle/drive axis 3306 for rotating first roller wheel 3314. Thus, rotation of worm screw 3308 causes corresponding rotation of worm gear 3310, which in turn rotates axle/drive axis 3306 for rotating first roller wheel 3314, thereby rotating first roller wheel 3314. Rotation of spur gear 3396 in an opposite second direction, therefore, is configured to rotate first roller wheel 3314 in an opposite rotation direction, as well. Drive systems that utilize this arrangement may include a respective worm screw and worm gear for each respective roller wheel of the end effector. Of course, other types of gears besides those illustrated in FIGS. 33A and 33B, additionally or alternatively, can be utilized in presently disclosed end effectors. For example, in addition to worm gear sets, other types of gears such as spiral bevel gears and hypoid gear sets are also within the scope of the present disclosure.

Similar to FIG. 33A, FIG. 33C shows a top plan view of example wheel modules 3303 of first roller wheel 3314, second roller wheel 3316, and third roller wheel 3318. FIG. 33C shows a top plan view of a three-layer overlay (bottom layer, middle layer, top layer) of first roller wheel 3314, second roller wheel 3316, and third roller wheel 3318, each in three different corresponding pivot orientations of first roller wheel 3314, second roller wheel 3316, and third roller wheel 3318, so that the bottom layer includes first roller wheel 3314, second roller wheel 3316, and third roller wheel 3318 in a first pivot orientation; the middle layer includes first roller wheel 3314, second roller wheel 3316, and third roller wheel 3318 in a second pivot orientation; and the top layer includes first roller wheel 3314, second roller wheel 3316, and third roller wheel 3318 in a third pivot orientation.

In FIG. 33C, in the first pivot orientation of first roller wheel 3314, second roller wheel 3316, and third roller wheel 3318, reduced diameter outer perimeter 3352' defines a first locking dimension of first roller wheel 3314, second roller wheel 3316, and third roller wheel 3318; in the second pivot orientation of first roller wheel 3314, second roller wheel 3316, and third roller wheel 3318, outer perimeter 3352 defines a second locking dimension of first roller wheel 3314, second roller wheel 3316, and third roller wheel 3318; and in the third pivot orientation of first roller wheel 3314, second roller wheel 3316, and third roller wheel 3318, expanded diameter outer perimeter 3352" defines a third locking dimension of first roller wheel 3314, second roller wheel 3316, and third roller wheel 3318.

As can be seen in FIG. 33C, the diameter of expanded diameter outer perimeter 3352" is greater than the diameter of outer perimeter 3352, which in turn is greater than the diameter of reduced diameter outer perimeter 3352'. In FIG. 33C, each of expanded diameter outer perimeter 3352", outer perimeter 3352, and reduced diameter outer perimeter 3352' is an example of an "outer capture circle".

Real-time adjustment of the locking dimension among outer perimeter 3352, reduced diameter outer perimeter 3352', expanded diameter outer perimeter 3352", or other values for the locking dimension can be provided by swiveling the associated roller wheel around a pivot axis, such as its associated drive shaft 3334, either clockwise or counterclockwise in the top plan view shown in FIG. 33C.

As discussed above, the roller-gripper end effector systems of the present application provides for real-time adjustment of the orientation, position, or orientation and position of first roller wheel 3314, second roller wheel 3316, and third roller wheel 3318. Thus, an operator, during use of the end effector, can change the locking dimension of an outer capture circle (for engagement with, locking, or disengagement from a ring-type receptacle), for example, by shifting from outer perimeter 3352 toward and/or past reduced diameter outer perimeter 3352' or shifting from outer perimeter 3352 toward and/or past expanded diameter outer perimeter 3352". In a corresponding way, the operator, during use of the end effector, can change the locking dimension of an inner capture circle (for engagement with, locking, or disengagement from a post-type receptacle), for example, by adjusting the outermost diameter of the inner capture circle, as can be envisioned in FIG. 33C.

In this way, the operator can, for example, in real-time change first roller wheel 3314, second roller wheel 3316, and third roller wheel 3318 from a passive locking configuration to an active locking configuration or change first roller wheel 3314, second roller wheel 3316, and third roller wheel 3318 from the active locking configuration to the passive locking configuration. In addition or in the alternative, the operator can: tune engagement forces of first roller wheel 3314, second roller wheel 3316, and third roller wheel 3318; tune locking forces of first roller wheel 3314, second roller wheel 3316, and third roller wheel 3318; tune disengagement forces of first roller wheel 3314, second roller wheel 3316, and third roller wheel 3318; compensate for wear on first roller wheel 3314, second roller wheel 3316, and third roller wheel 3318; and/or compensate for wear on a passive receptacle of an object for engagement, locking, and/or disengagement (e.g., UAV, UUV).

Similar to FIG. 20, FIG. 34A shows a top plan view of example wheel module 3401 of an end effector of first roller wheel 3414, and FIG. 34B shows side elevational views of example wheel module 3401 of an end effector of first roller wheel 3414, both along axle/drive axis 3406 for rotating first roller wheel 3414 (left-hand side) and perpendicular to axle/drive axis 3406 for rotating first roller wheel 3414 (right-hand side). A similar description would apply to second roller wheel 3416, third roller wheel 3418, or additional roller wheels.

In the example of FIGS. 34A and 34B, first roller wheel 3414 and associated axle/drive axis 3406 for rotating first roller wheel 3414 are supported by support elements 3456 on housing 3498 of example wheel module 3401. Rotation of spur gear 3496 in a first direction drives drive shaft 3434, which in turn rotates first bevel gear 3402 coupled to drive shaft 3434 (e.g., first bevel gear 3402 can be positioned on drive shaft 3434 or integrally formed with drive shaft 3434). First bevel gear 3402 is engaged with second bevel gear 3404, which is positioned on or coupled to axle/drive axis 3406 for rotating first roller wheel 3414. Thus, rotation of first bevel gear 3402 causes corresponding rotation of second bevel gear 3404, which in turn rotates axle/drive axis 3406 for rotating first roller wheel 3414, thereby rotating first roller wheel 3414. Rotation of spur gear 3496 in an opposite second direction, therefore, is configured to rotate first roller wheel 3414 in an opposite rotation direction, as well. Drive systems that utilize this arrangement may include a respective first and second bevel gear for each respective roller wheel of the end effector. Of course, other types of gears besides those illustrated in FIGS. 34A and 34B, additionally or alternatively, can be utilized in presently disclosed end effectors. For example, in addition to bevel gear sets, other types of gears such as spiral bevel gears and hypoid gear sets are also within the scope of the present disclosure.

Similar to FIG. 34A, FIG. 34C shows a top plan view of first roller wheel 3414, second roller wheel 3416, and third roller wheel 3418. FIG. 34C shows a top plan view of a three-layer overlay (bottom layer, middle layer, top layer) of first roller wheel 3414, second roller wheel 3416, and third roller wheel 3418, each in three different corresponding pivot orientations of first roller wheel 3414, second roller wheel 3416, and third roller wheel 3418, so that the bottom layer includes first roller wheel 3414, second roller wheel 3416, and third roller wheel 3418 in a first pivot orientation; the middle layer includes first roller wheel 3414, second roller wheel 3416, and third roller wheel 3418 in a second pivot orientation; and the top layer includes first roller wheel 3414, second roller wheel 3416, and third roller wheel 3418 in a third pivot orientation.

In FIG. 34C, in the first pivot orientation of first roller wheel 3414, second roller wheel 3416, and third roller wheel 3418, reduced diameter outer perimeter 3452' defines a first locking dimension of first roller wheel 3414, second roller wheel 3416, and third roller wheel 3418; in the pivot second orientation of first roller wheel 3414, second roller wheel 3416, and third roller wheel 3418, outer perimeter 3452 defines a second locking dimension of first roller wheel 3414, second roller wheel 3416, and third roller wheel 3418; and in the third pivot orientation of first roller wheel 3414, second roller wheel 3416, and third roller wheel 3418, expanded diameter outer perimeter 3452" defines a third locking dimension of first roller wheel 3414, second roller wheel 3416, and third roller wheel 3418.

As can be seen in FIG. 34C, the diameter of expanded diameter outer perimeter 3452" is greater than the diameter of outer perimeter 3452, which in turn is greater than the diameter of reduced diameter outer perimeter 3452'. In FIG. 34C, each of expanded diameter outer perimeter 3452", outer perimeter 3452, and reduced diameter outer perimeter 3452' is an example of an "outer capture circle".

Real-time adjustment of the locking dimension among outer perimeter 3452, reduced diameter outer perimeter 3452', expanded diameter outer perimeter 3452", or other values for the locking dimension can be provided by swiveling the associated roller wheel around a pivot axis, such as its associated drive shaft 3434, either clockwise or counter-clockwise in the top plan view shown in FIG. 34C.

As discussed above, the roller-gripper end effector systems of the present application provides for real-time adjustment of the orientation, position, or orientation and position of first roller wheel 3414, second roller wheel 3416, and third roller wheel 3418. Thus, an operator, during use of the end effector, can change the locking dimension of an outer capture circle (for engagement with, locking, or disengagement from a ring-type receptacle), for example, by shifting from outer perimeter 3452 toward and/or past reduced diameter outer perimeter 3452' or shifting from outer perimeter 3452 toward and/or past expanded diameter outer perimeter 3452". In a corresponding way, the operator, during use of the end effector, can change the locking dimension of an inner capture circle (for engagement with, locking, or disengagement from a post-type receptacle), for example, by adjusting the outermost diameter of the inner capture circle, as can be envisioned in FIG. 34C.

In this way, the operator can, for example, in real-time change first roller wheel 3414, second roller wheel 3416, and third roller wheel 3418 from a passive locking configuration to an active locking configuration or change first roller wheel 3414, second roller wheel 3416, and third roller wheel 3418 from the active locking configuration to the passive locking configuration. In addition or in the alternative, the operator can: tune engagement forces of first roller wheel 3414, second roller wheel 3416, and third roller wheel 3418; tune locking forces of first roller wheel 3414, second roller wheel 3416, and third roller wheel 3418; tune disengagement forces of first roller wheel 3414, second roller wheel 3416, and third roller wheel 3418; compensate for wear on first roller wheel 3414, second roller wheel 3416, and third roller wheel 3418; and/or compensate for wear on a passive receptacle of an object for engagement, locking, and/or disengagement (e.g., UAV, UUV).

FIGS. 35A-35E show a top plan view of linkage actuation 3500 to provide for real-time adjustment of the orientation, position, or orientation and position of first roller wheel 3514, second roller wheel 3516, and third roller wheel 3518 using, for example, bevel gear sets similar to FIGS. 34A-34C.

As shown in FIG. 35A, linkage actuation 3500 can include, for example, adjustment motor 3502, lever 3504, first connector 3506, second connector 3508, first link 3540, second link 3542, third link 3544, fourth link 3546, fifth link 3548, sixth link 3550, and frame structure 3538. Although end portions of successive links are connected (e.g., an end portion of first link 3540 is connected to an end portion of second link 3542, while an opposite end portion of first link 3540 is connected to an end portion of sixth link 3550), the angle between such successive links is not fixed, but varies as adjustment motor 3502 moves lever 3504. In addition, third link 3544 is connected to first roller wheel 3514 via associated housing 3598, fifth link 3548 is connected to second roller wheel 3516 via associated housing 3598, and first link 3540 is connected to third roller wheel 3518 via associated housing 3598.

Operation of adjustment motor 3502 moves lever 3504, first connector 3506, and second connector 3508. In response, first link 3540, second link 3542, third link 3544, fourth link 3546, fifth link 3548, and sixth link 3550 all move relative to frame structure 3538, swiveling housings 3598 about respective pivot axes, such as the associated drive shafts 3534. As a result, linkage actuation 3500 causes first roller wheel 3514, second roller wheel 3516, and third roller wheel 3518 to pivot at the same time, in the same pivot direction as seen from the top plan view, and through the same pivot angle as seen from the top plan view.

FIG. 35B shows linkage actuation 3500 after adjustment motor 3502 has moved lever 3504 counterclockwise, causing first link 3540, second link 3542, third link 3544, fourth link 3546, fifth link 3548, and sixth link 3550 to swivel housings 3598 about respective pivot axes, such as the associated drive shafts 3534, so that first roller wheel 3514, second roller wheel 3516, and third roller wheel 3518 all are oriented at approximately −9° relative to a predetermined neutral pivot orientation (e.g., the predetermined neutral pivot orientation can correspond, for example, to a pivot orientation of first roller wheel 3514, second roller wheel 3516, and third roller wheel 3518 in which first link 3540, second link 3542, third link 3544, fourth link 3546, fifth link 3548, and sixth link 3550 would form a geometrically regular hexagon), resulting in expanded diameter outer perimeter 3552".

FIG. 35C shows linkage actuation 3500 after adjustment motor 3502 has moved lever 3504 clockwise, relative to the configuration shown in FIG. 35B, as shown by arrow 3529, causing first link 3540, second link 3542, third link 3544, fourth link 3546, fifth link 3548, and sixth link 3550 to swivel housings 3598 about respective pivot axes, such as the associated drive shafts 3534, so that first roller wheel 3514, second roller wheel 3516, and third roller wheel 3518 all are oriented at approximately 0° relative to the predetermined neutral pivot orientation, resulting in outer perimeter 3552.

FIG. 35D shows linkage actuation 3500 after adjustment motor 3502 has moved lever 3504 further clockwise, relative to the configuration shown in FIG. 35C, as shown by arrow 3530, causing first link 3540, second link 3542, third link 3544, fourth link 3546, fifth link 3548, and sixth link 3550 to swivel housings 3598 about respective pivot axes, such as the associated drive shafts 3534, so that first roller wheel 3514, second roller wheel 3516, and third roller wheel 3518 all are oriented at approximately +18° relative to the predetermined neutral pivot orientation, resulting in reduced diameter outer perimeter 3552'.

Similar to the discussion above regarding FIG. 34C, the diameter of expanded diameter outer perimeter 3552" is greater than the diameter of outer perimeter 3552, which in turn is greater than the diameter of reduced diameter outer perimeter 3552'.

FIG. 35E shows an alternate design for linkage actuation 3500 in which adjustment motor 3502, lever 3504, and/or first connector 3506 can be replaced by, for example, Bowden cable 3531 (or equivalent) coupled directly to second connector 3508. In this alternate design, the operator can exert a force indicated by arrow 3532, which is transmitted through Bowden cable 3531 as indicated by arrow 3533, to move second connector 3508 and, thereby, causing first link 3540, second link 3542, third link 3544, fourth link 3546, fifth link 3548, and sixth link 3550 to swivel housings 3598 about respective pivot axes, such as the associated drive shafts 3534, as implied by arrows 3535, 3536, and 3537.

Using linkage actuation 3500, the operator can perform, for example, real-time adjustment of the orientation, position, or orientation and position of first roller wheel 3514, second roller wheel 3516, and third roller wheel 3518 from a passive locking configuration to an active locking configuration or from the active locking configuration to the passive locking configuration. In addition or in the alternative, the operator can: tune engagement forces of first roller wheel 3514, second roller wheel 3516, and third roller wheel 3518; tune locking forces of first roller wheel 3514, second roller wheel 3516, and third roller wheel 3518; tune disengagement forces of first roller wheel 3514, second roller wheel 3516, and third roller wheel 3518; compensate for wear on first roller wheel 3514, second roller wheel 3516, and third roller wheel 3518; and/or compensate for wear on a passive receptacle of an object for engagement, locking, and/or disengagement (e.g., UAV, UUV).

FIGS. 36A-36E show a top plan view of gear actuation 3600 to provide for real-time adjustment of the orientation, position, or orientation and position of first roller wheel 3614, second roller wheel 3616, and third roller wheel 3618 using, for example, bevel gear sets similar to FIGS. 34A-34C.

As shown in FIG. 36A, gear actuation 3600 can include, for example, adjustment motor 3602, motor gear 3604, central gear 3640, first outer gear 3642, second outer gear 3644, third outer gear 3646, and frame structure 3638. Motor gear 3604 is coupled to third outer gear 3646, third outer gear 3646 is coupled to central gear 3640, and central gear 3640 is further coupled to first outer gear 3642 and second outer gear 3644. Applicant submits that in a first alternate arrangement of gear actuation 3600, motor gear 3604 could be coupled directly to central gear 3640, which could then drive first outer gear 3642, second outer gear 3644, and third outer gear 3646. Applicant also submits that in a second alternate arrangement of gear actuation 3600, three adjustment motors and associated motor gears could be coupled individually to drive first outer gear 3642, second outer gear 3644, and third outer gear 3646, without the need for central gear 3640. Given the present disclosure, Applicant submits that a PHOSITA could implement these first and second alternate arrangements of gear actuation 3600 without undue experimentation.

Operation of adjustment motor 3602 rotates motor gear 3604, driving third outer gear 3646 to rotate, which drives central gear 3640 to rotate, which in turn drives both first outer gear 3642 and second outer gear 3644 to rotate. In response, first outer gear 3642, second outer gear 3644, third outer gear 3646 all move relative to frame structure 3638, swiveling housings 3698 about respective pivot axes, such as the associated drive shafts 3634. As a result, gear actuation 3600 causes first roller wheel 3614, second roller wheel 3616, and third roller wheel 3618 to pivot at the same time, in the same pivot direction as seen from the top plan view, and through the same pivot angle as seen from the top plan view.

FIG. 36B shows gear actuation 3600 after adjustment motor 3602 has rotated motor gear 3604, which in turn has rotated third outer gear 3646, central gear 3640, first outer gear 3642, and second outer gear 3644 to swivel housings 3698 about respective pivot axes, such as the associated drive shafts 3634, so that first roller wheel 3614, second roller wheel 3616, and third roller wheel 3618 all are oriented at approximately −9° relative to a predetermined neutral pivot orientation (e.g., the predetermined neutral pivot orientation can correspond, for example, to a pivot orientation of first roller wheel 3514, second roller wheel 3516, and third roller wheel 3518 that would be similar to the pivot orientation discussed above with regard to FIG. 35B in which first link 3540, second link 3542, third link 3544, fourth link 3546, fifth link 3548, and sixth link 3550 would form a geometrically regular hexagon), resulting in expanded diameter outer perimeter 3652".

FIG. 36C shows gear actuation 3600 after adjustment motor 3602 has rotated motor gear 3604 as indicated, for example, by arrow 3611. In response, third outer gear 3646 has rotated as indicated by arrow 3613, which has rotated central gear 3640 as indicated by arrow 3615, which in turn has rotated both first outer gear 3642 as indicated by arrow 3617 and second outer gear 3644 as indicated by arrow 3619, causing first outer gear 3642, second outer gear 3644, and third outer gear 3646 to swivel housings 3698 about respective pivot axes, such as the associated drive shafts 3634, so that first roller wheel 3614, second roller wheel 3616, and third roller wheel 3618 all are oriented at approximately 0° relative to the predetermined neutral pivot orientation, resulting in outer perimeter 3652.

FIG. 36D shows gear actuation 3600 after adjustment motor 3602 has further rotated motor gear 3604 as indicated, for example, by arrow 3621. In response, third outer gear 3646 has rotated as indicated by arrow 3623, which has rotated central gear 3640 as indicated by arrow 3625, which in turn has rotated both first outer gear 3642 as indicated by arrow 3627 and second outer gear 3644 as indicated by arrow 3629, causing first outer gear 3642, second outer gear 3644, and third outer gear 3646 to swivel housings 3698 about respective pivot axes, such as the associated drive shafts 3634, so that first roller wheel 3614, second roller wheel 3616, and third roller wheel 3618 all are oriented at approximately +18° relative to the predetermined neutral pivot orientation, resulting in reduced diameter outer perimeter 3652'.

Similar to the discussion above regarding FIG. 34C, the diameter of expanded diameter outer perimeter 3652" is greater than the diameter of outer perimeter 3652, which in turn is greater than the diameter of reduced diameter outer perimeter 3652'.

FIG. 36E shows an alternate design for gear actuation 3600 in which adjustment motor 3602 and/or motor gear 3604 can be replaced by, for example, Bowden cable 3630 (or equivalent) coupled directly to connector 3608. In this alternate design, the operator can exert a force indicated by arrow 3631, which is transmitted through Bowden cable 3630 as indicated by arrow 3632, to move connector 3608 and, thereby, causing third outer gear 3646 to rotate as indicated by arrow 3633, which rotates central gear 3640 as indicated by arrow 3635, which in turn rotates both first outer gear 3642 as indicated by arrow 3637 and second outer gear 3644 as indicated by arrow 3639. The rotations of first outer gear 3642, second outer gear 3644, and third outer gear 3646 swivel housings 3698 about respective pivot axes, such as the associated drive shafts 3634, as implied by arrows 3633, 3637, and 3639.

Using gear actuation 3600, the operator can perform, for example, real-time adjustment of the orientation, position, or orientation and position of first roller wheel 3614, second roller wheel 3616, and third roller wheel 3618 from a passive locking configuration to an active locking configuration or from the active locking configuration to the passive locking configuration. In addition or in the alternative, the operator can: tune engagement forces of first roller wheel 3614, second roller wheel 3616, and third roller wheel 3618; tune locking forces of first roller wheel 3614, second roller wheel 3616, and third roller wheel 3618; tune disengagement forces of first roller wheel 3614, second roller wheel 3616, and third roller wheel 3618; compensate for wear on first roller wheel 3614, second roller wheel 3616, and third roller wheel 3618; and/or compensate for wear on a passive receptacle of an object for engagement, locking, and/or disengagement (e.g., UAV, UUV).

FIGS. 37A-37G show a top plan view of slotted-disk actuation 3700 to provide for real-time adjustment of the orientation, position, or orientation and position of first roller wheel 3714, second roller wheel 3716, and third roller wheel 3718 using, for example, bevel gear sets similar to FIGS. 34A-34C. To facilitate a PHOSITA understanding the operation of slotted-disk actuation 3700, FIGS. 37B-37D depict all portions of slots 3704, although in a strictly drawn top plan view, only more limited portions of slots 3704 would be visible. Similarly, to facilitate a PHOSITA understanding the operation of slotted-disk actuation 3700, FIGS. 37E-37G depict substantial portions of slots 3704, although in a strictly drawn top plan view, only more limited portions of slots 3704 would be visible.

As shown in FIG. 37A, slotted-disk actuation 3700 can include, for example, slotted disk 3702 with slots 3704 and geometric center 3706. As shown in FIG. 37A, slots 3704 are in the form of curved lines. However, slots 3704 also can be in the form of straight lines or can take on other shapes.

A drive shaft 3734 in an associated slot 3704, oriented perpendicular to slotted disk 3702 (e.g., in a direction in/out of the page), can traverse from a radially inner end of the associated slot 3704, near to geometric center 3706 of slotted disk 3702, toward a radially outer end of the associated slot 3704, far from geometric center 3706 of slotted disk 3702, and vice versa.

As shown in FIG. 37B, slotted-disk actuation 3700 can include, for example, slotted disk 3702 with slots 3704, connector 3708, central bevel gear assembly 3720, first sliding bevel gear assembly 3722, second sliding bevel gear assembly 3724, third sliding bevel gear assembly 3726, first wheel module translation drive shaft 3742, second wheel module translation drive shaft 3744, and third wheel module translation drive shaft 3746.

The bevel gears in central bevel gear assembly 3720 can rotate in either respective rotation direction under the constraint that the bevel gears in central bevel gear assembly 3720 are mutually engaged. The bevel gears in first sliding bevel gear assembly 3722 can rotate in either respective rotation direction under the constraint that the bevel gears in first sliding bevel gear assembly 3722 are mutually engaged. The bevel gears in second sliding bevel gear assembly 3724 can rotate in either respective rotation direction under the constraint that the bevel gears in second sliding bevel gear assembly 3724 are mutually engaged. The bevel gears in third sliding bevel gear assembly 3726 can rotate in either respective rotation direction under the constraint that the bevel gears in third sliding bevel gear assembly 3726 are mutually engaged.

Rotating the bevel gears in central bevel gear assembly 3720 using a motor (not shown) simultaneously rotates first wheel module translation drive shaft 3742, second wheel module translation drive shaft 3744, and third wheel module translation drive shaft 3746. Rotation of first wheel module translation drive shaft 3742 rotates first sliding bevel gear assembly 3722, rotation of second wheel module translation drive shaft 3744 rotates second sliding bevel gear assembly 3724, and rotation of third wheel module translation drive shaft 3746 rotates third sliding bevel gear assembly 3726.

Rotation of each of central bevel gear assembly 3720, first sliding bevel gear assembly 3722, second sliding bevel gear assembly 3724, third sliding bevel gear assembly 3726, first wheel module translation drive shaft 3742, second wheel module translation drive shaft 3744, and third wheel module translation drive shaft 3746 is independent of the rotation position of slotted disk 3702.

The physical location of each of central bevel gear assembly 3720, first wheel module translation drive shaft 3742, second wheel module translation drive shaft 3744, and third wheel module translation drive shaft 3746 is fixed relative to a frame structure (not shown) of slotted-disk actuation 3700 and is independent of the rotation position of slotted disk 3702. In contrast, the radial distance of each of first sliding bevel gear assembly 3722, second sliding bevel gear assembly 3724, third sliding bevel gear assembly 3726 from geometric center 3706 of slotted disk 3702 depends on the rotation position of slotted disk 3702.

As shown in FIG. 37B, the rotation position of slotted disk 3702 (as identified by the angular position of connector 3708) is at approximately 0° relative to a predetermined neutral pivot orientation and first sliding bevel gear assembly 3722, second sliding bevel gear assembly 3724, third sliding bevel gear assembly 3726 are all at an intermediate radial distance from geometric center 3706 of slotted disk 3702.

As shown in FIG. 37C, the rotation position of slotted disk 3702 (as identified by the angular position of connector 3708, with arrow 3711 indicating a movement direction away from the predetermined neutral pivot orientation) is at approximately −7° relative to the predetermined neutral pivot orientation and first sliding bevel gear assembly 3722, second sliding bevel gear assembly 3724, third sliding bevel gear assembly 3726 are all at an extended radial distance from geometric center 3706 of slotted disk 3702, with drive shafts 3734, oriented perpendicular to slotted disk 3702 (e.g., in a direction in/out of the page), moving radially outward together along respective wheel module translation drive shafts as controlled by respective slots 3704.

As shown in FIG. 37D, the rotation position of slotted disk 3702 (as identified by the angular position of connector 3708, with arrow 3713 indicating a movement direction away from the predetermined neutral pivot orientation) is at approximately +7° relative to the predetermined neutral pivot orientation and first sliding bevel gear assembly 3722, second sliding bevel gear assembly 3724, third sliding bevel gear assembly 3726 are all at a reduced radial distance from geometric center 3706 of slotted disk 3702, with drive shafts 3734 moving radially inward together along respective wheel module translation drive shafts as controlled by respective slots 3704.

As shown in FIG. 37E, slotted-disk actuation 3700 can include, for example, adjustment motor 3760, lever 3762, and link 3764 attached to connector 3708. As discussed above with respect to FIG. 37C, the rotation position of slotted disk 3702 (as identified by the angular position of connector 3708, with arrow 3715 indicating a movement direction away from the predetermined neutral pivot orientation) is at approximately −7° relative to the predetermined neutral pivot orientation and, as a result, first roller wheel 3714, second roller wheel 3716, and third roller wheel 3718 are all at an extended radial distance from geometric center 3706 of slotted disk 3702, resulting in expanded diameter outer perimeter 3752".

As shown in FIG. 37F, slotted-disk actuation 3700 can include, for example, adjustment motor 3760, lever 3762, and link 3764 attached to connector 3708. As discussed above with respect to FIG. 37B, the rotation position of slotted disk 3702 (as identified by the angular position of connector 3708) is at approximately 0° relative to the predetermined neutral pivot orientation and, as a result, first roller wheel 3714, second roller wheel 3716, and third roller wheel 3718 are all at an intermediate radial distance from geometric center 3706 of slotted disk 3702, resulting in outer perimeter 3752.

As shown in FIG. 37G, slotted-disk actuation 3700 can include, for example, adjustment motor 3760, lever 3762, and link 3764 attached to connector 3708. As discussed above with respect to FIG. 37D, the rotation position of slotted disk 3702 (as identified by the angular position of connector 3708, with arrow 3717 indicating a movement direction away from the predetermined neutral pivot orientation) is at approximately +7° relative to the predetermined neutral pivot orientation and, as a result, first roller wheel 3714, second roller wheel 3716, and third roller wheel 3718 are all at a reduced radial distance from geometric center 3706 of slotted disk 3702 resulting in reduced diameter outer perimeter 3752'.

Similar to the discussion above regarding FIG. 34C, the diameter of expanded diameter outer perimeter 3752" is greater than the diameter of outer perimeter 3752, which in turn is greater than the diameter of reduced diameter outer perimeter 3752'.

Using slotted-disk actuation 3700, the operator can perform, for example, real-time adjustment of the orientation, position, or orientation and position of first roller wheel 3714, second roller wheel 3716, and third roller wheel 3718 from a passive locking configuration to an active locking configuration or from the active locking configuration to the passive locking configuration. In addition or in the alternative, the operator can: tune engagement forces of first roller wheel 3714, second roller wheel 3716, and third roller wheel 3718; tune locking forces of first roller wheel 3714, second roller wheel 3716, and third roller wheel 3718; tune disengagement forces of first roller wheel 3714, second roller wheel 3716, and third roller wheel 3718; compensate for wear on first roller wheel 3714, second roller wheel 3716, and third roller wheel 3718; and/or compensate for wear on a passive receptacle of an object for engagement, locking, and/or disengagement (e.g., UAV, UUV).

Although examples have been shown and described in this specification and figures, it would be appreciated that changes can be made to the illustrated and/or described examples without departing from their principles and spirit, the scope of which is defined by the following claims and their equivalents.

What is claimed is:

1. An apparatus, comprising:
    a support base; and
    two or more roller wheels, each adjustable in orientation, position, or orientation and position, mounted on the support base and configured to engage with an object in a passive locking configuration,
    wherein the orientations, the positions, or the orientations and positions of the two or more roller wheels are adjustable to change the two or more roller wheels from the passive locking configuration to the active locking configuration or from the active locking configuration to the passive locking configuration.

2. The apparatus of claim 1, wherein the two or more roller wheels are further configured to disengage from the object in the passive locking configuration.

3. The apparatus of claim 2, wherein the two or more roller wheels are further configured to lock the object to the apparatus in an active locking configuration.

4. The apparatus of claim 1, wherein when changing the two or more roller wheels from the passive locking configuration to the active locking configuration, a locking dimension of the end apparatus increases.

5. The apparatus of claim 4, wherein the locking dimension comprises an diameter of an outer capture circle or a diameter of an inner capture circle.

6. The apparatus of claim 1, wherein when changing the two or more roller wheels from the passive locking configuration to the active locking configuration, a locking dimension of the end apparatus decreases.

7. The apparatus of claim 1, wherein when changing the two or more roller wheels from the active locking configuration to the passive locking configuration, a locking dimension of the end apparatus increases.

8. The apparatus of claim 1, wherein when changing the two or more roller wheels from the active locking configuration to the passive locking configuration, a locking dimension of the apparatus decreases.

9. The apparatus of claim 1, further comprising:
a locking mechanism;
wherein the locking mechanism is configured to prevent disengagement of the object from the apparatus.

10. An apparatus, comprising:
a support base; and
two or more roller wheels, each adjustable in orientation, position, or orientation and position, mounted on the support base, configured to engage with an object in a passive locking configuration, and further configured to lock the object to the apparatus in an active locking configuration,
wherein the orientations, the positions, or the orientations and positions of the two or more roller wheels are adjustable to change the two or more roller wheels from the passive locking configuration to the active locking configuration or from the active locking configuration to the passive locking configuration.

11. The apparatus of claim 10, wherein the orientations, the positions, or the orientations and positions of the at least two of the two or more roller wheels are adjustable to change the two or more roller wheels from the active locking configuration to the passive locking configuration.

12. The apparatus of claim 10, wherein adjusting the orientations, the positions, or the locations of the two or more roller wheels changes a locking dimension of the apparatus.

13. The apparatus of claim 12, wherein the locking dimension comprises an diameter of an outer capture circle or a diameter of an inner capture circle.

14. The apparatus of claim 10, wherein a first roller wheel of the two or more roller wheels is configured to rotate in a first geometric plane of rotation,
wherein a second roller wheel of the two or more roller wheels is configured to rotate in a second geometric plane of rotation, and
wherein the first geometric plane of rotation is parallel to the second geometric plane of rotation in the passive locking configuration, wherein the first geometric plane of rotation is parallel to the second geometric plane of rotation in the active locking configuration, or wherein the first geometric plane of rotation is parallel to the second geometric plane of rotation in the passive and active locking configurations.

15. The apparatus of claim 10, wherein a first roller wheel of the two or more roller wheels is configured to rotate in a first geometric plane of rotation,
wherein a second roller wheel of the two or more roller wheels is configured to rotate in a second geometric plane of rotation, and
wherein the first geometric plane of rotation is coincident with the second geometric plane of rotation in the passive locking configuration, wherein the first geometric plane of rotation is coincident with the second geometric plane of rotation in the active locking configuration, or wherein the first geometric plane of rotation is coincident with the second geometric plane of rotation in the passive and active locking configurations.

16. An apparatus, comprising:
a support base; and
three or more roller wheels, each adjustable in orientation, position, or orientation and position, mounted on the support base and configured to engage with an object in a passive locking configuration,
wherein the orientations, the positions, or the orientations and positions of the at least three of the three or more roller wheels are adjustable to change the three or more roller wheels from the passive locking configuration to an active locking configuration or from the active locking configuration to the passive locking configuration.

17. The apparatus of claim 16, wherein the three or more roller wheels are further configured to disengage from the object in the passive locking configuration.

18. The apparatus of claim 16, wherein adjusting the orientations, the positions, or the orientations and positions of the at least three of the three or more roller wheels changes a locking dimension of the apparatus.

19. The apparatus of claim 18, wherein the locking dimension comprises an diameter of an outer capture circle or a diameter of an inner capture circle.

20. The apparatus of claim 16, wherein a first roller wheel of the three or more roller wheels is configured to rotate in a first geometric plane of rotation,
wherein a second roller wheel of the three or more roller wheels is configured to rotate in a second geometric plane of rotation,
wherein a third roller wheel of the three or more roller wheels is configured to rotate in a third geometric plane of rotation,
wherein the first geometric plane of rotation is non-parallel to the second geometric plane of rotation,
wherein the second geometric plane of rotation is non-parallel to the third geometric plane of rotation, and
wherein the third geometric plane of rotation is non-parallel to the first geometric plane of rotation.

* * * * *